United States Patent
Klingler et al.

(10) Patent No.: US 12,511,810 B2
(45) Date of Patent: Dec. 30, 2025

(54) BACKCHANNELING FOR INTERACTIVE SYSTEMS AND APPLICATIONS

(71) Applicant: NVIDIA CORPORATION, Santa Clara, CA (US)

(72) Inventors: Severin Achill Klingler, Stettlen (CH); Razvan Dinu, Voluntari (RO); Pascal Joël Bérard, Zürich (CH); Christian Eduard Schüller, Frauenfeld (CH)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/798,892

(22) Filed: Aug. 9, 2024

(65) Prior Publication Data

US 2025/0182365 A1   Jun. 5, 2025

Related U.S. Application Data

(60) Provisional application No. 63/604,721, filed on Nov. 30, 2023.

(51) Int. Cl.
| | | |
|---|---|---|
| *G06T 13/40* | (2011.01) | |
| *G06F 3/16* | (2006.01) | |
| *G06F 9/451* | (2018.01) | |

(52) U.S. Cl.
CPC .............. *G06T 13/40* (2013.01); *G06F 9/453* (2018.02); *G06F 3/167* (2013.01)

(58) Field of Classification Search
CPC .......... G06T 13/40; G06F 9/453; G06F 3/167
See application file for complete search history.

(56) References Cited

U.S. PATENT DOCUMENTS

| | | |
|---|---|---|
| 9,690,784 B1 | 6/2017 | Hughes et al. |
| 11,809,688 B1 | 11/2023 | Parasnis et al. |
| 12,165,336 B1 | 12/2024 | ElHattab et al. |

(Continued)

FOREIGN PATENT DOCUMENTS

| | | |
|---|---|---|
| WO | 2020223742 A2 | 11/2020 |
| WO | 2025209636 | 10/2025 |

OTHER PUBLICATIONS

Non-Final Office Action, U.S. Appl. No. 18/798,904, Notification Date: Oct. 2, 2025, 11 pages.

(Continued)

*Primary Examiner* — Priyank J Shah
(74) *Attorney, Agent, or Firm* — Freestone Intellectual Property Law PLLC

(57) ABSTRACT

In various examples, an interactive agent platform that hosts development and/or deployment of an interactive agent such as a digital avatar may employ backchanneling to provide feedback to the user while the user is talking or doing something detectable. For example, backchanneling may be implemented by triggering interactive agent postures (e.g., based on whether the user or the avatar is speaking, or based on the interactive agent waiting for a response from the user), short vocal bursts like "yes", "aha", or "hmm" while the user is talking (e.g., signaling to the user that the interactive agent is listening), gestures (e.g., shaking the interactive's agent's head), and/or otherwise. As such, a designer may specify various backchanneling techniques that make conversations with an interactive agent feel more natural.

20 Claims, 36 Drawing Sheets

(56) References Cited

U.S. PATENT DOCUMENTS

| | | |
|---|---|---|
| 12,168,445 B1 | 12/2024 | Srinivasan et al. |
| 2011/0231182 A1 | 9/2011 | Weider et al. |
| 2017/0017677 A1 | 1/2017 | Jolfaei |
| 2017/0256259 A1* | 9/2017 | Froelich .................. G10L 15/04 |
| 2018/0176269 A1 | 6/2018 | Griffin |
| 2020/0388285 A1 | 12/2020 | Spiewla et al. |
| 2022/0176565 A1 | 6/2022 | Munich et al. |
| 2023/0021339 A1 | 1/2023 | Bosnak et al. |
| 2024/0086148 A1 | 3/2024 | Marzinzik et al. |
| 2024/0160903 A1* | 5/2024 | Fouse .................. G06N 3/0475 |
| 2024/0221742 A1* | 7/2024 | Yun ......................... G10L 25/63 |
| 2024/0412029 A1* | 12/2024 | Yang .................... G06N 3/0475 |
| 2025/0165781 A1* | 5/2025 | Zou ....................... G06F 16/285 |

OTHER PUBLICATIONS

Non-Final Office Action, U.S. Appl. No. 18/798,886, Notification Date: Nov. 24, 2025, 21 pages.

\* cited by examiner

| Interactive System | Description of Interactive System | Interaction Manager Features | Supported Interaction Channels and Features | Standardized Actions |
|---|---|---|---|---|
| Chatbot | Text-focused chat interface, strict turn-taking interaction (user, bot, user, bot, ...) | Dialog-focused conversation logic<br><br>Clear turn taking structure | Text input / Text output<br><br>May support showing images, URLs, etc. to the user | AvatarSay<br><br>UserSay<br><br>Listen<br><br>ShowInformation |
| Voice Assistant | Same as chatbot but with a voice interface (speech in speech out) | Dialog focused conversations | Audio in/out<br><br>Automatic Speech Recognition (ASR)<br><br>Text-To-Speech (TTS) | AvatarSay<br><br>UserSay<br><br>Listen |
| Chatbot with Avatar | A dialog based system that is driving an avatar experience, a focus on turn taking logic. | Dialog focused conversation, but possibility to emit additional events that can control avatar (e.g. change an animation at certain points) | Avatar visualization<br><br>ASR<br><br>TTS<br><br>Audio in / out<br><br>UI<br>Camera / Vision | AvatarSay<br><br>UserSay |
| Interactive Avatar | Multimodal experience with an avatar, the IM may consider multiple modalities when generating multimodal outputs. Each interaction is not tied to a turn taking structure. | Multimodal IM that can react in real-time to events and orchestrate multiple dependent events relying on different interaction modalities | Avatar visualization<br><br>ASR<br><br>TTS<br><br>Audio in / out<br><br>UI<br>Camera / Vision | AvatarSay<br><br>UserSay<br><br>Listen<br><br>ShowInformation<br><br>MakeGesture Posture |
| Non-Player Character | | | | InteractWith Environment |

FIGURE 3

| Policy | Description | Example Modality |
|---|---|---|
| Parallel | Multiple actions can run at the same time | Sound effects |
| Override | Multiple actions can run at the same time. If an action is running it will be overridden. When the overriding action finishes, the other action will be resumed. | Body animations |
| Skip | If an action is started while there is already an action in progress on the same modality, the new action to be started will be prioritized over the existing action, started, and immediately finished (ActionStarted followed by ActionFinished). | |
| Replace | Stops any ongoing action (ActionFinished) on the same modality and starts the new action as soon as possible | BotMovement |

FIGURE 4

| MODALITY GROUP | MODALITY | POLICY | ACTIONS AND EVENTS |
|---|---|---|---|
| SPEECH | BOTSPEECH | ABORT | BOTUTTERANCE |
| | USERSPEECH | REPLACE | USERUTTERANCE |
| MOTION | BOTFACE | OVERRIDE | BOTEXPRESSION |
| | BOTUPPERBODY | OVERRIDE | BOTPOSE BOTOBJECTINTERACTION BOTGESTURE |
| | BOTLOWERBODY | REPLACE | BOTMOVEMENT |
| | USERFACE | REPLACE | USEREXPRESSION |
| | USERUPPERBODY | PARALLEL | USERPOSE USERGESTURE |
| | USERLOWERBODY | PARALLEL | USERMOVEMENT |
| SCENE | SOUND | PARALLEL | SOUNDEFFECT BACKGROUNDSOUND |
| | ENVIRONMENT | OVERRIDDE | SCENEENVIRONMENT SCENEOBJECT |
| | CAMERA | REPLACE | CUTCAMERAACTION TRANSITIONCAMERAACTION SCENECAMERACUT SCENECAMERASHOT |
| | INFORMATION | OVERRIDE | VISUALCHOICESCENEACTION VISUALINFORMATIONSCENEACTION VISUALFORMSCENEACTION |
| | VISUALEFFECT | PARALLEL | SCENEVISUALEFFECT |
| SYSTEM | USERPRESENCE | PARALLEL | USERAPPEARING USERDISAPPEARING |
| | BOTEXPECTATIONSIGNALING | OVERRIDE | EXPECTATIONSIGNALINGBOTACTION |
| | BOTEXPECTATION | PARALLEL | BOTEXPECTATIONACTION |
| | TIME | PARALLEL | TIMERACTION |
| | WEBREQUEST | PARALLEL | RESTAPICALLBOTACTION |

FIGURE 5

Example Visual Information Scene Action Events

| Event | Example Action Handler |
|---|---|
| StartVisualInformationSceneAction *(GUI output event)* | • Add action to stack<br>• Generate custom page, populating block-based layout based on action event payload<br>    • May map specified support prompts → hint carousel block<br>    • May map specified title → header block<br>    • May map specified content list → image/text blocks<br>    • May include (e.g., "Continue") button (e.g., at bottom of generated page)<br>• Call user interface server endpoint with custom page payload<br>• If success:<br>    • Send out VisualInformationSceneActionStarted()<br>• Otherwise<br>    • Send out VisualInformationSceneActionFinished(is_success=False) |
| StopVisualInformationSceneSceneAction *(GUI output event)* | • Remove current action from stack and resume top-most action remaining on stack<br>• If there is no action remaining, clear and/or hide the GUI through a call to the user interface server endpoint.<br>• Send out VisualInformationSceneActionFinished(is_success=True) |
| ButtonPressed *(GUI input event)* | • When the (e.g., "continue") button is pressed, send out VisualChoiceSceneActionConfirmationUpdated(confirmation_status="confirmed") |
| ResumeAction *(internal event)* | • Resend custom page payload to configure page for resumed action |

FIGURE 12A

Example Visual Choice Action Events

| Event | Example Action Handler |
|---|---|
| StartVisualChoiceSceneAction<br>*(GUI output event)* | • Add action to stack<br>• Generate custom page, populating block-based layout based on action event payload<br>  • May map specified support prompts → hint carousel block<br>  • May map specified title → header block<br>  • May map specified image → image block<br>  • May map specified options → selectable options grid block<br>  • May include (e.g., cancel) button (e.g., at bottom of generated page)<br>  • If allow_multiple_choice=True, may include (e.g., confirmation) button for the user to indicate the choice is finished<br>• Call user interface server endpoint with custom page payload<br>• If success: Send out VisualChoiceSceneActionStarted()<br>• Otherwise: Send out VisualChoiceSceneActionFinished(is_success=False) |
| StopVisualChoiceSceneSceneAction<br>*(GUI output event)* | • Remove current action from stack and resume top-most action remaining on stack<br>• If there is no action remaining, clear and/or hide the GUI through a call to the user interface server endpoint.<br>• Send out VisualChoiceSceneActionFinished(is_success=True) |
| ButtonPressed<br>*(GUI input event)* | • When the confirmation or cancel button is pressed, send out VisualChoiceSceneActionConfirmationUpdated(confirmation_status) with the choice or an empty choice list, respectively.<br>• If one of the options was selected:<br>  • Toggle the selection and send VisualChoiceSceneActionUpdated() |
| ResumeAction<br>*(internal event)* | • Resend custom page payload to configure page for the action (see StartAction event) |

FIGURE 12B

Example Visual Form Action Events

| Event | Example Action Handler |
|---|---|
| StartVisualFormSceneAction<br>(GUI output event) | • Add action to stack<br>• Generate custom page, populating block-based layout based on action payload<br>   • May map specified support prompts → hint carousel block<br>   • May map specified prompt → header block<br>   • May map specified image → image block<br>   • May map specified input field(s) → list of input block(s)<br>   • May include (e.g., confirm, cancel) button(s)<br>• Call user interface server endpoint with custom page payload<br>• If success: Send out VisualFormSceneActionStarted()<br>• Otherwise Send out VisualFormSceneActionFinished(is_success=False) |
| StopVisualFormSceneAction<br>(GUI output event) | • Remove current action from stack and resume top-most action remaining on stack<br>• If there is no action remaining, clear and/or hide the GUI through a call to the user interface server endpoint.<br>• Send out VisualFormSceneActionFinished(is_success=True) |
| ButtonPressed<br>(GUI input event) | • When the "confirmation" or "cancel" button is pressed VisualChoiceSceneActionConfirmationUpdated() is sent out with either the values for all inputs or an empty input value respectively. |
| CharacterEntered<br>(GUI input event) | • Send out VisualChoiceSceneActionUpdated() with current value of the element as interim_input |
| EditingFinished<br>(GUI input event) | • If enter was pressed, send out VisualFormSceneActionFinished(is_success=True) with the values of inputs for all input fields |
| ResumeAction<br>(internal event) | • Resend custom page payload to configure page for the action (see StartAction event) |

FIGURE 12C

Example Bot Gesture Action Events

| Event | Example Action Handler |
|---|---|
| Initialize *(internal event)* | • Load duration information for animation clip(s) (e.g., start and end times of animation, total playback duration, other timing parameters) from configuration file |
| StartGestureBotAction | • Add action to stack<br>• Translate gesture NLD to clip name<br>• Call animation graph endpoint update_animation_graph_variable_state_post with state variable = clip name<br>• If success:<br>    • Send out GestureBotActionStarted()<br>    • Set a timer with the duration of the clip (loaded from file during initialization)<br>• Otherwise: Send out GestureBotActionFinished(is_success=False) |
| StopGestureBotAction | • Remove current action from stack and resume top-most action remaining on stack<br>• If there is no action remaining, send the state variable: default gesture (configurable, currently set to idle) to update_animation_graph_variable_state_post endpoint. |
| Timeout *(internal event)* | • May indicate an instructed animation clip has finished.<br>• If gesture action not paused: send out GestureBotActionFinished(is_success=True)<br>• Otherwise, ignore |
| ResumeAction *(internal event)* | • Call animation graph endpoint update_animation_graph_variable_state_post with state variable = animation clip name<br>• Send out GestureBotActionStarted if not already sent out |

FIGURE 12D

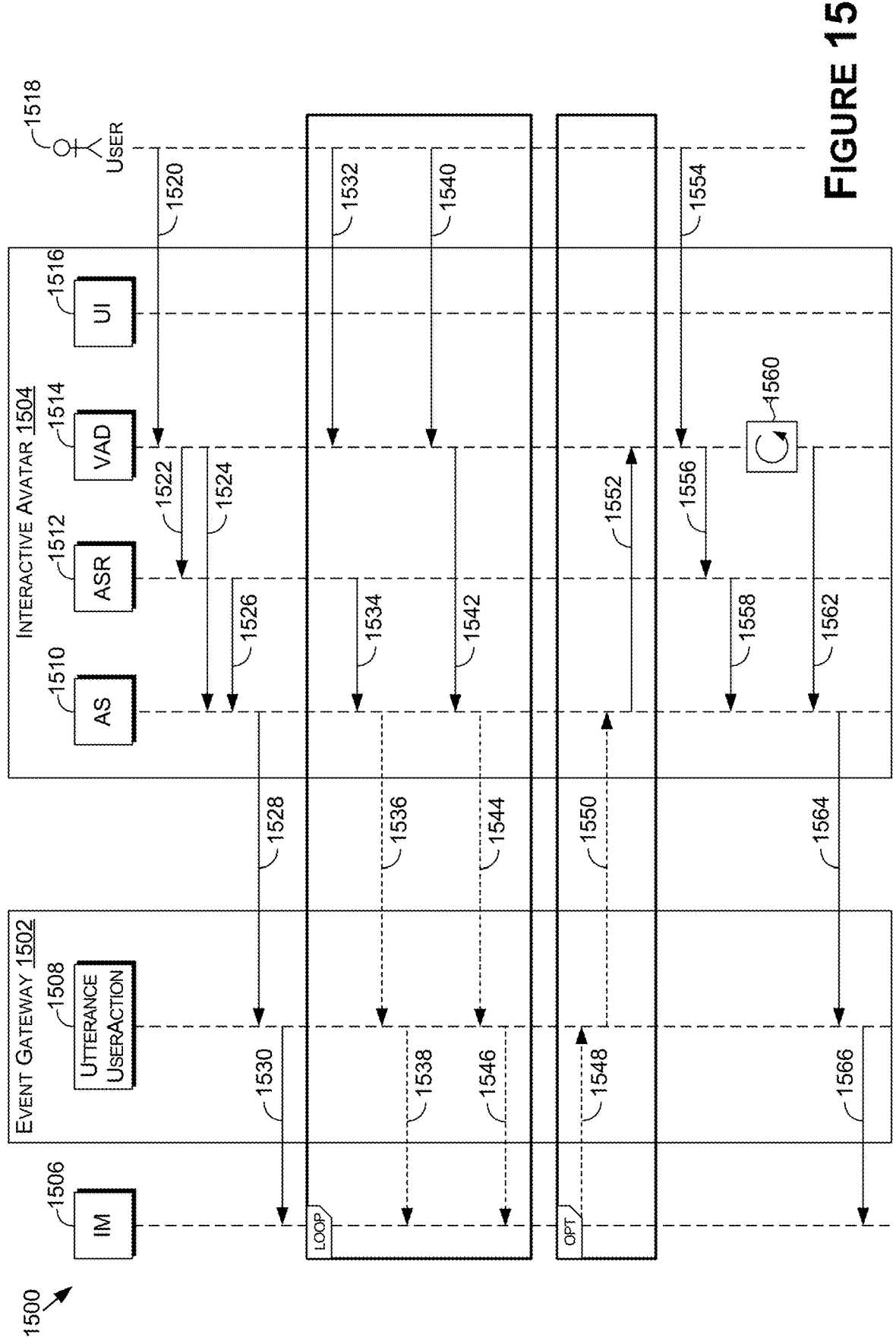

1800

RECEIVE, BY AN INTERPRETER OF AN INTERACTIVE AGENT PLATFORM ASSOCIATED WITH AN INTERACTIVE BOT OR ROBOT, ONE OR MORE REPRESENTATIONS OF ONE OR MORE DETECTED USER ACTIONS CATEGORIZED USING AN INTERACTION CATEGORIZATION SCHEMA
B1802

GENERATE, BASED AT LEAST ON THE INTERPRETER EXECUTING ONE OR MORE INSTRUCTION LINES OF ONE OR MORE INTERACTION FLOWS THAT ARE COMPOSED IN AN INTERACTION MODELING LANGUAGE AND INSTRUCT ONE OR MORE AGENT ACTIONS TO GENERATE IN RESPONSE TO THE ONE OR MORE DETECTED USER ACTIONS, ONE OR MORE REPRESENTATIONS OF ONE OR MORE RESPONSIVE AGENT ACTIONS CATEGORIZED USING THE INTERACTION CATEGORIZATION SCHEMA
B1804

RECEIVE, BY AN INTERPRETER OF AN INTERACTIVE AGENT PLATFORM THAT SUPPORTS SIMULTANEOUS EXECUTION OF AGENT ACTIONS IN DIFFERENT INTERACTION MODALITIES, ONE OR MORE REPRESENTATIONS OF ONE OR MORE DETECTED USER ACTIONS
B1902

GENERATE, BASED AT LEAST ON THE INTERPRETER EXECUTING ONE OR MORE INSTRUCTION LINES OF ONE OR MORE INTERACTION FLOWS IN RESPONSE TO THE ONE OR MORE DETECTED USER ACTIONS, ONE OR MORE REPRESENTATIONS OF ONE OR MORE RESPONSIVE AGENT ACTIONS
B1904

FIGURE 19

BACKCHANNELING FOR INTERACTIVE SYSTEMS AND APPLICATIONS

CROSS-REFERENCE TO RELATED APPLICATIONS

This application claims the benefit of U.S. Provisional Application No. 63/604,721, filed on Nov. 30, 2023, the contents of which are incorporated by reference in their entirety.

BACKGROUND

Conversational artificial intelligence (AI) allows computers to engage in natural language conversations with users, facilitating human-like interactions and understanding. Multimodal conversational AI integrates multiple modes of communication (e.g., text, speech, gestures, emotions, visual elements, etc.), allowing for more comprehensive and natural interactions between users and AI systems. Multimodal conversational AI is being integrated into more and more applications, from simple chatbots, to voicebots, to fully interactive avatars (also known as digital characters or digital avatars) and robots. However, designing these applications to engage in flexible and robust interactions with a user is a difficult task.

As an initial matter, designing compelling avatar interactions is quite challenging. Interactions with an avatar are increasingly perceived as interactions with another person, but interactions with other people can be complex, nuanced, multimodal, and non-sequential. Since we as humans have been communicating with other humans our entire lives, we can often quickly realize when there is a sense of discord, unease, or incongruity in a conversation, or when our counterpart is reacting in an unusual or unnatural way. These types of nuances are not easy to model, and deficiencies in modeling human interactions can actually become more apparent the closer they become to modeling reality. An analogous effect is known as the "uncanny valley" effect for three-dimensional (3D) graphics, where 3D models of humans that are very close to lifelike, but still exhibit subtle imperfections or discrepancies from real humans, can appear uncanny and evoke feelings of unease or discomfort.

Furthermore, to illustrate the complexity in many of these design challenges, consider what it might take to upgrade a chatbot that can only interact via a turn-based text dialog to a multimodal interactive avatar that you can see and talk to. Moving from a single interaction modality (e.g., text dialog) to supporting multiple user input interaction modalities (e.g., text, touch, speech, gestures, emotions, etc.) and/or supporting multiple output interaction modalities to respond to the user (e.g., through text/voice, graphical user interface (GUI), animations, sound effects, lights, etc.) adds a tremendous amount of complexity. Furthermore, moving from a turn-based interactive system to one that supports non-sequential interactions (e.g., multiple simultaneous, potentially overriding inputs and/or outputs) adds even more complexity. In many cases, interactive systems that provide a single interaction modality or use turn-based interactions simply will not work for multimodal and/or non-sequential interactive systems.

For some interactive systems such as those that provide interactive avatars, it may be desirable to support speech input and output, and also make use of screen real estate by showing dynamic information on the screen and letting the user interact with the information. As such, it may be desirable to dynamically adapt the visual presentation on the screen to the content of the conversation in order to provide useful contextual information (e.g., by showing a visual representation of some options an avatar is verbally offering to the user). Today, conversational AI models are tailored to process verbal input and output (e.g., speech in the form of text), but lack the ability to directly generate corresponding visual elements or graphical user interfaces. This is just an example in which conventional tools are limited in their ability to support multimodal interactions.

Furthermore, AI systems that provide multimodal conversational experiences come in many different forms, and different systems rely on a multitude of different technologies. This means that most interactive systems connect their constituent components (e.g., a decision-making unit, AI models like deep neural networks (DNNs) and machine learning models, cameras, user interfaces, etc.) in an application-specific way, using custom application programming interfaces (APIs) and architectures tailored for each specific interactive system. Today, there are a plethora of toolkits and frameworks for modeling conversational interactions, and many different applications are built on top of these technologies. As a result, components cannot be easily exchanged or updated based on the latest technologies, which results in an increase in time from research to product. Furthermore, heterogeneous systems that represent multimodal interactions in different ways make it harder to train AI models on historical multimodal interactions, limiting their ability to improve the user experience over time. Moreover, in many systems, interaction data is tightly coupled with the specific implementation of the interactive system. For example, the specific format any given interactive system uses to encode or represent interaction data (e.g., how a human talks to a bot) typically depends on the specific implementation. This makes it hard to reason about multimodal interactions without knowledge of the technical intricacies of any given interactive system, limiting the ability to leverage existing frameworks or expand on existing technologies.

As such, there is a need for improved systems that provide and support the development and/or deployment of multimodal interactive systems.

SUMMARY

Embodiments of the present disclosure relate to the development and deployment of interactive systems such as those that implement an interactive agent (e.g., bot, avatar, digital human, or robot). For example, systems and methods are disclosed that implement or support an interaction modeling language and/or interaction modeling application programming interface (API) that uses a standardized interaction categorization schema, multimodal human-machine interactions, backchanneling, an event-driven architecture, management of interaction flows, deployment using one or more large language models, sensory processing and action execution, interactive visual content, interactive agent (e.g., bot) animations, expectations actions and signaling, and/or other features.

For example, an interactive agent platform that hosts development and/or deployment of an interactive agent (e.g., bot or robot) may provide an interpreter or compiler that interprets or executes code written in the interaction modeling language, and a designer may provide customized code written in the interaction modeling language for the interpreter to execute. The interaction modeling language may be used to define a flow of interactions that instruct the interpreter (e.g., an event-driven state machine) what actions or events to generate in response to a sequence of detected and/or executed human-machine interactions. The interaction categorization schema may classify interactions by standardized interaction modality (e.g., BotUpperBodyMotion) and/or corresponding standardized action category or type (e.g., BotPose, BotGesture) using standardized action keywords, and the interaction modeling language may use keywords, commands, and/or syntax that incorporates or categorizes standardized modalities, types of actions, and/or event syntax defined by the interaction categorization schema. As such, a flow may be used to model a bot intent or inferred user intent, which a designer may use to build more complex interaction patterns with the interactive agent.

In some embodiments, one or more flows may implement the logic of an interactive agent and may specify a sequence of multimodal interactions. For example, an interactive avatar (e.g., an animated digital character) or other bot may support any number of simultaneous interaction modalities and corresponding interaction channels to engage with the user, such as channels for character or bot actions (e.g., speech, gestures, postures, movement, vocal bursts, etc.), scene actions (e.g., two-dimensional (2D) GUI overlays, 3D scene interactions, visual effects, music, etc.), and user actions (e.g., speech, gesture, posture, movement, etc.). Actions based on different modalities may occur sequentially or in parallel (e.g., waving and saying hello). As such, the interactive agent may execute any number of flows that specify a sequence of multimodal actions (e.g., different types of bot or user actions) using any number of supported interaction modalities and corresponding interaction channels.

To make conversations with an avatar or other interactive agent feel more natural, some embodiments employ backchanneling to provide feedback to the user while the user is talking or doing something detectable. For example, backchanneling may be implemented by triggering interactive agent postures (e.g., based on the user or the avatar speaking, or based on the avatar waiting for a response from the user) such as posture mirroring (e.g., where an interactive avatar substantially mirrors the user's posture), short vocal bursts like "yes", "aha", or "hmm" while the user is talking (e.g., signaling to the user that the interactive agent is listening), gestures (e.g., shaking the interactive bot's or robot's head), and/or otherwise. As such, a designer may specify various backchanneling techniques that make conversations with an interactive agent feel more natural.

In some embodiments, a platform that hosts development and/or deployment of an interactive system may represent and/or communicate human-machine interactions and related events using a standardized interaction modeling API, plug-in, and/or an event-driven architecture. In an example implementation, a standardized interaction modeling API serves as a common protocol in which components of the interactive system use a standardized interaction categorization schema to represent all activities by bots and users as actions in a standardized form, represent states of multimodal actions from bots and users as events in a standardized form, implement standardized mutually exclusive modalities that define how conflicts between actions in standardized action categories are resolved (e.g. saying two things at the same time is not possible, while saying something and making a gesture at the same time may be possible), and/or implement standardized protocols for any number of standardized modalities and actions independent of implementation.

In some embodiments, an interpreter for an interactive agent may be programmed to iterate though one or more flows until reaching an event matcher, a top level flow may specify instruction(s) to activate any number of flows comprising any number of event matchers, the interpreter may use any suitable data structure to keep track of active flows and corresponding event matchers (e.g., using a tree or other representation of nested flow relationships), and the interpreter may employ an event-driven state machine that listens for various events and triggers corresponding actions specified in matching flows (with event matchers that match an incoming interaction modeling API event). As such, the interpreter may execute a primary processing loop that processes incoming interaction modeling API events and generates outgoing interaction modeling API events that implement the interactive agent.

In some embodiments, an interaction modeling language and corresponding interpreter may support the use of natural language descriptions and one or more language models (e.g., large language models (LLMs), vision language models (VLMs), multimodal language models, etc.) to ease the cognitive load on the programmer and facilitate the development and deployment of more complex and nuanced human-machine interactions. For example, the interpreter may parse one or more specified flows (e.g., at design time) defining the logic of an interactive agent, identify whether any specified flows are missing a corresponding flow description, and if so, prompt a language model to generate one based on the name and/or instructions of the flow. Additionally or alternatively, the interpreter may identify whether any specified flows are missing a sequence of instructions, and if so, prompt a language model to generate one. In some embodiments, the interpreter may determine whether an event matches an active event matcher for any of the active flows using target event parameter(s) and/or parameter value(s) generated using the language model, may prompt the language model to determine whether an event matches the flow description, may prompt the language model to determine whether an unmatched event matches the name and/or instruction(s) of an active flow, may prompt the language model to generate a flow in response to an unmatched event, and/or otherwise.

Generally, an interactive agent platform that hosts development and/or deployment of an interactive agent (e.g., chatbot, voicebot, digital assistant, interactive avatar, non-player character (NPC), digital human, robot, etc.) may support any number of input and output interaction channels. In some embodiments that decouple sensory processing, interaction decision-making, and action execution, the interactive agent platform may support a sensory server for each input interaction channel and an action server for each output interaction channel. Sensory server(s) for corresponding input interaction channel(s) may translate inputs or non-standard technical events into the standardized format and generate corresponding interaction modeling API events, an interaction manager may process these incoming interaction modeling API events and generate outgoing interaction modeling API events representing commands to take some action, and action server(s) for corresponding output interaction channel(s) may interpret those outgoing interaction modeling API events and execute the corresponding commands. Sensory and/or action servers may be implemented using a combination of asynchronous event loops and processes to ensure that multiple user sessions and system pipelines may be served in parallel. In order to handle all supported actions for at least one interaction modality, an action server may be equipped with an action handler for each standardized category or type of action and/or action event supported by the interaction modeling language and/or defined by the interaction categorization schema for a given interaction modality. Each action server may manage the lifecycle of all actions under its purview, and may synchronize action state changes with designated conditions (e.g., wait to start an action until a previous action of the same modality is completed, align the completion of two different actions in different modalities, align the start of one action with the end of some other action, etc.).

In some embodiments, an interactive agent platform that hosts development and/or deployment of an interactive agent may use a graphical user interface (GUI)—or generally a UI-service to execute interactive visual content actions and generate corresponding GUIs. For example, an interaction modeling API may use a standardized interaction categorization schema that defines a standardized format (e.g., standardized and semantically meaningfully keywords) for specifying events related to interactive visual content actions (e.g., actions that instruct an overlay or other arrangement of visual content supplementing a conversation with an interactive agent), such as visual information scene (e.g., showing non interactive content such as images, text and videos alongside the interaction) actions, visual choice (e.g., presenting a visual choice to the user in form of multiple buttons to select or an option list) actions, and/or visual form (e.g., presenting the user with a visual web form to enter the user information) actions. A sensory server may convert detected interactions with GUI interaction elements into standardized interaction modeling API events representing possible interactions with those elements in a standardized format. Standardized interaction modeling API events may be processed by an interpreter that implements the logic of the interactive agent to generate outgoing interaction modeling API events specifying commands to make responsive GUI updates. An action server implementing a GUI service may translate a standardized representation of a particular GUI specified by a particular interaction modeling API event into a (e.g., JavaScript Object Notation (JSON)) representation of a modular GUI configuration defining blocks of visual content specified or otherwise represented by the interaction modeling API event such as paragraphs, images, buttons, multiple-choice fields, and/or other types. As such, the GUI service may use these blocks to populate a (e.g., template or shell) visual layout for a GUI overlay (e.g., a HyperText Markup Language (HTML) page that may be rendered in a web browser) with visual content specified by the interaction modeling API event. As such, a visual layout representing a GUI specified by an interaction modeling API event may be generated and presented (e.g., via a user interface server) to the user.

In some embodiments, interaction modeling API events that specify commands to make bot expressions, poses, gestures, or other interactions or movements may be generated (e.g., by an interpreter executing code written in an interaction modeling language) and translated into corresponding bot animations. More specifically, an interpreter implementing logic of an interactive agent may generate an interaction modeling API event representing a target bot expression, pose, gesture, or other interaction or movement using a standardized interaction categorization schema, and an action server implementing an animation service may use the standardized representation of the target bot movement to identify a corresponding supported animation or generate a matching animation on the fly. The animation service may implement an action state machine and action stack for all events related to a particular interaction modality or category of action (e.g., bot gestures), connect with an animation graph that implements a state machine of animation states and transitions between animations, and instruct the animation graph to set a corresponding state variable based on a command to change the state (e.g., initialize, stop, or resume) of a bot movement represented by an interaction modeling API event.

In some embodiments, an interpreter associated with an interactive agent may generate interaction modeling API events that communicate an expectation that certain events will occur, and that command or otherwise trigger corresponding preparatory actions, such as turning down speaker volume in anticipation of user speech, enabling computer vision and/or machine learning algorithms in anticipation of vision events, and/or signaling to the user that the interactive agent is waiting for an input (e.g., on a designated user interaction modality). Interaction modeling API events may include one or more fields that represent an expectation that a specified target event will occur using a standardized interaction categorization schema that identifies expectations as a supported type of action (e.g., ExpectationBotAction, ExpectationSignalingAction) and that represents corresponding expectation events (e.g., indicating the state of the expectation such as start, stop, and finished), expected target events (e.g., UtteranceUserActionStarted), and/or expected input interaction modalities (e.g., UserSpeech) using standardized (e.g., natural language, semantically meaningfully) keywords and/or commands.

As such, the present techniques may be used to develop and/or deploy interactive bots or robots (e.g., chatbots, voicebots, digital assistants, interactive avatars, non-player characters (NPCs), digital humans, etc.) that engage in more complex, nuanced, multimodal, non-sequential, and/or realistic conversational AI and/or other types of human-machine interactions than in prior techniques.

BRIEF DESCRIPTION OF THE DRAWINGS

The present systems and methods for the development and deployment of interactive systems are described in detail below with reference to the attached drawing figures, wherein:

FIG. 3 illustrates example interactive systems which may be supported by an example interaction modeling API and/or an example interaction modeling language, in accordance with some embodiments of the present disclosure;

FIG. 4 illustrates example modality policies, in accordance with some embodiments of the present disclosure;

FIG. 5 illustrates an example interaction categorization schema, in accordance with some embodiments of the present disclosure;

FIGS. 12A-12D illustrate some example action handlers for an example GUI service and an example animation service, in accordance with some embodiments of the present disclosure;

FIG. 15 illustrates an example event flow for a user utterance action in an implementation in which a user speaks with an interactive avatar, in accordance with some embodiments of the present disclosure;

FIG. 18 is a flow diagram showing a method for generating a representation of a responsive agent action categorized using an interaction categorization schema, in accordance with some embodiments of the present disclosure;

FIG. 19 is a flow diagram showing a method for generating a representation of a responsive agent action based at least on executing one or more interaction flows, in accordance with some embodiments of the present disclosure;

DETAILED DESCRIPTION

Figure 1:
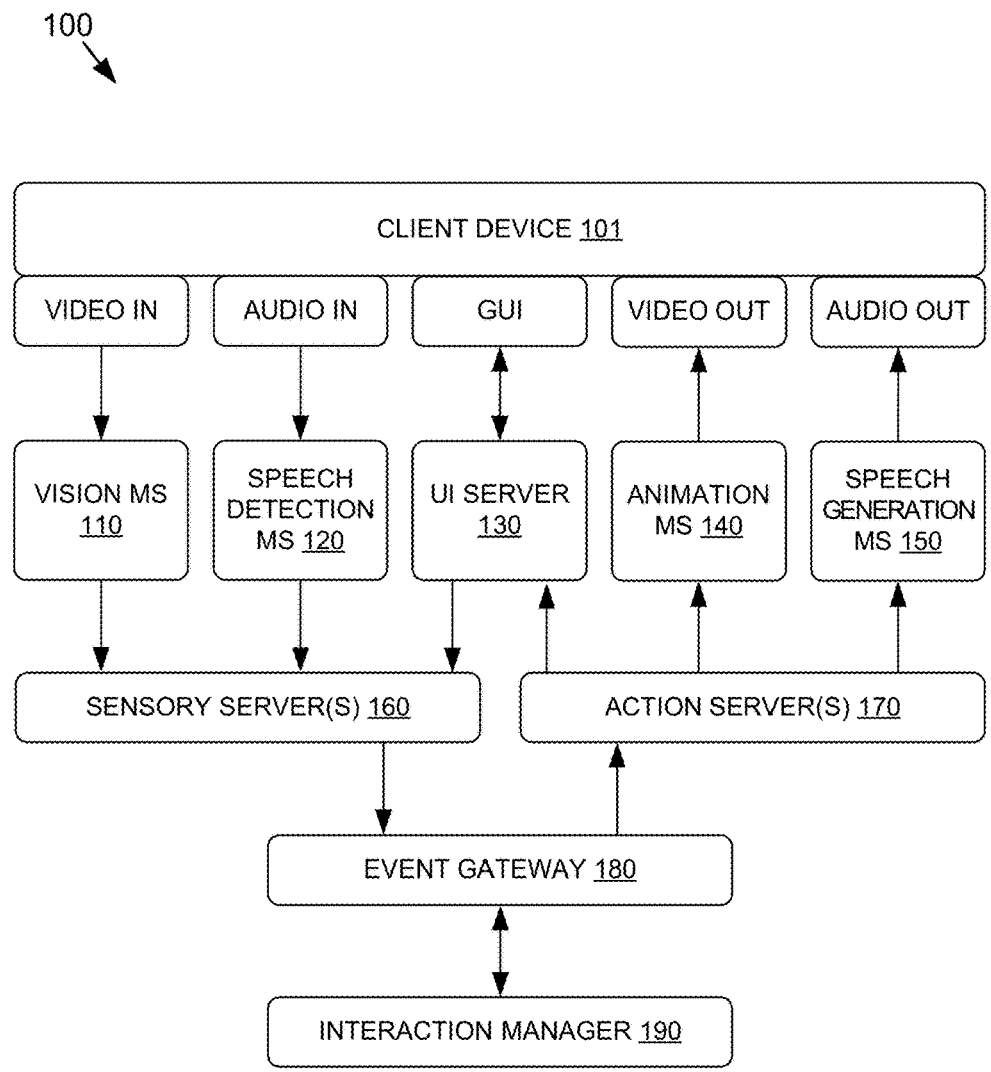
FIG. 1 illustrates an example interactive system, in accordance with some embodiments of the present disclosure.

Systems and methods are disclosed related to the development and deployment of interactive systems such as those that implement an interactive agent (e.g., bot, non-player character, digital avatar, digital human, robot, etc.). For example, systems and methods are disclosed that implement or support an interaction modeling language and/or interaction modeling API that uses a standardized interaction categorization schema, multimodal human-machine interactions, backchanneling, an event-driven architecture, management of interaction flows, deployment using one or more language models (e.g., LLMs, VLMs, multimodal language models, etc.), sensory processing and action execution, interactive visual content, interactive agent animations, expectations actions and signaling, and/or other features.

Introduction. At a high level, an interactive agent (e.g., chatbot, voicebot, digital assistant, interactive avatar, non-player character, robot, etc.) that engages in conversational AI or other types of human-machine interactions may be authored and/or executed using an interactive agent platform. When designing such a platform and/or an interactive system that implements an interactive agent, it may be instructive to consider some possible features that can contribute to compelling human-machine interactions and interaction flows.

Multimodality is one factor that can contribute to compelling human-machine interactions. For example, when designing an interactive avatar experience, a designer may want to support many different output interaction modalities, or ways of interacting with a user. A designer may want their avatar to talk, make gestures, show something in a GUI, make sounds, or interact in other ways. Likewise, a designer may want to support different types of input interaction modalities, or ways for a user to interact with the system. For example, a designer may want to support detecting and responding when a user provides an answer to a question verbally, by selecting an item on a screen, or making a gesture like a thumbs up to confirm a choice. One possible implication of multimodality is that a designer may want flexibility in how interactions are temporarily aligned. For example, a designer may want an avatar to say something while performing a gesture, or may want to initiate a gesture at a specific moment when the avatar says something in particular. As such, it may be desirable to support different types of independently controllable interaction modalities.

Backchanneling is a useful tool in fostering effective human communication. It helps convey active listening and engagement, signaling to the speaker that their message is being heard and understood. This feedback loop makes the conversation smoother, helps build a connection, and encourages people to keep talking and sharing their thoughts. A designer may want their avatar to try to use backchanneling to make the avatar appear more human and interact more naturally, so it may be desirable to support backchanneling.

Some designers may want to support nonlinear interactions. Designers often try to avoid the perception of predictable, guided, or simplistic interactions, which can leave users feeling like they are following a predetermined or set course that lacks spontaneity or freedom. Even if a desired customer journey inherently incorporates some amount of linearity, it may be desirable to support interactions in a way that users can break out of a strict logic.

Proactivity may be a helpful feature to implement. Many users these days are used to voice assistants, but the conversational pattern with these digital assistants is often very simplistic. The user initiates a conversation using a wake word and asks a question or provides a command. The voice assistant reacts to this prompt by directly performing the action, answering the question, or following up with a clarification question. While this interaction pattern might be efficient for retrieving information or setting a timer, it is not very engaging and is often unsuitable for more complex use cases. Instead, designers may want their avatars to be proactive, rephrasing questions if the user does not understand, guiding them back to some process if they are derailing the conversation, or providing alternative ways to finish a certain task. Proactivity can be very helpful in preventing interactions from going stale, where users disengage or do not know how to proceed in the conversation.

Some designers may want to leverage the power of language models (e.g., LLMs, VLMs, etc.). For example, a designer may want an avatar or chatbot to use an LLM to make its interactions with the user more natural, and adapt to the current interaction context. Some LLM uses might help avoid common pitfalls in avatar or chatbot experiences, like when a bot repeats the same answers over and over again, or when simple questions do not elicit the intended response. In an interactive avatar setting, a designer may want to use LLMs to help create verbal and/or non-verbal responses such as gestures or facial expressions, or may even want to use LLMs to help provide useful information on the GUI. As such, it may be desirable to support a variety of LLM uses.

Interaction modeling language and interaction categorization schema. Generally, human-machine interactions and related events may be represented and communicated within an interactive system, or an interactive agent platform that hosts development and/or deployment of an interactive system, in various ways.

One possible way to represent and/or communicate interactions is by using an interaction modeling language that specifies user and/or bot interactions and related events using a standardized interaction categorization schema. Existing dialog management techniques such as flow charts, state machines, and frame-based systems are not equipped to model highly flexible conversational flows like the ones that might be expected out of a realistic interactive avatar. By contrast, a standardized interaction categorization schema may provide a semantically meaningful way to categorize, specify, and communicate desired interactions and interactions flows. For example, an interactive agent platform may provide an interpreter or compiler that interprets or executes code written in the interaction modeling language, and a designer may provide customized code written in the interaction modeling language for the interpreter to execute. An interaction modeling language that uses a standardized interaction categorization schema promotes a number of technological benefits, from making the designer's life easier by reducing their cognitive load in developing an interactive system, to supporting a variety of interactions or features (such as those described above) from which a designer may draw upon to customize an interactive system, to promoting interoperability by standardizing the representation of interactions.

Consider a possible goal of reducing a developer's cognitive load when writing code that implements an interactive system. Existing programming languages would require the developer to write functions that implement interactions using generic keywords and commands. However, some embodiments abstract out some lower-level programming in favor of a more semantically intuitive representation of an interaction: an interaction flow. Interactions usually occur in flows, so an interaction modeling language may be used to define a flow of interactions. A flow might be considered analogous to a function, but may be composed with primitives comprising semantically meaningfully (e.g., natural language) keywords and commands that specify events (e.g., something happened) and actions (e.g., something needs to happen) using an interaction categorization schema. As such, an interaction flow may be used as a mechanism to instruct an interpreter (e.g., an event-driven state machine) what actions or events to generate in response to a sequence of detected and/or executed human-machine interactions.

In some embodiments, the interaction categorization schema may classify interactions by standardized interaction modality (e.g., BotUpperBodyMotion) and/or corresponding standardized action category or type (e.g., BotPose, BotGesture) using standardized action keywords. The schema may support any number and type of interaction or method of communication (e.g., user interactions with the system, bot interactions with the user, bot expectation actions and expectation signaling, scene actions, etc.). The state of an action (e.g., an observed state of a user action, a current state of a bot or scene action) and/or a command to change the state of a bot or scene action may be represented using standardized event keywords, commands, and/or syntax. For example, action events (e.g., a user or bot action started or stopped) may be represented using an event specifier with standardized syntax (e.g., event name and/or identifier comprising a keyword identifying the standardized category or type of action, and a specifier of the user or bot action state).

In some embodiments, the interaction modeling language may use keywords, commands, and/or syntax that incorporates or categorizes standardized modalities, types of actions, and/or event syntax defined by an interaction categorization schema. For example, an instruction line in a flow may include an event trigger (e.g., using a keyword such as send) that causes the interpreter to generate a specified event when some specified condition is satisfied (e.g., events representing commands to execute a bot action may trigger the action to be executed, events representing a change in the state of a detected user action may trigger a corresponding bot action), or an event matcher (e.g., using a keyword such as match) that causes the interpreter to interrupt the flow and monitor for a specified event prior to resuming the flow. The event trigger and event matcher may specify corresponding trigger and match conditions using an event specifier comprising a standardized event name or identifier (e.g., a keyword identifying a standardized category or type of action paired with a corresponding action state specifier or command to change an action state) and an argument specifying one or more conditions that the specified event must meet (e.g., using predefined parameters and supported values, or a natural language description). In some embodiments, the interpreter may infer a specified action state (e.g., Finished) when an event specifier includes an action but omits the state (e.g., the name of the action may be specified as a shortcut to specify for completion of the action).

Take the UserSpeech modality and corresponding Utterance User Action as an example. Assume a user makes an utterance that is recognized by an interactive system. Possible examples of this type of action include the user typing into a text interface to interact with a bot or the user speaking to an interactive avatar. This action may be classified as a user utterance, and supported action events for this action may include UtteranceUserActionStarted (the user started to produce an utterance) or Utterance UserActionFinished (the user utterance has finished). An example flow instruction to wait for the user to say something in particular might be "match UtteranceUserActionFinished (text=" How are you? ", speed=" slow ", volume=" normal ")". In this example, the event identifier is a camel case keyword that concatenates the standardized action category (UtteranceUserAction) with a representation of the specified action state (Finished).

In some embodiments, an interaction modeling language and corresponding interpreter may support any number of keywords that serve to parallelize action and flow execution and matching (e.g., send, match, start, stop, await, activate). In contrast to conventional dialog modeling languages in which statements are always considered in a sequential order, some embodiments may support a keyword (e.g., start) that instructs the interpreter to start a specified action in a specified (e.g., standardized) action category or flow and continue iterating its parent flow without waiting for the action or child flow that was started to finish, some may support a keyword (e.g., stop) that instructs the interpreter to stop the action or child flow that was started, and some may support a keyword (e.g., await) that instructs the interpreter to wait for the action or child flow that was started to finish before advancing the parent flow. In some embodiments, the interpreter may implement some keywords (e.g., start, await) using other keywords (e.g., send, match) to send out or wait for an event to appear. In some implementations, once a flow has been started, the interpreter executes all actions in the specified flow up to the first match statement. Subsequently, when the statement is matched, the interpreter may execute the subsequent actions in the specified flow up to the next match statement or the end of the flow, repeating until the flow is finished.

In some scenarios, a designer may want a child flow to automatically restart upon completion. This may be useful for certain types of flows such as those that attempt to trigger some action that depends on a reoccurring event. As such, some embodiments may support a keyword (e.g., activate) that instructs the interpreter to automatically restart a flow upon completion. In some embodiments, if an activated flow does not contain an event matcher, the interpreter will only run the flow once but maintain it in an active state so any child flows will remain active as well.

Some embodiments may support a keyword that instructs the interpreter to finish a flow (e.g., return) or abort a flow (e.g., abort), and a flow may instruct the interpreter to determine and return some value. Since some embodiments support multiple active flows, some implementations of the interpreter start one top level, root, or main flow (e.g., at startup) that serves as the parent of all other flows. This hierarchy enables better abstraction and encapsulation capabilities than prior techniques. In some embodiments, the event matcher command may accept a specified name or identifier of a flow and a specified flow event (e.g., start, finished, failed, paused, resumed) as an argument, which the interpreter may use as an instruction to match a corresponding flow event.

As such, in some embodiments, all flows represent a corresponding interaction pattern. In some such embodiments, a flow may be used to model a bot intent or inferred user intent, which a designer may use to build more complex interaction patterns. In some such implementations, a flow effectively describes an expected interaction pattern. If the interpreter starts a flow, it may designate that flow as active and attempt to match the contained pattern of event matcher statements with events representing the ongoing interaction. Whenever the interpreter determines that a match statement is satisfied by an event, the interpreter may advance a corresponding flow head to the next match statement, executing all non-match statements in between. As such, the interpreter may be programmed to sequentially execute the instructions specified in a flow, generating any events specified by an event trigger, and stopping when a flow head reaches an event matcher, an exception, or the end of a flow. To illustrate how a flow might be used to implement various types of interaction patterns and features, consider the following example use cases.

Multimodal interactions. In some embodiments, one or more flows may specify a sequence of multimodal interactions. Whereas conventional chat bots use a turn-based dialog, an interactive avatar (e.g., an animated digital character) or other bot may support any number of interaction modalities and corresponding interaction channels to engage with the user, such as channels for character or bot actions (e.g., speech, gestures, postures, movement, vocal bursts, etc.), scene actions (e.g., two-dimensional (2D) GUI overlays, 3D scene interactions, visual effects, music, etc.), and user actions (e.g., speech, gesture, posture, movement, etc.). As such, a flow may specify a sequence of multimodal actions (e.g., different types of bot or user actions) using any number of supported interaction modalities and corresponding interaction channels.

For example, consider the following example flow that wraps a start bot utterance action command to improve readability and ease of programming:

flow bot say $utterance
        send BotUtteranceStartAction (action_id, "$utterance")
        match BotUtteranceActionFinished (action_id)

Now the start bot utterance action command may be triggered with an instruction that simply writes its name and specifies the desired utterance: bot say "Hello world". In this example, when the interpreter executes this instruction, it looks up the flow named "bot say" which defines an event trigger that generates an event that, when executed, will start the bot utterance action with the specified text (in this case, hello world), and an event matcher that waits for the bot utterance action to finish. Here is an example flow that similarly wraps a start bot gesture action command:

flow bot gesture $gesture
        send BotGestureStartAction (action_id, "$gesture")
        match BotGesture ActionFinished (action_id)

By defining a wrapper flow like this, a designer can make the bot show a gesture (e.g., trigger the start bot gesture action command) using an instruction that simply writes the name of the wrapper flow and specifies the desired gesture, e.g., bot gesture "Wave with both hands".

Conceptually, actions based on different modalities may occur sequentially or in parallel (e.g., waving and saying hello). As such, it may be desirable to provide a designer with precise temporal control over supported actions and their alignment with each other. For example, consider bot actions such as bot utterances and bot gestures. In some embodiments, a flow may specify calling these actions sequentially as follows:

bot say "Hello world"
   bot gesture "Wave with both hands"

In this example, since the wrapper flow for the bot say action includes an event matcher that tells the interpreter to wait for the action to finish before advancing the flow, the bot gesture will only start once the 'bot say' (or 'await bot say') action has finished.

Since these two actions are in two different modalities, some embodiments may permit them to execute simultaneously. One way to trigger the simultaneous execution of these two actions is to combine them in an "and" group (e.g., defined by a keyword such as "and") to start them in parallel:

bot say "Hello world"
      and bot gesture "Wave with both hands"

More complex action groups may be defined using an "or" group (e.g., defined by a keyword such as "or"), such as in the following example:

bot say "Hello world"
      and (bot gesture "Wave with both hands" or bot gesture "Smile")

As such, a designer may use an "or" action group to specify alternative actions. In this example, the resulting action will be either the bot saying "Hello world" and waving hands or saying "Hello world" and smiling. Another example way of executing two actions in parallel is using a keyword such as "start" to start two actions in parallel:

start bot say "Hello world"
   start bot gesture "Wave with both hands"

In some implementations of these examples, the interpreter will not wait for either action to finish before continuing to the next statement. In order to explicitly wait for a started action to finish, a flow may specify a "match" statement on the finished event of the previously started action, as in the following example:

start bot say "Hello world" as $action
   match $action.Finished ( )

Using an example flow like this, a designer may limit the lifetime of an action by associating it with the end of another action using a keyword such as "stop" to stop an action. For example, the following example would stop the bot gesturing when it is finished talking.

start bot say "Hello world" as $action_1
      and bot gesture "Wave with both hands" $action_2
   match $action_1.Finished ( )
   stop $action_2

The foregoing examples focused on actions initiated by a bot. However, in order to provide meaningful interaction with a user, it may be desirable to react to user actions. For example, consider the following example flow that wraps an event matcher for an event indicating a user utterance action event has finished:

flow user said $text
      match UtteranceUserAction.Finished (final_transcript=$text)

Now, this flow wrapper (or the wrapped event matcher) may be used to instruct a flow to wait for a specific user utterance:

user said "Hi there!"

Like some of the foregoing example bot actions, in some embodiments, a flow that incorporates an event matcher for this user action will only progress to the next statement once the user says the specified parameter value ("Hi there"). In some embodiments, an event matcher may trigger off groups of user actions, as in the following example:

user said "Hi there!"
      or user said "Hello"
      or user said "Hi"

In some embodiments, a flow that incorporates this example event matcher will wait for one of those user actions to happen before continuing to the next statement in the flow. Flows may additionally or alternatively use "and" groups to wait for multiple user actions to occur before continuing.

In some embodiments, a flow may be defined with an instruction comprising a keyword (e.g., "flow"), a name or identifier for the flow (e.g., "how are you reaction"), and some parameter (e.g., marked by a leading $ sign) for which the value may be specified and passed when calling the flow, as illustrated by the following example:

flow how are you reaction $text
      user said "How are you?"
      bot say $text In some embodiments, each flow defines an action scope. For example, if the interpreter triggers the initiation of any actions during a flow, and those active actions have not finished by the time the interpreter completes executing the flow, the interpreter may stop those active actions. Returning to the hello world example, in some embodiments, there is no need to stop the gesture action, since it will be stopped automatically when the flow finishes:

flow hello world example
      start bot say "Hello world" as $action_1
         and bot gesture "Wave with both hands" $action_2
      match $action_1.Finished ( )

Backchanneling. Conversations with conventional chat bots or avatars can often feel stiff or unnatural because they often enforce strict turn taking. To make conversations with an avatar feel more natural, some embodiments employ a technique called backchanneling in which an interactive system (e.g., an interactive avatar) provides feedback to the user while the user is talking or doing something detectable.

One way to implement backchanneling is with postures. For example, a designer may want an avatar to maintain a certain posture depending on whether the user or the avatar is speaking, or when the avatar is waiting for a response from the user. Here is an example flow that may be used to implement a listening posture:

flow bot listening posture
      while True
         user started talking
         start bot posture "listening" as $listening
         user said something
         send $istening. Stop ( )

In this example, "user started talking" is a flow wrapper for an event matcher for an event indicating the start of a user utterance action, and "user said something" is a flow wrapper for an event matcher for an event indicating a user utterance action was finished. With an example flow like this enabled in some implementations, the avatar will be listening (e.g., showing a listening animation) whenever the user starts talking, and will stop the animation when the user stops talking.

Another example might include various other postures such as "talking", "attentive", and/or "idle" to give the user feedback about the current state of the avatar, as in the following example:

```
flow manage bot postures
    start bot posture "idle" as $current_posture
    while True
        when user started talking
            send $current_posture.Stop ( )
            start bot posture "listening" as $current_posture
        orwhen bot started saying something
            send $current_posture.Stop ( )
            start bot posture "talking" as $current_posture
        orwhen bot said something
            send $current_posture.Stop ( )
            start bot posture "attentive" as $current_posture
```

With an example flow like this is enabled in some implementations, the avatar will have an idle posture until the user starts talking (in which case it adopts a listening posture), the avatar starts talking (in which case it adopts a talking posture), or the avatar just finished saying something (in which case it adopts an attentive posture).

In some embodiments, backchanneling may be implemented using short vocal bursts like "yes", "aha", or "hmm" while the user is talking. This can signal to the user that the avatar is listening, and can make the interaction seem much more natural. In some embodiments, this effect may be enhanced using non-verbal backchanneling in which the avatar reacts to certain things the user says, for example, with gestures. Here is an example flow implementing backchanneling using vocal burst and gestures:

```
flow bot reacts to sad things
    while True
        user mentioned something sad
        bot gesture "shake head" and bot say "Ohh"
flow bot reacts to nice things
    while True
        user mentioned something nice
        bot gesture "celebrate something going well" and bot
            say "Nice"
```

In some implementations, these two flows will create a short vocal burst and a small gesture whenever the user mentions something nice or something sad. In this example, unlike the "user said something" flow which waits for a completed utterance, the "user mentioned something" flow may be defined to match (and therefore react to) partial transcripts of what the user is saying during the time they are still talking.

Here is an example flow that uses these two bot backchanneling flows in a sequence of interactions:

```
start bot reacts to sad things
start bot reacts to nice things
start manage bot postures
bot say "How was your day?"
when user said r".*terribl|horribl|bad.*"
    bot say "I hope you are alright now?" and bot gesture
        "looking concerned to the user"
else
    bot say "Great. And any plans for the rest Of the day?"
user said something
bot say "Thanks for sharing"
```

Here, after activating the example bot backchanneling flows, the bot asks how the user's day was. If the user tells the bot about something bad or nice happening, the bot will react immediately with a vocal burst and a short animation. These are meant as a few high-level examples based on an example implementation of an interpreter, and other variations may be implemented within the scope of the present disclosure. Other examples and features of possible interaction modeling languages and interaction categorization schemas are described in more detail below.

Event-Driven Architecture and Interaction Modeling API. In some embodiments, a development and/or deployment platform for an interactive system (e.g., an interactive agent platform) may represent and/or communicate human-machine interactions and related events using a standardized interaction modeling API and/or an event-driven architecture. In some embodiments, the standardized interaction modeling API standardizes the way components represent multimodal interactions, enabling a high degree of interoperability between components and the applications that use them. In an example implementation, a standardized interaction modeling API serves as a common protocol in which components use a standardized interaction categorization schema to represent all activities by bots and users as actions in a standardized form, represent states of multimodal actions from users and bots as events in a standardized form, implement standardized mutually exclusive modalities that define how conflicts between standardized categories or types of actions are resolved (e.g. saying two things at the same time is not possible, while saying something and making a gesture at the same time may be possible), and/or implement standardized protocols for any number of standardized modalities and types of actions independent of implementation.

In some embodiments, an interactive agent platform that hosts development and/or deployment of an interactive system may implement an architectural pattern that separates the component(s) that implement the decision logic (e.g., the interpreter) from the component(s) that execute (e.g., multimodal) interactions. For example, an interaction manager may implement an interpreter for an interaction modeling language as a distinct event-driven component (e.g., an event-driven state machine). The interface for the interaction manager may use a standardized interaction modeling API that defines standardized forms for representing categories of actions, instances of actions in specified action categories, events, and context. Sensory server(s) for corresponding input interaction channel(s) may translate inputs or non-standard technical events into the standardized format and generate corresponding interaction modeling API events (also referred to as interaction modeling events). The interaction manager may process these incoming interaction modeling API events, determine what actions should be taken (e.g., based on code written in the interaction modeling language for the interpreter to execute), and generate (e.g., in response to an instruction in an interaction modeling language such as "send") outgoing interaction modeling API events representing commands to take some action. Action server(s) for corresponding output interaction channel(s) may interpret those outgoing interaction modeling API events and execute the corresponding commands. Decoupling these components enables interchangeability and interoperability, promoting development and innovation. For example, one component may be swapped out for another design, or another interaction channel may be connected, with little to no impact on the operability of the existing system.

This architectural pattern and API design may provide a purely event-driven, asynchronous way to handle multimodal interactions. Compared to prior solutions, in some embodiments, there is no notion of strict turn-taking (e.g., bot talks, user talks, bot talks). Instead, the participants in the interaction may engage in multimodal interactions at the same time, acting and reacting independently and concurrently to incoming events, thereby improving the realism of the human-machine interaction.

In some embodiments that use this architectural pattern, the interaction manager does not need to know what specific action servers are available within an interactive system. It may be sufficient that the interaction manager understands the supported modalities. Similarly, action and/or sensory servers may be independent of the interaction manager. As such, any of these components may be upgraded or replaced. As a result, the same platform and/or interaction manager may support different types of interactive systems that are all controlled through the same API and may be swapped in and out or customized for a given deployment. For example, one implementation could provide a text-based user interface, while another might provide a voice-based system, and a third implementation might provide a 2D/3D avatar.

Management of Multiple Flows. The examples above illustrated how an example interpreter may be programmed to iterate through any particular flow until reaching an event matcher. In some embodiments, a top-level flow may specify instruction(s) to activate any number of flows comprising any number of event matchers. As such, the interpreter may use any suitable data structure to keep track of active flows and corresponding event matchers (e.g., using a tree or other representation of nested flow relationships), and may employ an event-driven state machine that listens for various events and triggers corresponding actions specified in matching flows (with event matchers that match an incoming interaction modeling API event).

Since flows may specify human-machine interactions, a designer may want to activate multiple flows that specify conflicting interactions to be triggered under different conditions, and/or multiple flows that specify the same interaction—or different, but compatible interactions—to be triggered based on the same or similar condition. In some scenarios, multiple active flows that specify various interactions may be triggered by different conditions that might be satisfied by the same event. As such, the interpreter may sequentially process incoming interaction modeling API events (e.g., from a queue), and for each event, test the event matcher specified by each active flow for a match with the event. If there is one event matcher from an active flow that matches the event (a matching flow), the interpreter may advance that flow (e.g., generating outgoing interaction modeling API events to trigger actions). If there are multiple matching flows, the interpreter may determine whether or not the matching flows agree on an action. If they agree, the interpreter may advance both matching flows. If they disagree, the interpreter may apply conflict resolution to identify which action should take priority, advance the matching flow with the prioritized action, and abort the other matching flow(s) (e.g., since the interaction pattern represented by those flows will no longer apply). If there are no active flows that match an event, the interpreter may generate an internal event that matches and triggers a designated flow for handling unmatched or unhandled events, may run one or more unhandled event handlers, and/or may use some other technique for handling an unhandled event. After checking for matches and advancing flows, the interpreter may check the flow states for any flows that completed or aborted, and may stop any active flows that were activated by those completed or aborted flows (e.g., since the interaction pattern represented by those flows should no longer apply). As such, the interpreter may iterate through the events in the queue, advancing flows, performing conflict management to determine which interactions to execute, and generating outgoing interaction modeling API events to trigger those interactions.

As such, the interpreter may execute a primary processing loop that processes incoming interaction modeling API events and generates outgoing interaction modeling API events. In contrast to simple event-driven state machines, the interpreter may use a set of flow heads. A flow may be considered a program containing a sequence of instructions, and the flow heads may be considered instruction pointers that advance through the instructions and indicate the current position inside corresponding flows. Depending on the instruction, the interpreter may advance any given flow head to the next instruction, jump to another flow referenced by a label or other flow identifier, fork into multiple heads, merge multiple flow heads together, and/or otherwise. As such, the interpreter may use flow heads to build and maintain a hierarchy of flow heads. If a parent flow head in a branch of a hierarchy of flows or flow heads is stopped, paused, or resumed, the interpreter may stop, pause, or resume all the child flow heads of that parent flow head or branch. In some embodiments, any flow may specify any number of scopes that the interpreter may use to generate events that instruct a corresponding action server to limit the lifetime of started actions and flows within corresponding scopes.

In some embodiments, advancing flows may instruct the interpreter to generate interaction modeling API events that instruct some action. Additionally or alternatively, advancing flows may instruct the interpreter to generate interaction modeling API events that notify listeners that some event has occurred. As such, the interpreter may send out these events, and/or the interpreter may maintain an internal event queue, place these events in the internal event queue, and sequentially process any internal events in the internal event queue (e.g., testing active flows for matches with internal events) prior to advancing to process the next incoming interaction modeling API event.

Example Interpreter Language Model Uses. In some embodiments, an interaction modeling language and corresponding interpreter may support the use of natural language descriptions and the use of one or more language models (e.g., LLMs, VLMs, multimodal LLMs, etc.) to ease the cognitive load on the programmer and facilitate the development and deployment of more complex and nuanced human-machine interactions.

For example, each flow may be specified with a corresponding natural language description summarizing the interaction pattern represented by the flow. In some embodiments, the interpreter does not require a designer to specify these flow descriptions, but may make use of a flow description under certain circumstances (e.g., by an unknown event handler that prompts an LLM to determine whether an unmatched event that represents an unrecognized user intent semantically matches the natural language description of an active flow that represents a target user intent). As such, in some embodiments, the interpreter may parse one or more specified flows (e.g., at design time), identify whether any specified flows are missing a corresponding flow description, and if so, prompt an LLM to generate one based on the name and/or instructions of the flow. Additionally or alternatively, the interpreter may (e.g., prompt an LLM to) determine whether any specified flow descriptions are inconsistent with their corresponding flow descriptions, and if so, prompt an LLM to generate a new one (e.g., as a suggestion or for automatic replacement) based on the name and/or instructions of the flow.

In some embodiments, a designer may specify a flow description (e.g., a natural language description of what the flow should do) without the sequence of instructions, or may call a flow by name without defining it. As such, in some embodiments, the interpreter may parse one or more specified flows (e.g., at design time), identify whether any specified flows are missing a sequence of instructions, and if so, prompt an LLM to generate one (e.g., based on the name and/or description of the flow). For example, the interpreter may provide the LLM with one or more example flows, the specified name and/or description of the flow, and a prompt to complete the flow based on its name and/or description. These are just a few examples of possible ways an interpreter may invoke an LLM.

In an example implementation, flow instructions (e.g., including any encountered event triggers) may be executed until reaching an event matcher, at which point a flow may be interrupted. When there are no more flows to advance, an incoming or internal event may be processed by executing the event matcher in each interrupted flow, comparing the event to the target event parameters and parameter values specified by the event matcher's event specifier. Generally, any suitable matching technique may be used to determine whether an event matches an active event matcher for any of the active flows (e.g., comparing target event parameters and parameter values with those of the incoming or internal event to generate some representation of whether the event is a match).

Generally, a designer may specify an event to be matched or triggered using a name or identifier for the event and one or more target event parameters and/or parameter values. Target event parameters and/or parameter values may be specified explicitly using positional or named parameters, or as a natural language description (NLD) (e.g., docstring), which the interpreter may use to infer the target event parameters and/or values (e.g., from a single NLD of all target event parameters and values, from an NLD of an individual parameter value). Here are some example event specifiers for:

An event with named parameters and explicit values: StartUtteranceBotAction (text="How are you?", volume="whisper", speed="slow")

An event with positional parameters: StartUtteranceBotAction ("How are you?", "whisper", "slow")

An event with parameters specified using an NLD value: StartUtteranceBotAction (text=""""Asking how it is going"""", volume="whisper", speed="slow")

An event with a single NLD parameter: StartUtteranceBotAction (""""Ask the user how it is going very slowly and whispering"""")

In some embodiments that support event specifiers with NLDs, prior to executing an instruction (e.g., an event matcher or event trigger) that includes an event specifier, the interpreter may (e.g., at runtime) determine whether the instruction includes an NLD parameter, and if so, prompt an LLM to generate corresponding target event parameter(s) and/or parameter value(s). As such, the interpreter may execute the instruction (e.g., an event trigger or event matcher) using the generated target event parameter(s) and/or parameter value(s).

Additionally or alternatively, the interpreter may (e.g., at runtime) prompt an LLM to determine whether an (e.g., interaction modeling API) event matches the flow description of an active flow. Generally, an interaction modeling API event may represent a user interaction or intent, bot interaction or intent, scene interaction, or some other kind of event using a standardized interaction categorization schema that classifies actions, action events, event parameters, and/or parameter values using standardized (e.g., natural language, semantically meaningfully) keywords and/or commands. As such, the interpreter may execute an event matcher by determining whether the received action, action event, event parameters, and/or parameter values of an incoming or internal event and the event specified by the event matcher are a match (e.g., exact or fuzzy). Additionally or alternatively, the interpreter may prompt an LLM to determine whether the representation of an incoming or internal event matches the (e.g., specified or generated) flow description of an active flow. Depending on the implementation, an LLM can provide a more nuanced or semantic understanding of matching than conventional express or fuzzy match algorithms.

For example, assume the user makes some kind of a gesture that signifies an agreement, like making a thumbs up, nodding, or saying something informal like "yeah." A designer may have written a flow intending to match the scenario when the user manifests an agreement, but only provided a few examples of spoken responses for express matching. In this scenario, even if there are no express matches, an LLM may be able to determine that the standardized and semantically meaningful representation of a detected user response (e.g., GestureUserActionFinished ("thumbs up")) is a semantic match for a flow description such as "user manifests agreement." Here is another example in which a designer specifies a flow designed to match (via the "user has selected choice" and "user said" flow wrappers) an event in which the user selects choice B from a list of options:

flow user picked multimodality showcase
""""User picked the showcase (B).""""
user has selected choice "multimodality"
or user said "Show me the multimodality showcase"
or user said "multimodality"
or user said "showcase B"
or user said "second showcase"
or user said r"(?i) multimodality"

If the user selects choice B using some kind of interaction the designer did not anticipate, an LLM may be used to determine that a standardized representation of a detected user gesture matches the flow (e.g., a natural language description of a flow, a natural language description of a parameter, a natural language description of a parameter value, etc.). This way, a specified flow can match multiple gestures, textual responses, or other events that may not have been expressly specified by the designer.

In some implementations (e.g., in some embodiments in which the interpreter checks the event matcher for all active (e.g., interrupted) flows for a match and determines there are no active flows that match the incoming or internal event), the interpreter may (e.g., at runtime) prompt an LLM to determine whether an incoming or internal event and/or a representation of the recent interaction history matches the name and/or instruction(s) of an active flow. For example, some flows may represent target user intents, and the interpreter may implement an event handler for an unknown user action by providing an LLM with a sample interaction between the user and the bot, some possible target flows listing for target user intents, a corresponding list of the target user intents, the recent interaction history, the unknown user action, and a prompt for the LLM to predict whether the unknown user action matches one of the target user intents. As such, the interpreter may use an LLM to implement an unknown event handler that provides a more nuanced or semantic understanding of matching specified target user intents.

In some scenarios, there may not be a matching flow that defines a bot response to a particular user interaction. As such, in some implementations (e.g., in some embodiments in which the interpreter determines there are no active flows that match an incoming or internal event representing a user interaction), the interpreter may prompt an LLM to generate a flow (e.g., at runtime). For example, in some embodiments, the interpreter may first use an LLM to try to match an unknown incoming or internal event to the name, instruction(s), and/or other representation of one or more active flows listening for corresponding target user intents (and defining corresponding bot responses), and if the LLM determines there are no matching flows (target user intents), the interpreter may prompt (the same or some other) LLM to generate a responsive agent (e.g., bot) flow. In some embodiments, the interpreter may prompt the LLM to generate one or more intents as an intermediate step. For example, if the unknown event is a user action, the interpreter may apply any number of prompts to instruct the LLM to classify the unknown user action into a user intent, generate a responsive agent intent, and/or generate a flow implementing the responsive agent intent. By way of non-limiting example, the interpreter may implement an event handler for an unknown user action by providing an LLM with a sample interaction between the user and the bot, the recent interaction history, the unknown user action, and a prompt for the LLM to predict one or more intents (e.g., user, bot) and/or a prompt for the LLM to generate a corresponding flow. As such, the interpreter may use an LLM to implement an unknown event handler that intelligently responds to unknown events without the need for the designer to specify the code for the responsive flow.

Usually, neural networks operate like a black box, which serves as an obstacle to controlling generated responses. The lack of transparency makes it challenging to ensure generated content is accurate, appropriate, and ethical. However, using an LLM to autocomplete event parameters or parameter values, perform event matching, or generate flows using a standardized and structured interaction modeling language and/or interaction categorization schema helps impose structure and explainability in what the LLM is doing, enhancing the ability to control the LLM output. As such, embodiments that use an LLM to autocomplete event parameters or parameter values, perform event matching, or generate flows make the designer's life easier by providing an intuitive way to specify human-machine interactions and events to be matched or triggered, reducing their cognitive load in developing an interactive system, while protecting against unintended content generation.

Sensory Processing and Action Execution. Depending on the embodiment and the configuration, an interactive agent platform that hosts development and/or deployment of an interactive agent (e.g., chatbot, voicebot, digital assistant, interactive avatar, non-player character (NPC), digital human, robot, etc.) may support any number of input and output interaction channels. In some embodiments that decouple sensory processing, interaction decision-making, and action execution, the interactive agent platform may support a sensory server for each input interaction channel and an action server for each output interaction channel. Sensory server(s) for corresponding input interaction channel(s) may translate inputs or non-standard technical events into the standardized format and generate corresponding interaction modeling API events, an interaction manager may process these incoming interaction modeling API events and generate outgoing interaction modeling API events representing commands to take some action, and action server(s) for corresponding output interaction channel(s) may interpret those outgoing interaction modeling API events and execute the corresponding commands. Using an interaction modeling API for communication between these components enables the distribution of responsibilities to handle different types of input processing to different types of sensory servers, and responsibilities to different types of actions to different types of action servers. For example, each action server may be responsible for corresponding groups of actions and action events (e.g., associated with a common interaction modality), thereby avoiding the complexity of having to manage events associated with different interaction modalities.

Sensory and/or action servers may be implemented using a combination of asynchronous event loops and processes to ensure that multiple user sessions and system pipelines may be served in parallel. This architecture allows programmers to add different services that can handle different types of actions and events (corresponding to different types of interaction modalities) that are supported by the interaction modeling API actions. In some embodiments, an event gateway may be used to communicate and distribute events to corresponding components, whether through synchronous interactions (e.g., through a REST API, Google Remote Procedure Call (RPC), etc.) or asynchronous interactions (e.g., using a message or event broker). As such, each sensory server may send out interaction modeling API events to the event gateway for any incoming inputs or non-standard technical events, and the interaction manager may be subscribed or otherwise configured to pick up those events from the event gateway. The interaction manager may generate and forward outgoing interaction modeling API events to the event gateway, and each action server may be subscribed or otherwise configured to pick up those events it is responsible for executing (e.g., one interaction modality per action server).

In order to handle all supported actions for at least one interaction modality, an action server may be equipped with an action handler for each standardized action category and/or action event supported by the interaction modeling language and/or defined by the interaction categorization schema for a given interaction modality. For example, an action server may implement a chat service that handles all interaction modeling API events for bot utterance actions; an animation service that handles all interaction modeling API events for bot gesture actions; a graphical user interface (GUI) service that handles all interaction modeling API events instruct arrangements of visual information such as visual information scene actions, visual choice actions, and/or visual form actions; and/or a timer services that handles all interaction modeling API events for timer actions; to name a few examples.

Each action server may manage the lifecycle of all actions under its purview. Interaction modeling API events may specify commands for an action server to initiate, modify, or stop actions. As such, all events related to the same action may be represented using a common action identifier (e.g., action_uid) such that individual events associated with the same action identifier may represent different states in the lifecycle of a corresponding action. As such, an action server for a particular interaction modality may start a particular action (e.g., a bot gesture or utterance) and may track active actions and their corresponding states. Each action server may implement a modality policy that determines how to handle actions that are triggered during execution of another action of the same interaction modality (e.g., multiple sound effects may be permitted to run at the same time, but a new body animation may replace or temporarily override an active body animation). Some implementations may support commands that modify a running action, which may be useful for longer running actions (e.g., an avatar animation) that can adapt their behavior dynamically. For example, a nodding animation may be modified to change its speed depending on detected voice activity level. Some implementations may support commands that stop a running action, which may be used to proactively stop an action such as a gesture that could potentially run for some longer period of time. In some embodiments, an action server may synchronize action state changes with designated conditions (e.g., wait to start an action until a previous action of the same modality is completed, align the completion of two different actions in different modalities, align the start of one action with the end of some other action, etc.). When an action server implements an action state change, it may generate and forward an interaction modeling API event reflecting the update to the event gateway so any component that is listening or waiting for that state change can respond to it.

Interactive Visual GUI Elements. In some scenarios, a designer may want to customize an interactive system such as one with an interactive avatar that synchronizes conversational AI with supplemental visual content, such as a visual representation of related information (e.g., text, images), a choice the user is being prompted to make, or a field or form the user is being asked to complete.

As such, in some embodiments, an interaction modeling API may use a standardized interaction categorization schema that defines a standardized format (e.g., standardized and semantically meaningfully keywords) for specifying events related to a standardized category of interactive visual content actions (e.g., actions that instruct an overlay or other arrangement of visual content supplementing a conversation with an interactive agent), such as visual information scene actions, visual choice actions, and/or visual form actions. Some embodiments may incorporate an interaction modeling language that supports specifying visual designs using natural language descriptions (e.g. "attention-grabbing, bold and professional" for an alert message), and a corresponding interpreter may translate a specified description into a standardized representation of corresponding design elements (e.g., color schemes, typography, layout, images) and generate outgoing interaction modeling API events using the standardized format for interactive visual content action events. As such, an action server may implement a graphical user interface service that generates robust and visually compelling GUIs, which may be synchronized with verbal responses by conversational AI or otherwise contribute to a human-machine interaction.

In some embodiments, an interaction modeling API defines a way of representing a particular GUI (e.g., a configuration or arrangement of visual elements) using an interaction categorization schema that defines a standardized category of interactive visual content actions and corresponding events with payloads that specify standardized GUI elements. For example, the interaction categorization schema may categorize interactive visual content actions and/or GUI elements into semantically meaningful groups, such that an interpreter or action server may generate the content of a given GUI element (e.g., using an LLM to generate a block of text, retrieving or generating an image based on a specified description) based on the current context of the interaction. Each group of interactive visual content actions and/or GUI elements may be used to define a corresponding subspace of possible GUIs representing different ways a bot may visualize information for the user and/or different ways the user may interact with that information. An example interaction categorization schema may categorize interactive visual content actions as visual information scene actions, visual choice actions, and/or visual form actions.

Visual information scene actions may include displaying information to the user for information purposes (e.g., text with background information about a topic or product, an image illustrating a situation or problem), for example, without the expectation that the user might interact with the information in some other way apart from reading it. Visual choice actions may include displaying or interacting with visual elements that present a choice to the user and/or describe the type of choice (e.g., multiple choice vs. single choice, small or limited set of options vs. large set of options). Visual form actions may include displaying or interacting with visual elements that request some form or field input from the user (e.g., the avatar might want to ask the user to provide their email address) and/or describe the type of input request (e.g., email, address, signature).

In some embodiments, the interaction categorization schema may define a standardized format for specifying supported GUI interaction elements (e.g., button list, selectable option grid, input text field, hint carousel), such that (e.g., a corresponding action handler of) a sensory server may convert detected interactions with those interaction elements (e.g., a state when a button list element is released such as after a click or a touch, a state when a user types a character into an input field, a state when a user presses enter or clicks away from a text box) into standardized interaction modeling API events representing possible interactions with those elements in a standardized format. In some embodiments, there may be a sensory server for each of a plurality of different input interaction channels (e.g., GUI interactions, user gestures, speech input, etc.), with each sensory server configured to generate standardized interaction modeling API events representing detected interaction events in the standardized format. In some embodiments, a sensory server may convert detected interaction events (e.g., "user clicked button 'chai-latte', scrolled down and clicked button 'confirm'") to a corresponding standardized interaction-level event (e.g., "user chose the option 'Chai Latte'"). Standardized interaction-level events may depend on the type of interactive visual content action defined by the schema. Example standardized interaction-level events may include an event representing an update in a user's confirmation status and/or when the update was detected (e.g., if there is a single input requested as part of a VisualForm, an "enter" keyboard event may be translated to a "confirmed" status update), an event representing an update in a user's choice and/or when the update was detected (e.g., a detected selection of an item "chai-latte" from a multiple choice element list may be translated into a choice update), an event representing an update in a user's form input and/or when the update was detected, and/or others. As such, standardized interaction modeling API events may be generated and forwarded to an event gateway, and processed by the interpreter to generate outgoing interaction modeling API events which may specify commands to make responsive GUI updates, and the outgoing interaction modeling API events may be forwarded to the event gateway for execution by a corresponding action server.

In some embodiments, interaction modeling API events that specify commands to make GUI updates may be translated into corresponding GUIs and shown to the user. To accomplish this, in some embodiments, an action server implementing a GUI service may translate a standardized representation of a particular GUI specified by a particular interaction modeling API event into a (e.g., JavaScript Object Notation (JSON)) representation of a modular GUI configuration specifying blocks of content such as paragraphs, images, buttons, multiple-choice fields, and/or other types. As such, the GUI service may use these blocks of content to populate a visual layout for a GUI overlay (e.g., a HyperText Markup Language (HTML) layout that can be rendered in any modern web browser). For example, any number of template or shell visual layouts may define corresponding arrangements of various blocks of content, and the UI service may select a template or shell visual layout (e.g., based on which blocks of content have been generated or specified by the interaction modeling API event) and populate placeholders for those blocks in the template or shell with corresponding generated content. In some embodiments, various features of the template or shell visual layouts (e.g., the sizing or arrangement of blocks, look-and-feel options such as a color palette for a GUI overlay, etc.) may be customized. As such, a visual layout representing a GUI specified by an interaction modeling API event may be generated and presented (e.g., via a user interface server) to the user.

Taking an interactive avatar as an example, an animation service may be used to animate the avatar (as describe in more detail below), and a GUI service may be used to synchronize the representation of related visual elements (e.g., visual information scene, visual choices, visual forms). For example, the user's device screen may include some region that renders the avatar on a full web page (e.g., using as much of the height and width of a browser window as possible while keeping the avatar stream in the same aspect ratio), and the visual elements generated by the GUI service may be rendered in an overlay on top of the avatar stream. In an example embodiment, the avatar stream may remain in a fixed aspect ratio (e.g., 16:9), using padding around the stream as necessary to retain the aspect ratio. In some embodiments, the overlay may be retained at the same relative position on the screen regardless of the size of the stream. In some embodiments, the overlay may scale with the size of the avatar. In some embodiments, the overlay may be retained at a fixed configurable size relative to the size of the avatar (e.g., 10% of the width and 10% of the height of the avatar).

In some embodiments, various GUIs (e.g., pages of visual elements) may be configured as part of a stack from which GUI pages may be pushed and popped. This configuration may be particularly useful in the context of AI-driven interactions because the context during a series of interactions may change in a non-linear way. A GUI stack overlay may be used to ensure that the visual content on the GUI remains relevant throughout the series of interactions. These stacked GUIs may be made at least partially transparent to facilitate the visualization of stacked information, enabling conversational AI to combine GUIs or shuffle the stack at different stages of a conversation (e.g., the header of a stacked overlay may describe an overall customer journey such as "Support Ticket XYZ" while stacked pages within the overlay may represent different steps in the journey such as "Please enter your email"). In some embodiments, the GUI(s) may be part of a rendered 3D scene (e.g., a tablet computer that the avatar is holding), the GUI(s) may be 3D (e.g., the buttons may be rendered with corresponding depths), and/or otherwise. These are just a few examples, and other variations may be implemented within the scope of the present disclosure. For example, although the foregoing example is described in the context of a 2D GUI, those of ordinarily skill in the art will appreciate how to adapt the foregoing guidance to present an avatar and/or an overlay in augmented and/or virtual reality (AR/VR).

Interactive_Agent Animations. In some embodiments, interaction modeling API events that specify commands to make bot expressions, poses, gestures, or other interactions or movements may be generated (e.g., by the interpreter executing code written in an interaction modeling language) and translated into corresponding bot animations, and the bot animations may be presented to the user. More specifically, in some embodiments, an action server implementing an animation service may use a standardized representation of a target bot expression, pose, gesture, or other interaction or movement specified by a particular interaction modeling API event to identify and trigger or generate a corresponding animation.

Taking a standardized bot gesture action category (e.g., GestureBotAction) as an example type of bot action, in some embodiments, the animation service may handle all events related to actions in the GestureBotAction category, may apply a modality policy that overrides active gestures with any subsequently instructed gesture, and may use incoming StartGestureBotAction events to create a stack of actions when there are active GestureBotActions. As such, the animation service may implement an action state machine and action stack for all GestureBotActions, connect with an animation graph that implements a state machine of animation states and transitions between animations, and instruct the animation graph to set a corresponding state variable based on a command to change the state of an instance of a GestureBotAction (e.g., initialize, stop, or resume a gesture) represented by an interaction modeling API event.

In some embodiments, the animation graph may support some number of clips that animate an avatar or other bot making different expressions, poses, gestures, or other interactions or movements. As such, the animation service may receive a command to change a GestureBotAction state (e.g., initialize, stop, or resume a gesture) represented in a standardized interaction categorization schema to identify a corresponding supported animation clip. In some scenarios, a designer may want to specify a bot expression, pose, gesture, or other interaction or movement using a natural language description. As such, in some embodiments, the animation service may use a natural language description (e.g., specified by hand or generated by the interpreter using an LLM/VLM/etc., used as an argument to describe an instance of a standardized type of bot action in an interaction modeling API event) to select the best or generate an animation clip. For example, the animation service may generate or access a sentence embedding for the natural language description of the bot action (e.g., bot gesture), use it to perform a similarity search on sentence embeddings for descriptions of the available animations, and select an animation using some measure of similarity (e.g., nearest neighbor, within a threshold). In some embodiments, if the best match is within a threshold similarity (e.g., distance is below a designated threshold), that animation may be played. If no animation matches within the designated threshold, a fallback animation (e.g., a less specific version of the animation that matched best) may be played. If the animation service is unable to identify a suitable match, the animation service may generate and forward an interaction modeling API event indicating the gesture failed (e.g., ActionFinished (is_success=False, failure_reason="gesture not supported")) to the event gateway.

Expectation Actions and Expectation Signaling. In various scenarios, it may be beneficial to notify an interactive system or one of its components (e.g., a sensory server that controls input processing, an action server that implements bot actions) about which events an interaction manager (e.g., the interpreter) is expecting next from the user or the system. For example, when the interaction manager is expecting the user to start talking (e.g., an UtteranceUserActionStarted event), the interactive system may configure itself to listen or improve its listening capabilities (e.g., by turning down speaker volume, turning up microphone sensitivity, etc.). In noisy environments, an interactive system may be configured to turn off listening capabilities (e.g., automatic speech recognition) and only activate listening when the interaction manager is expecting the user to speak. In a chatbot system, a designer may want to display a thinking indicator when the chatbot (e.g., the interaction manager) is processing a request, and once it is expecting a response (e.g., a text answer), the interaction manager may communicate that expectation to an action server to update the display with a visual indication that the chatbot is waiting for a response. Furthermore, running computer vision algorithms is typically resource intensive. As such, the interaction manager may communicate a representation of which types of vision events it is currently expecting at any given point during an interaction, and the interactive system may disable or enable vision algorithms on the fly. Some example scenarios in which disabling and enabling computer vision may be useful include quick-response code (QR) code reading, object recognition, user movement detection, and more.

To facilitate these preparatory actions, expectations may be represented as instances of a standardized type of action (expectation actions) with corresponding expected states, and an interaction modeling API event that is associated with a particular instance of an expectation action may include one or more fields that represent an expectation that a specified target event will occur using a standardized interaction categorization schema that identifies the expectation as a supported type of action (e.g., ExpectationBotAction) and that represents a corresponding expectation event (e.g., indicating the state of the expectation such as start, stop, and finished) and the expected target event (e.g., UtteranceUserActionStarted) using standardized (e.g., natural language, semantically meaningfully) keywords and/or commands. Example standardized expectation events may include an event indicating that a bot expects a specified event on the event gateway in the near future (e.g., StartExpectationBotAction) which can instruct a sensory or action server to optimize its functionality (e.g., a sensory server responsible for processing camera frames may enable or disable certain vision algorithms depending on what the interaction manager is expecting); an event indicating that the sensory or action server acknowledges the bot expectation or confirming that the sensory or action server has updated its functionality in response to the expectation (e.g., ExpectationBotActionStarted); an event indicating the expectation has stopped (e.g., StopExpectationBotAction) which may occur when the expectation has been met (e.g. the event has been received) or something else happened to change the course of the interaction; an event indicating that the sensory or action server acknowledges the bot expectation is finished (e.g., ExpectationBotActionFinished), and/or others.

Additionally or alternatively to communicating (e.g., to a sensory or action server) that the interaction manager (e.g., the interpreter) is expecting certain events to happen, some embodiments signal to the user that the bot is waiting for an input (e.g., on a certain user interaction modality). As such, the standardized interaction categorization schema may classify this expectation signaling as a supported action type (e.g., ExpectationSignalingAction). This action may allow an interactive system to provide subtle (e.g., nonverbal) clues to the user about what the bot is expecting from the user (e.g., the avatar's ears could grow or the avatar could adopt a listening posture if it is waiting for user input).

For example, in a chatbot system, the user might be required to enter certain information before the interaction is considered complete (e.g., "Please enter your date of birth to confirm the order."). In such a situation, a designer may want the chatbot to signal to the user that it is actively waiting for the user to respond. As such, the designer may specify code that triggers generation of a StartExpectationSignalingBotAction (modality=UserSpeech) event. In another example, an interactive avatar may be waiting for a specific gesture from the user. In such a situation, a designer may want the avatar to actively communicate this with the user (e.g., by showing some specified animation). As such, the designer may specify code that triggers generation of a StartExpectationSignalingBotAction (modality=UserGesture) event. If there is a conflict with some other ongoing action in a corresponding output interaction channel (e.g., an active upper body animation), an action server may resolve the conflict based on a designated modality policy.

To facilitate these expectation signaling actions, an interaction modeling API event may represent expectation signaling events using a standardized interaction categorization schema that classifies the expectation signaling as a supported action type (e.g., ExpectationSignalingBotAction) and represents corresponding expectation signaling events (e.g., indicating the state of the expectation such as start, stop, finished) and target or input interaction modalities the bot is anticipating (e.g., UserSpeech) using standardized (e.g., natural language, semantically meaningfully) keywords and/or commands. Example standardized expectation signaling events may include an event indicating that a bot expects an event on a specified interaction modality on the event gateway in the near future (e.g., StartExpectationSignalingBotAction); an event indicating that the sensory or action server acknowledges the expectation signaling event or confirming that the sensory or action server has started actively waiting for an event on a specified interaction modality (e.g., ExpectationSignalingBotActionStarted); an event indicating the expectation has stopped (e.g., StopExpectationSignalingBotAction); an event indicating that the sensory or action server acknowledges the expectation is finished or has stopped actively waiting (e.g., ExpectationSignalingBotActionFinished), and/or others.

As such, the present techniques may be used to develop and/or deploy interactive agents such as bots or robots (e.g., chatbots, voicebots, digital assistants, interactive avatars, non-player characters, etc.) that engage in more complex, nuanced, multimodal, non-sequential, and/or realistic conversational AI and/or other types of human-machine interactions than in prior techniques. Furthermore, various embodiments that implement or support an interaction modeling language and/or interaction modeling API that uses a standardized interaction categorization schema promotes a number of technological benefits, from making the designer's life easier by reducing their cognitive load in developing an interactive system, to supporting a variety of interactions or features from which a designer may draw upon to customize an interactive system, to promoting interoperability by standardizing the representation of interactions.

With reference to FIG. 1, FIG. 1 is an example interactive system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. For example, in some embodiments, the system and methods described herein may be implemented using one or more generative language models (e.g., as described in FIGS. 28A-28C), one or more computing devices or components thereof (e.g., as described in FIG. 30), and/or one or more data centers or components thereof (e.g., as described in FIG. 31).

At a high level, the interactive system 100 may execute, control, or otherwise provide an interactive agent (e.g., chatbot, voicebot, digital assistant, interactive avatar, non-player character (NPC), digital human, interactive television or other appliance, some other type of interactive robot, etc.). Some example interactive systems that may provide an interactive agent include a digital kiosk, automotive infotainment system, digital assistant platform, smart television or other smart appliance, video game or animation environment, virtual or augmented reality environment, videoconference system, and/or others. FIG. 1 illustrates an example implementation in which a client device 101 (e.g., a smart phone, tablet, smart television, gaming console, digital kiosk, etc.) provides an interface for human-machine interaction via any number and type of interaction channels, one or more sensory server(s) 160 translate inputs into (e.g., standardized interaction modeling API) events representing detected interaction states, an interaction manager 190 determines what actions the interactive agent should take and generates (e.g., standardized interaction modeling API) events representing corresponding commands, and one or more action server(s) 170 interpret those commands and trigger the interactive agent to take corresponding actions via corresponding interaction channel(s).

Figure 30:
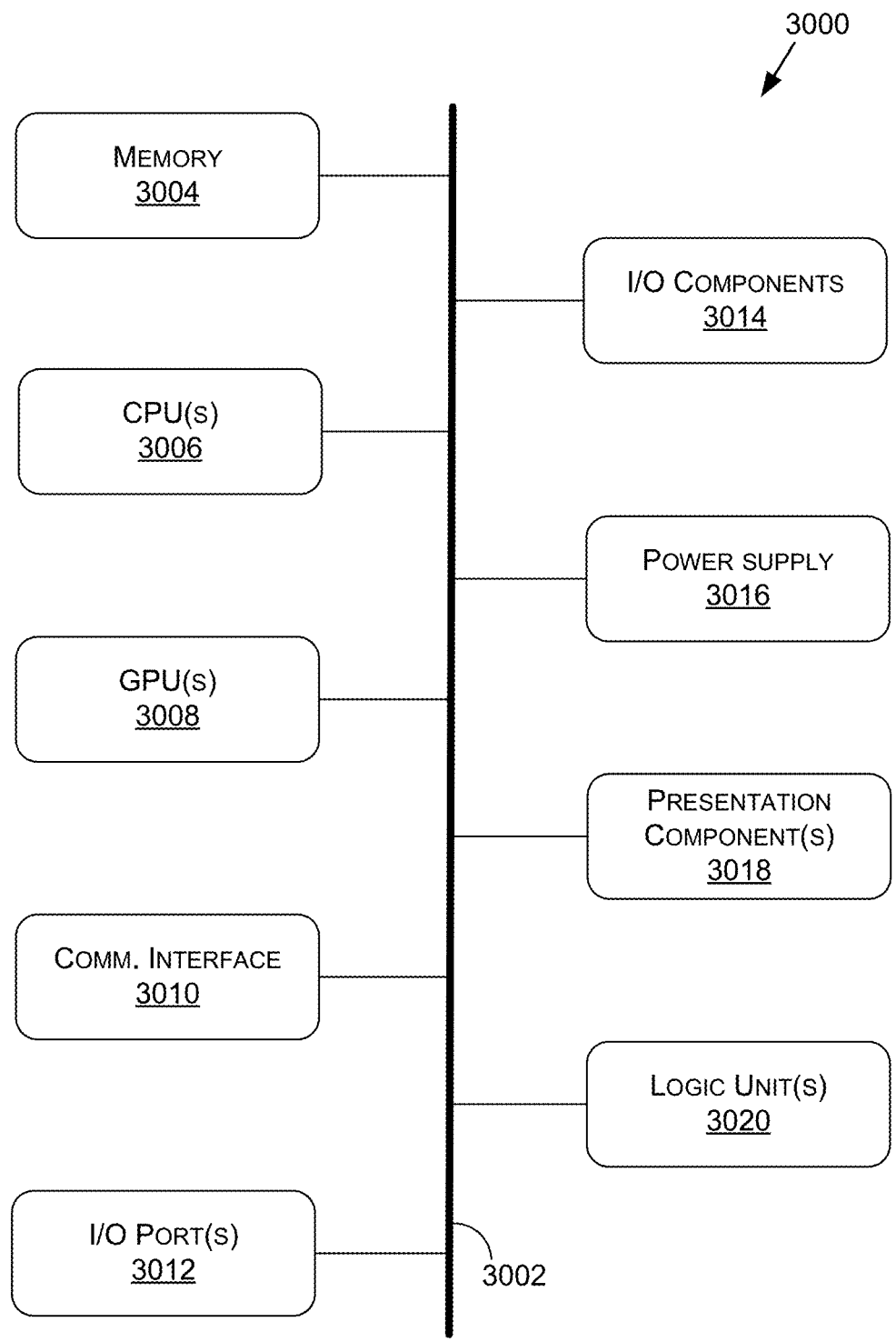
FIG. 30 is a block diagram of an example computing device suitable for use in implementing some embodiments of the present disclosure.

Depending on the implementation, the components of FIG. 1 may be implemented on any number of physical machines (e.g., which may include similar components, features, and/or functionality to the example computing device 3000 of FIG. 30). Take a digital kiosk as an example. In some embodiments, the physical kiosk may correspond to the client device 101, which connects to one or more remotely hosted components. In some embodiments, some or all of the components in FIG. 1 may be implemented as corresponding microservices and/or physical devices, deployed in a cluster of nodes in a data center (e.g., which may include similar components, features, and/or functionality to the example data center 3100 of FIG. 31), on one or more edge devices, on dedicated hardware, and/or otherwise. In some implementations, some or all the components run locally on some physical machine (e.g., on a digital kiosk, a robot, or some other interactive system) with various types of interface hardware managed by an operating system, firmware, and/or other software. In some such embodiments, the client device 101 corresponds to the various hardware interfaces, and some or all the other components in FIG. 1 (e.g., the sensory server(s) 160, action server(s) 170, interaction manager 190, etc.) represent functionality of the operating system, firmware, and/or other software that sends commands or requests to the various hardware interfaces.

In an example virtual or augmented reality environment, the components illustrated in FIG. 1 may be implemented on a local device (e.g., an AR/VR headset, a smart phone running an VR/AR application), a cloud server, an edge computing device, dedicated hardware, and/or otherwise. In some embodiments, there is one sensory server per input interaction channel (e.g., one sensory server to process video input, one to process audio input, one to process touch input), and/or one action server per output interaction channel (e.g., one action server to process bot animations, one to process bot speech, one to process interactive visual content). In some implementations, some or all sensory servers 160 and/or action servers 170 are consolidated into a single machine and/or microservice that handles corresponding interaction channels using corresponding services. These are just meant as a few examples, and other configurations and implementations are possible within the scope of the present disclosure.

In some embodiments, some or all the components illustrated in FIG. 1 are part of, or are hosted at least in part by, a development and/or deployment platform for an interactive system (e.g., an interactive agent platform). For example, a platform such as NVIDIA® OMNIVERSE® (and/or another platform or system, such as those that use universal scene descriptor (USD) data formats—e.g., OpenUSD) may host infrastructure and various functionalities that provide a framework for developing and/or deploying interactive agents. The platform may provide various creation tools that enable users to create and customize interactive agents, a real-time rendering engine, integration with various services (e.g., computer vision, speech recognition, natural language understanding, avatar animation, speech generation, simulation software, recommendation engines), and/or other components. In some embodiments, some or all of these tools and/or the components illustrated in FIG. 1 are integrated into an application and processed in real time (e.g., using a framework for developing and deploying cloud-native applications, such as NVIDIA® Unified Cloud Services Tools). As such, some or all of these tools and/or the components illustrated in FIG. 1 may be deployed as microservices, and may be managed using a platform for orchestrating containerized applications (e.g., NVIDIA FLEET COMMAND™). Accordingly, in some embodiments, these tools and/or components may be used to customize and/or deploy the interactive system 100.

For example, in some embodiments, the interaction manager 190 may implement an interpreter for an interaction modeling language, and code that implements the decision logic for an interactive agent may be written in the interaction modeling language, loaded onto or otherwise accessed by the interaction manager 190, and executed by the interaction manager 190. Depending on the desired interactive agent, any number and type of interaction channel may be connected, configured, and supported by corresponding sensory server(s) 160 and/or action server(s) 170. As such, in some embodiments, a development and/or deployment platform may be used to host the interactive system 100, and the interactive system 100 may implement a (e.g., customizable) interactive agent.

At a high level, a user may operate or otherwise interact with the client device 101 or some other interactive system comprising any number of input and/or output interaction channels. By way of nonlimiting example, FIG. 1 illustrates a video input interaction channel comprising a camera (not illustrated) and a vision microservice 110 that uses any known computer vision technique to detect user gestures; an audio input interaction channel comprising a microphone (not illustrated) and a speech detection microservice 120 that uses any known speech detection and/or recognition technique to recognize user speech; a video output interaction channel comprising a display screen (not illustrated) and an animation microservice 140 that uses any known animation technique to animate a bot (e.g., bot poses, bot gestures, blend shapes, text-to-motion, text-to-animation); an audio output interaction channel comprising a speaker (not illustrated) and a speech generation microservice 150 that uses any known speech synthesis technique to synthesize bot speech; a graphical user interface (GUI) with a GUI input interaction channel that accepts user GUI input (e.g., touch, click), a GUI output interaction channel that displays interactive visual content, and a user interface server 130 that uses any known technique to manage and/or serve user interfaces to the GUI.

In an example flow through the interactive system 100 of FIG. 1, some representation of user input such as a gesture detected by the vision microservice 110, a voice command detected by the speech detection microservice 120, or a touch or click input detected by the UI server 130 may be forwarded to a corresponding one of the sensory server(s) 160 that is responsible for a corresponding interaction channel. As such, the sensory server(s) 160 may translate that user input into a standardized representation of a corresponding event and place the event on an event gateway 180. The event gateway 180 may be used to communicate and distribute events to corresponding components, whether through synchronous interactions (e.g., through a REST API, Google Remote Procedure Call (RPC), etc.) and/or asynchronous interactions (e.g., using a message or event broker). The interaction manager 190 may be subscribed or otherwise configured to pick up or receive those events from the event gateway 180. As such, the interaction manager 190 may process the events (e.g., using an event-driven state machine), determine what interactions to engage in, and generate and forward commands as corresponding events in a standardized representation to the event gateway 180. The action server(s) 170 responsible for corresponding interaction channel(s) may be subscribed or otherwise configured to pick up or receive those events it is responsible for executing from the event gateway 180. As such, the action server(s) 170 may execute, schedule, and/or otherwise handle events for corresponding interaction modality(s), interfacing with a corresponding service that controls a corresponding output interface. For example, depending on the instructed action, a corresponding one of the action server(s) 170 may schedule and trigger (e.g., the speech generation microservice 150 to generate) bot speech out an audio interface, (e.g., the animation microservice 140 to generate) a bot animation on a display screen or headset, (e.g., the UI server 130 to present) interactive visual content on a display screen or headset, and/or otherwise.

In some embodiments, the interactive system 100 represents and/or communicates human-machine interactions and related events using a standardized interaction modeling API and/or an event-driven architecture. In some embodiments, the standardized interaction modeling API standardizes the way components (e.g., the sensory server(s) 160, the action server(s) 170, the interaction manager 190) represent multimodal interactions. In an example implementation, a standardized interaction modeling API serves as a common protocol in which various components of the interactive system 100 use a standardized interaction categorization schema to represent all activities by bots, users, and/or the interactive system 100 as actions in a standardized form, represent states (e.g., of multimodal actions from users and bots) as events in a standardized form, support standardized mutually exclusive interaction modalities and define how conflicts between standardized categories or types of actions are resolved, and/or implement standardized protocols for any number of standardized modalities and action categories independent of implementation.

Figure 2:
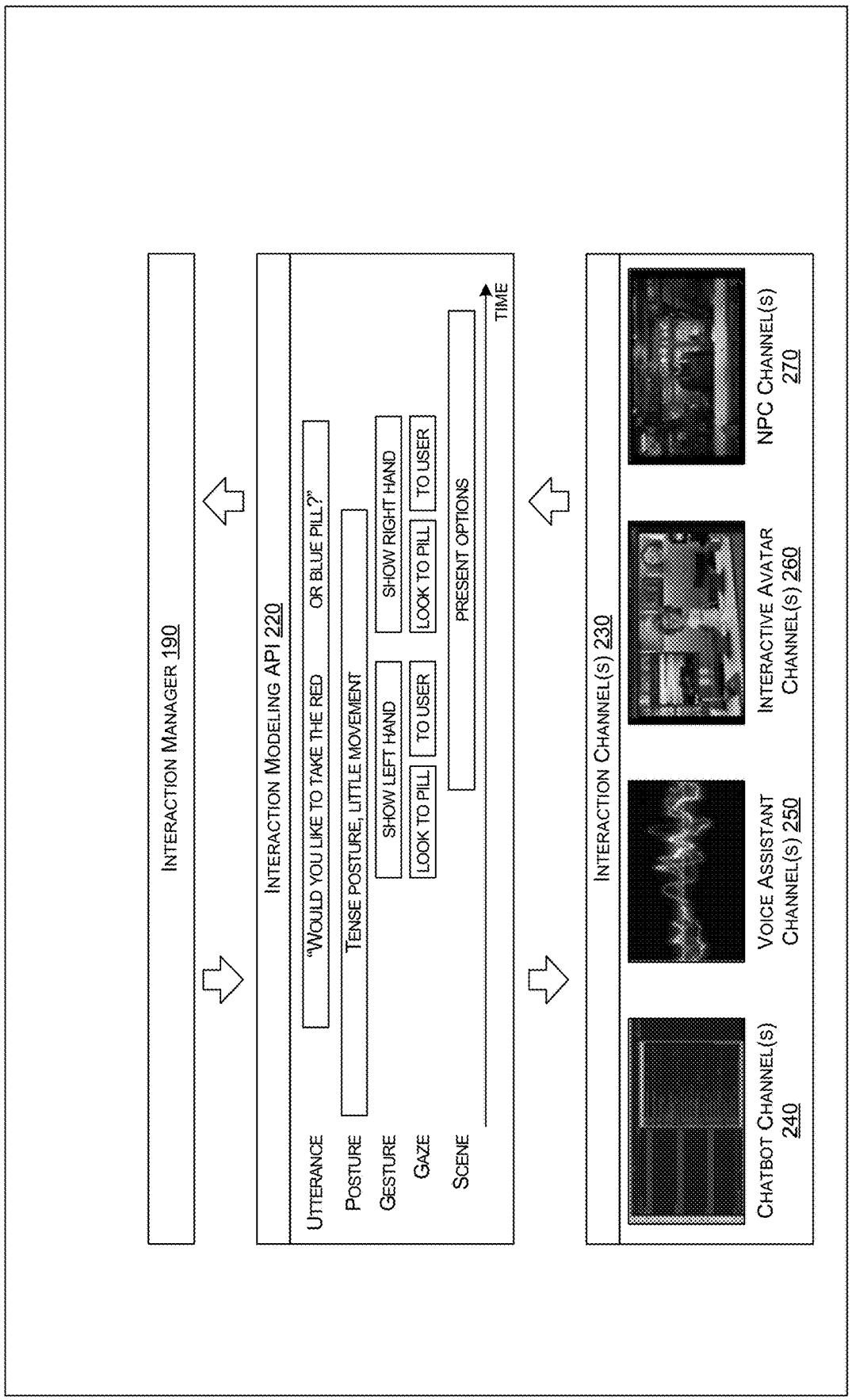
FIG. 2 illustrates an example interaction modeling API, in accordance with some embodiments of the present disclosure.

FIG. 2 illustrates an example interaction modeling API 220, in accordance with some embodiments of the present disclosure. Generally, different types of interactive systems may include different types of interaction channel(s) 230. For example, a chatbot may use a text interface that supports an input interaction channel for input text and an output channel for output text. A voice assistant may use an audio interface that supports an input interaction channel for input speech and an output channel for output speech. An interactive avatar may use a video input interface that supports an input interaction channel for detected gestures, an audio input interface that supports an input interaction channel for detected speech, a video output interface that supports an output interaction channel for avatar animations (e.g., postures, gestures), an audio output interface that supports an output interaction channel for avatar output speech, and/or a graphical user interface that supports an input interaction channel for touch inputs and/or an output channel for interactive visual content. A non-player character may use a game controller interface that supports an input interaction channel for controller inputs, a video output interface that supports an output interaction channel for non-player character animations and an audio output interface that supports an output interaction channel for non-player character output speech. These are meant simply as examples, and other types of interactive systems, interactive agents, and/or interaction channels may be implemented within the scope of the present disclosure.

FIG. 2 illustrates an example interaction modeling API 220 between the interaction manager 190 and the interaction channel(s) 230. In some embodiments, the interaction modeling API 220 defines a standardized format for specifying user and/or bot interactions, system events, and related events using a standardized interaction categorization schema. The interaction categorization schema may use standardized (e.g., semantically meaningful) keywords, commands, and/or syntax that incorporates or categorizes standardized interaction modalities, types of actions, and/or event syntax. Taking standardized interaction modalities as an example, the interaction categorization schema may be used to classify interactions (e.g., bot actions) by standardized interaction modality and/or corresponding standardized action category (e.g., bot utterance, bot posture, bot gesture, bot gaze) using standardized action keywords. FIG. 2 illustrates this using separate rows to represent events for different interaction modalities (e.g., bot utterance events, bot posture events, bot gesture events, bot gaze events, scene or interactive visual content events). Moreover, in some embodiments, the interaction modeling API 220 defines a standardized format for specifying changes in action states as corresponding events to support an event-driven architecture. FIG. 2 illustrates this using different start and stop times for different actions (e.g., the bot starts off with a tense posture, before initiating an utterance, and before finishing the utterance, initiates a gesture and gaze action, etc.).

In some embodiments, to promote configurability and interoperability, the interaction modeling API 220, a corresponding interaction modeling language supported by the interaction manager 190, and/or a corresponding interaction categorization schema supported by (e.g., sensory and/or action servers in) the interaction channel(s) 230 may provide a way to categorize, specify, and represent interactions for a variety of different interactive systems and corresponding interaction channels, which can enable designers to customize an interactive system using standardized components. FIG. 3 illustrates some features of example interactive systems which may be supported by an example interaction modeling API and/or an example interaction modeling language, in accordance with some embodiments of the present disclosure. In some embodiments, an interactive system relies on an interaction modeling API and/or an interaction modeling language that supports more interactions and action keywords than the interactive system itself utilizes. For example, an interaction modeling API and/or an interaction modeling language may support a keyword for a bot gesture (e.g., MakeGesture) even though an interactive system that uses the API and/or modeling language (e.g., a chatbot) may not make use of that type of interaction. However, by supporting a variety of multimodal interactions, an interaction modeling API and/or an interaction modeling language may support a variety of interactions or features from which a designer may draw upon to customize an interactive system, promoting interoperability by standardizing the representation of interactions, and making the designer's life easier by reducing their cognitive load in developing an interactive system.

In some embodiments, an interaction modeling API and/or an interaction modeling language may support standardized representations of actions and events for interaction modalities such as speech, gestures, emotions, movements, scenes, and/or others. In some embodiments, the interaction modeling API and/or language may define mutually exclusive interaction modalities, such that actions in different interaction modalities may be executed (e.g., by corresponding action servers) independently of one other (e.g., a bot may say something independently of gesturing). The possibility of simultaneous or conflicting actions in the same interaction modality may be addressed by (e.g., a corresponding action server) implementing a modality policy for that interaction modality. As such, an action server implementing that interaction modality may use a designated modality policy to determine how to execute, schedule, and/or otherwise handle events for that interaction modality. FIG. 4 illustrates some example modality policies, in accordance with some embodiments of the present disclosure. Accordingly, an interaction modeling API and/or an interaction modeling language may support an interaction categorization schema that defines standardized representations of supported interaction modalities and corresponding actions and events, such as the example interaction categorization schema illustrated in FIG. 5. As illustrated in this example, some modality groups (e.g., motion) may be subdivided into sets of interaction modalities that may execute independently of one another (e.g., a BotExpression may be animated on a BotFace modality independently of a BotPose on a BotUpperBody modality).

In interactive systems that support multimodal interactions, information may be exchanged between a user and an interactive system via multiple interaction modalities. Each interaction modality may be implemented via a corresponding interaction channel between the interactive system and the user. In some embodiments, an interaction categorization schema may categorize any given action as part of a single interaction modality, although depending on the interactive system, an action server for that interaction modality may map that action to multiple output interfaces (e.g., audio, video, GUI, etc.). For example, a BotUtterance action (instructing a bot to verbally communicate with a user) may be classified as part of a BotVoice modality. In an interactive system that represents the bot as a 3D avatar (e.g., on a 2D screen, on an AR or VR device), the BotVoice modality and/or BotUtterance action may trigger different types of outputs, such as audio out (e.g., synthesized speech), lip movement (e.g., lip synchronization to speech), and/or text on a user interface (e.g., utterance subtitles). In another example, a BotMovement action may be classified as part of a BotLowerBody modality and may trigger a lower body animation (e.g., a walking animation) and audio output (e.g., the sound of footsteps).

Figure 6:
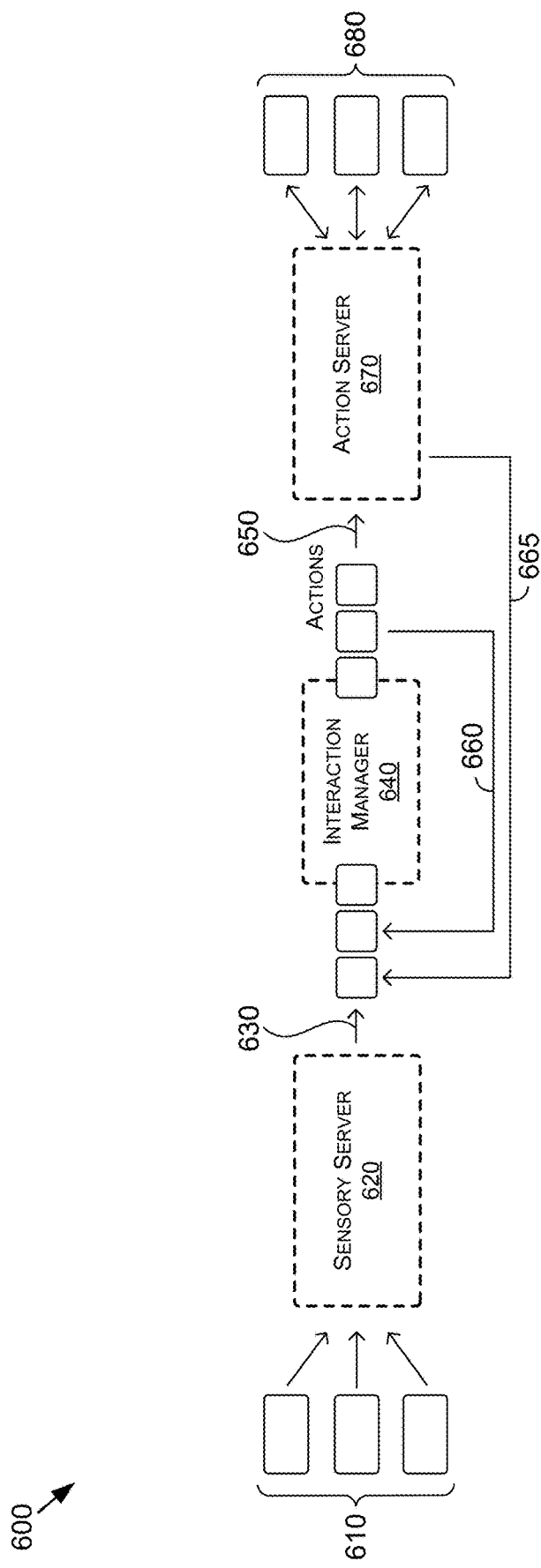
FIG. 6 illustrates an example event-driven interactive system, in accordance with some embodiments of the present disclosure.

Turning now to FIG. 6, FIG. 6 illustrates an example event-driven interactive system 600, in accordance with some embodiments of the present disclosure. FIG. 6 illustrates an example implementation of an architectural pattern that separates the component(s) that implement the decision logic that determines what actions to perform (e.g., the interaction manager 640) from the component(s) that handle the interactions (e.g., the sensor server 620 and the action server 670).

At a high level, detected input events 610 (e.g., representing some user input such as a detected gesture, voice command or a touch or click input; representing some detected feature or event associated with a user input such as a detected presence or absence of voice activity, detected presence or absence of typing, detected transcribed speech, detected change in volume or speed of typing; etc.) may be forwarded to a sensory server 620, and the sensory server 620 may translate the detected input events 610 into standardized input events 630. An interaction manager 640 may process the standardized input events 630 and generate events representing instructed bot actions (instructed bot action events 650), and an action server 670 may execute the actions represented by the instructed bot action events 650. In some embodiments, the interaction manager 640 may generate internal events 660 representing internal state changes (e.g., flow state changes) or instructed bot actions, and/or the action server 670 may generate events 665 representing confirmation of action state changes, any of which may be evaluated by the interaction manager 640 in determining what actions to take.

The interaction manager 640 (which may correspond with the interaction manager 190 of FIG. 1 and/or FIG. 2) may be responsible for deciding what actions the interactive system 600 should perform in response to user actions or other events (e.g., the standardized input events 630, the internal events 660, the events 665 representing confirmation of action state changes). The interaction manager 640 may (but need not) interact with the rest of the interactive system 600 (e.g., exclusively) through an event-driven mechanism. In practice, while the interaction manager 640 is busy processing an event (e.g., deciding on the next action), other parts of the interactive system 600 may generate other events. As such, depending on the implementation, the interaction manager 640 may process multiple events one by one or all at once. In a stateful approach, the interaction manager 640 may maintain the state or context of a user's interaction with the interactive system 600 across multiple interactions within a given session. In a stateless approach, the history of the state or context may be represented together with each new event. In some embodiments, there is no shared state between the interaction manager 640 and the rest of the interactive system 600.

Generally, the interactive system 600 may include any number of interaction managers (e.g., interaction manager 640). In some implementations, the interactive system 600 may include a primary interaction manager with internal or secondary interaction managers. In an example involving an interactive avatar experience, a primary interaction manager may manage the high-level flow for a human-machine interaction (e.g., the various stages like greeting, gathering data, providing data, get confirmation, etc.), and the primary interaction manager may hand over decision-making to more one or more secondary interaction managers when applicable (e.g., for a complex authentication flow, for an interactive question and answer scenario, etc.). In some implementations, the interactive system 600 may include multiple peer interaction managers that each handle different types of events. For example, one interaction manager may handle conversational logic (e.g., what the bot should say), and a second interaction manager may handle animating an avatar based on what it says.

In some embodiments, interactions between the interaction manager 640 and the rest of the interactive system 600 occurs via different types of (e.g., standardized) events, such as those representing detected input events (e.g., detected input events 630), instructed bot action events (e.g., instructed bot action events 650), and system or context events. Generally, detected input events may be used to represent any occurrence that may be relevant to an interaction, such as the user saying something (e.g., UserSaid), making a gesture (e.g., UserGesture), or clicking using a GUI element (e.g., UserSelection). Bot action events may define what the interactive system 600 should do, such as say something, play a sound, show something on a display, change an avatar's appearance or pose, call a third-party API, etc. Bot action events may represent transitions in the lifecycle of an action, for example, via an instruction to do something (e.g., StartAction), an indication of when the action has started (e.g., ActionStarted) or finished (e.g., ActionFinished), etc. System or context events may represent changes to associated interaction data contained in the interactive system 600 (e.g., ContextUpdate), such as username, user rights, selected product, device information, etc.

As such, the interaction manager 640 may evaluate various types of events (e.g., the standardized input events 630, internal events 660, events 665 representing confirmation of action state changes), determine which actions to perform, and generate corresponding instructed bot action events 650. As such, the action server 670 may execute the actions represented by the instructed bot action events 650. For example, the interaction manager 640 may decide that the interactive system 600 should say "Hello!" and, after this utterance (e.g., Say) action has finished, make a specific gesture (e.g., point to a screen and ask something). In some such examples, the interaction manager 640 may generate an event that specifies that the gesture should start (e.g., using keywords such as StartAction (MakeGesture)) when the interactive system 600 finishes saying hello (e.g., via a specified condition such as ActionFinished (Say)). As another example, the interaction manager 640 may decide to start a waving animation when a Say (hello) action has started, and stop the animation when Say (hello) has finished. In some such examples, the interaction manager 640 may specify conditions (e.g., ActionStarted (Say) and ActionFinished (Say)) when specifying corresponding instructions to start and stop the gesture (e.g., StartAction (MakeGesture (Wave)) and StopAction (MakeGesture (Wave))).

In some embodiments, the interaction manager 640 implements an interpreter or compiler that interprets or executes code written in an interaction modeling language that specifies user and/or bot interactions and related events using a standardized interaction categorization schema (such as the one illustrated in FIG. 5). Generally, the interpreter and interaction modeling language may support any number of keywords that serve to parallelize action and flow execution and matching (e.g., send, match, start, stop, await, activate). The interaction modeling language may be used to define a flow of interactions using primitives comprising semantically meaningfully (e.g., natural language) keywords and commands that specify events (e.g., something happened) and actions (e.g., something needs to happen) using the interaction categorization schema. In some embodiments, events (e.g., the standardized input events 630, internal events 660, events 665 representing confirmation of action state changes) may be represented using an event specifier with standardized syntax that is defined by the interaction categorization schema, interaction modeling language, and/or interaction modeling API and is supported by the interpreter. In some embodiments, an event may include (e.g., a payload that specifies) some representation of corresponding (e.g., standardized) fields and values, which the interpreter (and other components) may be capable of understanding. As such, the interpreter may execute code that implements an interaction flow in the interaction modeling language, where the interaction flow may instruct the interpreter what actions or events to generate in response to which events.

For example, an event may be represented and/or communicated within the interactive system 600 in various ways. By way of nonlimiting example, an event (e.g., payload) may include fields that specify or encode values representing an action type (e.g., identifying a standardized interaction modality or corresponding action type such as UserSaid), an action state (e.g., an observed state of a user action such as Finished, a current or acknowledged state of a bot or scene action such as Started, an instructed state of a bot or scene action such as Start), detected or instructed action content (e.g., transcribed or instructed speech such as "hello", a description of detected or instructed gesture, a description of a detected or instructed pose or expression, etc.), a unique identifier (UID) to identify the event, a timestamp (e.g., representing when the event was created, when an action was updated), a unique source identifier identifying the source of the event, one or more tags (e.g., specifying the event was generated as part of a particular stream or session, or associated with a particular user or account), context, and/or other properties or information.

In some embodiments, each action may be identified by a unique identifier (action_uid), and all events related to the same action may reference the same action_uid. As such, individual events referencing the same action_uid may serve to represent the lifecycle of a corresponding action from start to finish (e.g., including updated action states in between). In some embodiments, the component sending out StartAction and ActionStarted events may generate the action_uid for new instances of an action, and the specific component involved may depend on the type of action (e.g., bot vs. user action). For example, the interaction manager 640 may be responsible for generating the action_uid for new instances of bot actions that are started by the interaction manager 640, and the sensory server 620 may be responsible for generating the action_uid for new instances of observed user actions. As such, individual events may be associated with a corresponding instance of a particular type of action.

Taking an example interaction categorization schema such as the one illustrated in FIG. 5 as an example, actions may be classified into corresponding interaction modalities such as speech, gestures, emotions, movements, scenes, and/or others. Taking speech as an example, the interactive system 600 may support various events and actions related to dialog management using the speech modality. For example, the user may use a UserSpeech modality (e.g., via a UserUtterance action), or a bot provided by the interactive system 600 may use a BotSpeech modality (e.g., via a BotUtterance action). In an example user utterance action, the user may make an utterance that is recognized by the interactive system 600. Examples of this action include the user typing into a text interface to interact with the bot or the user speaking to an interactive avatar. Examples of possible events associated with this action include Utterance UserActionStarted, StopUtteranceUserAction (e.g., instructing the action server 670 to decrease automatic speech recognition hold time)), UtteranceUserActionTranscriptUpdated (e.g., providing updated transcripts during an UtteranceUserAction), UtteranceUserActionIntensityUpdated (e.g., providing detected speaking intensity level, typing rate, variation in volume or pitch, etc.), UtteranceUserActionFinished (e.g., providing a final transcript), and/or others.

In an example bot utterance action, a bot may produce an utterance (e.g., saying something) to the user via some form of verbal communication (e.g., via a chat interface, voice interface, brain-to-machine communication, etc.). Examples of possible events associated with this action include StartUtteranceBotAction (e.g., instructing the bot to produce an utterance, with a payload that may include a transcript of the instructed utterance of the bot, a representation of intensity such as speaking intensity level, output text rate, variation in volume or pitch, etc.), UtteranceBotActionStarted (e.g., indicating the bot has begun producing an utterance), ChangeUtteranceBotAction (e.g., instructing an adjustment to the volume or other property once the action has already begun), UtteranceBotActionScriptUpdated (e.g., providing updated transcripts during an UtteranceBotAction), StopUtteranceBotAction (e.g., instructing the bot utterance to stop), UtteranceBotActionFinished (e.g., acknowledging or reporting the bot utterance is finished, for example, because it was completed or due to the user stopping the utterance), and/or others.

Taking motion as an example, the interactive system 600 may support various events and actions related to the motion modality. Motion actions may represent movements or sets of movements that have a designated meaning. For example, the user may make a gesture or pose detected using computer vision, or a bot provided by the interactive system 600 may make a gesture or pose. In some embodiments, the user and/or the bot may use any suitable motion modality (e.g., face, upper body, lower body). In some embodiments, these modalities may be governed by an "override" modality policy, which the action server 670 may interpret as an instruction to handle concurrent actions by temporarily overriding a currently running action with a new action that has been started. By way of nonlimiting example, if the interaction manager 640 starts a BotPosture ("folded arms") action instructing an avatar to keeps its arm folded until the action is stopped, and two seconds later the interaction manager 640 starts a BotGesture ("wave") action, the action server 670 may execute the wave action by overriding the "folded arms" posture with the wave action (e.g., so the avatar waves at user). Once the wave action has finished, the action server 670 may return the avatar to the "folded arms" posture (e.g., the overwritten action is resumed).

In an example facial expression bot action, a corresponding event may instruct a bot to make a facial expression (e.g., a smiley in a text message of a chatbot, a facial expression of a digital avatar in an interactive avatar experience) using a specified expression or emotion (e.g., happiness, surprise, contempt, sadness, fear, disgust, anger, etc.). Examples of possible events associated with this action include StartExpressBotAction (e.g., instructing a change in bot facial expression, specifying the type of expression), ExpressionBotActionStarted (e.g., indicating the bot has started the action), StopExpressBotAction (e.g., instructing the bot to stop the facial expression), ExpressionBotActionFinished (e.g., indicating the bot has stopped the facial expression) and/or otherwise.

In some embodiments, the interactive system 600 may support facial expression user actions and corresponding events representing detected user expressions. Examples of possible events associated with this action include ExpressionUserActionStarted (e.g., indicating a user's facial expression was detected, including a representation of the content of the expression, such as happy, surprise, contempt, sad, fear, disgust, anger, etc.) and ExpressionUserActionFinished (e.g., indicating the user's detected facial expression returned to a neutral expression).

In an example gesture bot action, a corresponding event may instruct a bot to make a specified gesture. In some embodiments, events associated with this action may include a payload that includes a natural language description of the gesture, which may include a base gesture, one or more gesture modifiers, and/or other characteristics. Example base gestures include talk, idle (e.g., spontaneous physical movement or action during a period of inactivity), affirm (e.g., a non-verbal cue or action that indicates agreement, confirmation, or affirmation), negate (e.g., a non-verbal cue or action that indicates disagreement, contradiction, or refusal), attract (e.g., a specific movement, action, or behavior designed to capture the attention of a user or audience and draw them towards a particular object, location, or activity), and/or others. Example hierarchies for some base gestures include: talk à emotion (e.g., "talking excitedly"), idle à agitation level (e.g., "idle nervously"), attract à intensity (e.g., "attract subtly"). Examples of possible events associated with this action may include StartGestureBotAction, GestureBotActionStarted, StopGestureBotAction, GestureBotActionFinished, and/or others.

In some embodiments, the interactive system 600 may support gesture user actions and corresponding events representing detected user gestures. Examples of possible events associated with this action include GestureUserActionStarted (e.g., indicating a user's gesture was detected, including a representation of the content of the gesture) and GestureUserActionFinished (e.g., indicating the completion of the user's gesture was detected).

In an example bot position change or bot movement action (e.g., on the BotLowerBody motion modality), a corresponding event may instruct the bot to move to a specified position (e.g., on a screen, in a simulated or virtual environment). A specified position may include a base position, one or more position modifiers, and/or other characteristics. In an example implementation, supported base positions may include front and back, and supported position modifiers may include left and right. Examples of possible events associated with this action include StartPositionChangeBotAction (e.g., identifying a specified position for the bot to move to) and PositionChangeBotActionFinished.

In an example user position change or user movement action (e.g., on the BotLowerBody motion modality), a corresponding event may indicate a detected position change of the user's lower body. Examples of possible events associated with this action include PositionChange UserAction (e.g., indicating a detected user movement has begun, including a representation of the direction or character of the detected movement such as active, approaching, passive, leave, sideways, etc.); PositionChangeUserActionDirectionUpdated (e.g., indicating when the user changes direction during a detected movement), PositionChangeUserActionFinished (e.g., indicating the detected movement has completed).

In some embodiments, the interactive system 600 supports interactive visual content actions and events representing the presentation and/or interaction with different types of visual information (e.g., in a 2D or 3D interface). Example interactive visual content actions (also referred to as visual actions) include visual choice actions, visual information scene actions, and visual form actions.

In an example visual choice action, a corresponding event may instruct visualization of a choice with which the user may interact. The interactive system 600 may support different types of interactions with a visual choice (e.g., via presenting a website on a display that accepts a touch or click option, accepting a voice input selecting an option). For example, a StartVisualChoiseSceneAction event may include a payload with a prompt describing the choice to be offered to the user; an image describing what should be shown to the user, one or more support prompts that support or guide the user in making a choice (e.g., "Just say 'Yes' or 'No' to continue"), or recommend a choice ("I can recommend the Cheese Burger"); a list of options for the user to choose from (e.g., each option may have a corresponding image); a choice type ("selection," "search," etc.); and/or an indication of whether to permit multiple choices. Other examples of possible events associated with this action include a VisualChoiceSceneActionUpdated event (e.g., indicating a detected user interaction with a choice presented in the scene when the user not yet confirmed the choice), Stop VisualChoiceSceneAction (e.g., instructing the visual choice to be removed), VisualChoiceSceneActionFinished (e.g., indicating a final confirmed choice), and/or others.

In an example visual information scene action, a corresponding event may instruct visualization of specified information for the user. The visual information scene action may be used to show the user detailed information about a particular topic associated with the interaction. For example, if the user is interested in the details about a specified or displayed product or service, a visual information scene action may instruct the presentation of information about that product or service. Examples of possible events associated with this type of action include StartVisualInformationSceneAction (e.g., instructing visualization; specifying a description of content to visualize; specifying one or more blocks of content to visualization such as a title, summary of content, and/or a description of one or more images to visualize; one or more support prompts, etc.); VisualInformationSceneActionStarted (e.g., indicating the visual information scene action has started), StopVisualInformationSceneAction (e.g., instructing the visualization to stop), VisualInformationSceneActionFinished (e.g., indicating the user closed the visualization or the visual information scene action was stopped), and/or others.

In an example visual form action, a corresponding event may instruct visualization of a specified visual form with one or more form fields (e.g., email, address, name, etc.) for the user to complete. Examples of possible events associated with this type of action include StartVisualFormSceneAction (e.g., instructing visualization; specifying one or more inputs, a prompt for the user, one or more support prompts, one or more images, etc.), VisualFormSceneActionStarted (e.g., indicating the user has started entering information into the form), VisualFormSceneActionInputUpdated (e.g., indicating the user has entered information into the form but has not yet confirmed the choice), Stop VisualFormSceneAction (e.g., instructing the visualization of the form to stop), VisualFormSceneActionFinished (e.g., indicating the user confirmed or canceled the form input), and/or others.

In some embodiments, the interactive system 600 may support actions and events representing various aspects of the scene in which the human-machine interaction is taking place. For example, the interactive system 600 may support actions on a sound modality (e.g., specifying sound effects or background sounds), an object interaction modality (e.g., specifying interactions between a bot and virtual objects in the environment), a camera modality (e.g., specifying camera cuts, actions, transitions, etc.), a visual effects modality (e.g., specifying visual effects), a user presence modality (e.g., representing whether or not the user's presence is detected), and/or other examples. Examples such as these and others are described in more detail in U.S. Provisional Application No. 63/604,721, filed on Nov. 30, 2023, the contents of which are incorporated by reference in their entirety.

Having described some example events associated with standardized types of actions and interaction modalities, and some possible ways of representing such events and actions, the following discussion turns to some possible ways in which (e.g., an interpreter of) the interaction manager 640 may use a designated interaction flow (or simply a flow) (e.g., written in an interaction modeling language) to evaluate such events (e.g., incoming and/or queued instances of the standardized input events 630, the internal events 660, the events 665 representing confirmation of action state changes), determine what actions or events to generate in response, and generate corresponding events (e.g., outgoing instances of the instructed bot action events 650, the internal events 660).

Generally, a flow may specify instructions using primitives from an interaction modeling language comprising semantically meaningfully (e.g., natural language) keywords and commands that specify events (e.g., something happened) and actions (e.g., something needs to happen) using an interaction categorization schema. The state of an action (e.g., an observed state of a user action, a current state of a bot or scene action) and/or a command to change the state of a bot or scene action may be represented using standardized event keywords, commands, and/or syntax. For example, action events (e.g., a user or bot action started or stopped) may be represented using an event specifier with standardized syntax (e.g., event name and/or identifier comprising a keyword identifying the standardized action category, and a specifier of the user or bot action state). An instruction line in a flow may include an event trigger (e.g., using a keyword such as send) that causes the interpreter to generate a specified event when some specified condition is satisfied (e.g., events representing commands to execute a bot action may trigger the action to be executed, events representing a change in user state may trigger a corresponding bot action), or an event matcher (e.g., using a keyword such as match) that causes the interpreter to interrupt the flow and monitor for a specified event prior to resuming the flow. The event trigger and event matcher may specify corresponding trigger and match conditions using an event specifier comprising a standardized event name or identifier (e.g., a keyword identifying a standardized action category paired with a corresponding action state specifier or command to change an action state) and an argument specifying one or more conditions that the specified event must meet (e.g., using predefined parameters and supported values, or a natural language description).

As such, (e.g., the interpreter of) the interaction manager 640 may be equipped with logic that interprets corresponding keywords, commands, and/or syntax such as these. In some embodiments, the interaction manager 640 may support any number of keywords that serve to parallelize action and flow execution and matching (e.g., any of the keywords described above, such as send, match, start, stop, await, activate, return, abort, and/or others). As such, the interaction manager 640 may be programmed to sequentially execute the instructions specified in a designated flow, generating any events specified by an event trigger, and stopping when a flow head reaches an event matcher, an exception, or the end of a flow. In some embodiments, the interaction manager 640 may support and keep track of multiple active flows (e.g., interrupted at corresponding event matchers), (e.g., employ an event-driven state machine to) listen for incoming events that match an event matcher of an active flow, and trigger corresponding events and actions specified in matching flows.

Figure 7:
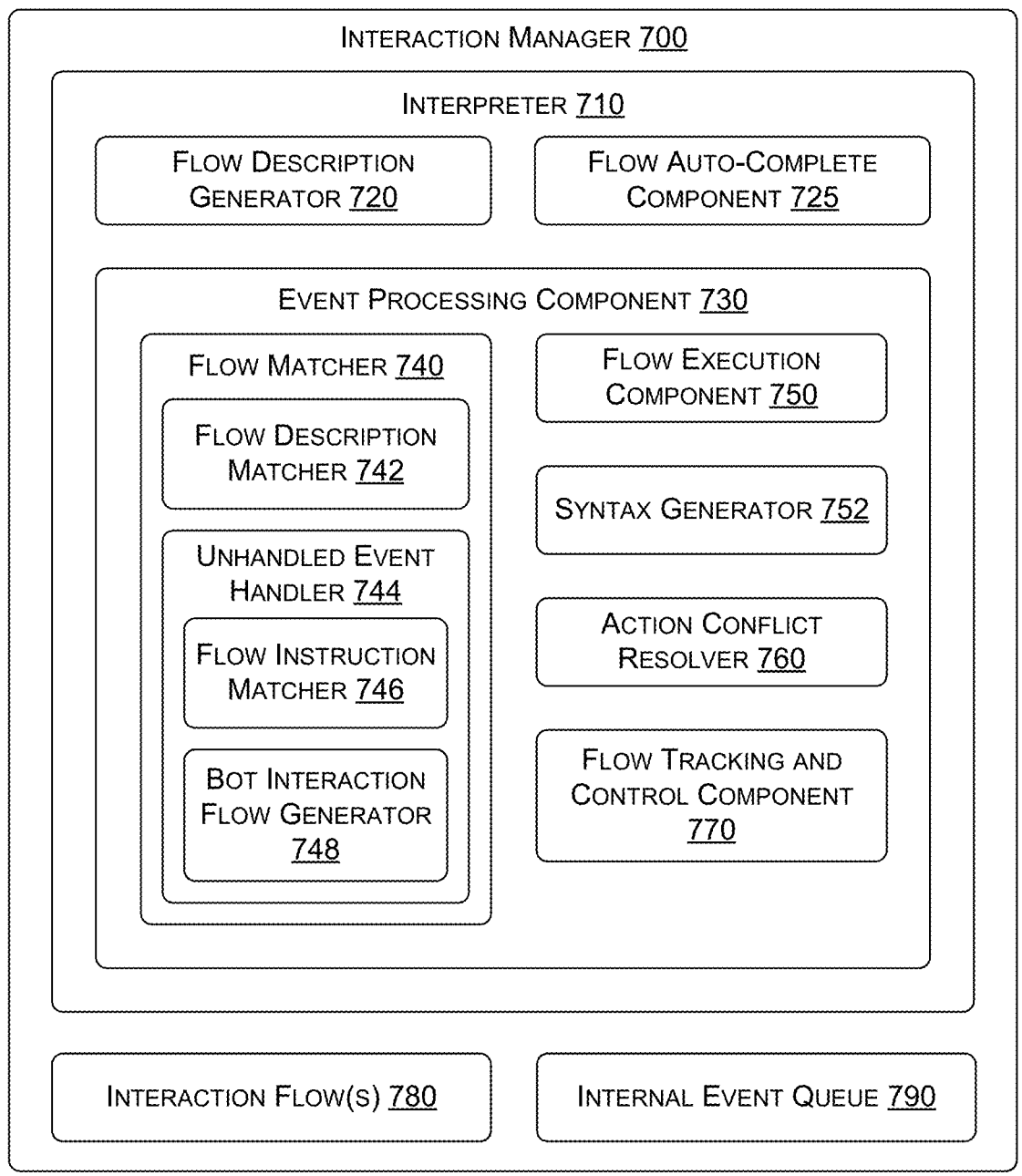
FIG. 7 illustrates an example interaction manager, in accordance with some embodiments of the present disclosure.

FIG. 7 illustrates an example interaction manager 700, in accordance with some embodiments of the present disclosure. In this example, the interaction manager 700 includes an interpreter 710, interaction flow(s) 780, and an internal event queue 790. At a high level, the interaction flow(s) 780 specify corresponding sequences of instructions in an interaction modeling language and may be loaded or otherwise made accessible to the interpreter 710, and the interpreter 710 may include an event processing component 730 that sequentially executes the instructions specified in the interaction flow(s) 780 to process incoming events and generate outgoing events (e.g., in standardized form).

The event processing component 730 may execute a primary processing loop that processes incoming events and generates outgoing events. At a high level, the event processing component 730 includes a flow execution component 750 and a flow matcher 740. The flow execution component 750 may sequentially execute the instructions specified in a flow (e.g., a parent flow, a matching flow) of the interaction flow(s) 780, generating any events specified by an event trigger, and stopping when a flow head reaches an event matcher, an exception, or the end of a flow. The flow matcher 740 may evaluate incoming events to determine whether they match an event matcher of an active flow, instruct an action conflict resolver 760 to resolve any conflicts between multiple matching flows, and instruct the flow execution component 750 to advance (e.g., non-conflicted) matching flows.

In an example embodiment, the flow execution component 750 may perform a lexical analysis on instructions specified in the interaction flow(s) 780 (e.g., tokenizing; identifying keywords, identifiers, arguments, and other elements), iterate over flow instructions, execute each one in sequence, and include mechanisms for handling exceptions. In some embodiments, the flow execution component 750 uses a different flow head for each of the (e.g., active) interaction flow(s) 780 to indicate the current position and advance through the instructions in a corresponding interaction flow. Depending on the instruction, the flow execution component 750 may advance any given flow head to the next instruction, jump to another flow referenced by a specified label or other flow identifier, fork into multiple heads, merge multiple flow heads together, and/or otherwise. As such, the flow execution component 750 may coordinate with a flow tracking and control component 770 to build and maintain a hierarchy of flow heads. If a parent flow head in a branch of a hierarchy of flows or flow heads is stopped, paused, or resumed, the flow execution component 750 may coordinate with the flow tracking and control component 770 to respectively stop, pause, or resume all the child flow heads of that parent flow head or branch. In some embodiments, any flow may specify any number of scopes that the flow execution component 750 may use to generate stop events that instruct a corresponding action server to stop previously started actions within corresponding scopes.

For example (e.g., on startup), the flow execution component 750 may execute a top level flow (e.g., of the interaction flow(s) 780) that specifies instruction(s) to activate any number of flows (e.g., of the interaction flow(s) 780) comprising any number of event matchers. The flow tracking and control component 770 may use any suitable data structure to keep track of active flows and corresponding event matchers (e.g., using a tree or other representation of nested flow relationships), and may employ an event-driven state machine that listens for various events and triggers corresponding actions specified in matching flows (with event matchers that match an incoming event). As such, the flow execution component 750 may iterate through active flows, generating any events specified by an event trigger, and stopping when a flow head reaches an event matcher, an exception, or the end of a flow.

In some embodiments, advancing flows may instruct the flow execution component 750 to generate outgoing events that instruct some action. Additionally or alternatively, advancing flows may instruct the flow execution component 750 to generate events that notify listeners (such as the flow execution component 750 itself) that some event has occurred. As such, the flow execution component 750 may send out these events, and/or the interpreter 710 may maintain an internal event queue 790 and place these events in the internal event queue 790 (e.g., in case another flow is listening for a generated event).

Once the flow heads for all advanced flows have reached an event matcher, an exception, or the end of a flow, the flow matcher 740 may sequentially process incoming events (e.g., from the internal event queue 790, from some other a queue or event gateway, such as the event gateway 180 of FIG. 1), and for each event, test the event matcher specified by each active flow for a match with the event. In some embodiments, the flow matcher 740 sequentially processes any internal events in the internal event queue 790 (e.g., testing active flows for matches with internal events) prior to advancing to process the next incoming event (e.g., from the event gateway). Internal events may represent updated states of interaction flow(s) 780 (e.g., indicating a particular flow has started, finished, aborted, etc.) that have advanced in response to a particular incoming event. As such, a designer may create a flow that depends on the evolution or state of other flows.

When processing an event, the flow matcher 740 may compare the event with the event matcher for each active (e.g., interrupted) flow to determine whether the event matches any of the active flows (e.g., using any known matching technique and/or as described in more detail below). In some scenarios, multiple active flows that specify various interactions may be triggered by different conditions that might be satisfied by the same event. If there is one event matcher from an active flow that matches the event (a matching flow), the flow matcher 740 may instruct the flow execution component 750 to advance that flow (e.g., and generate outgoing events to trigger any actions specified by the advancing flow).

If there are multiple matching flows, the flow matcher 740 may instruct the action conflict resolver 760 to determine whether or not the matching flows agree on an action. If they agree, the action conflict resolver 760 (or the flow matcher 740) may instruct the flow execution component 750 to advance both matching flows. If they disagree, the action conflict resolver 760 may apply conflict resolution to identify which action should take priority, instruct the flow execution component 750 to advance the matching flow with the prioritized action, and abort the other matching flow(s) (e.g., since the interaction pattern represented by those flows will no longer apply). If there are no active flows that match an event, the flow matcher may generate an internal event that matches a designated flow for handling unmatched or unhandled events, may run one or more unhandled event handlers (e.g., the unhandled event handler 744), and/or may use some other technique for handling an unhandled event.

After checking for matches and advancing flows, the flow tracking and control component 770 may check the flow states for any flows that completed or aborted, and may stop any active flows that were activated by those completed or aborted flows (e.g., since the interaction pattern represented by those flows should no longer apply). As such, the interpreter 710 may iterate through events, advancing flows, performing conflict management to determine which actions to execute, and generating outgoing events to trigger those actions.

Figure 8:
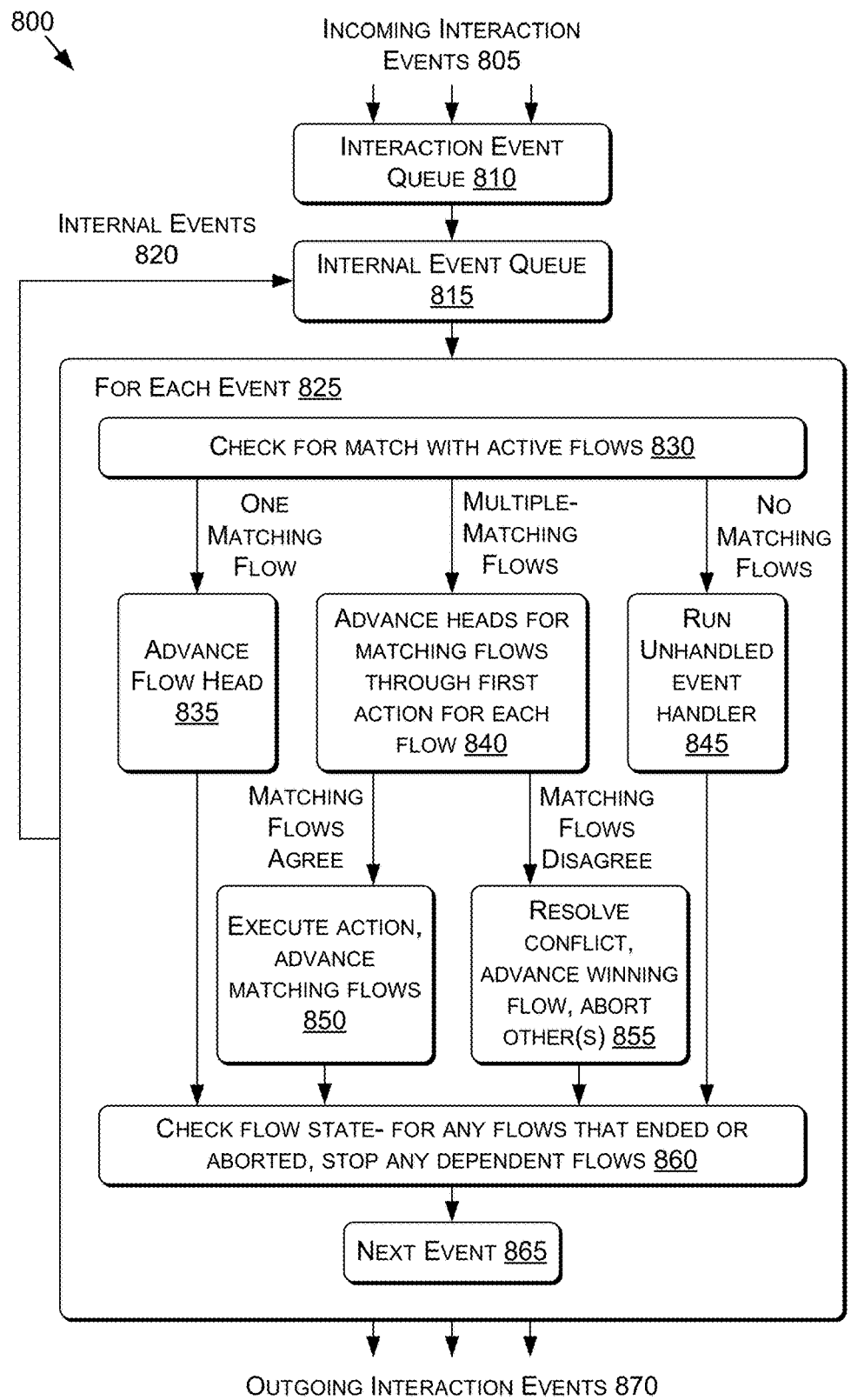
FIG. 8 is a flow diagram illustrating an example event-driven state machine for an interaction manager, in accordance with some embodiments of the present disclosure.

By way of illustration, in some embodiments, the interpreter 710 uses an event-driven state machine like the event-driven state machine 800 of FIG. 8 to process incoming action events 805 and internal events 820. In some embodiments, the event-driven state machine 800 may place incoming action events 805 (e.g., which may correspond to the standardized input events 630 of FIG. 3, and may be routed via an event gateway such as the event gateway 180 of FIG. 1) in an interaction event queue 810. The event-driven state machine 800 may place internal events 820 (e.g., which may correspond to the internal events 660 of FIG. 6) in an internal event queue 815 (e.g., which may correspond to the internal event queue 790 of FIG. 7), and may prioritize processing events from the internal event queue 815 over events from the interaction event queue 810.

For each event, the event-driven state machine 800 may perform at least some of the steps illustrated by block 825. For example, at block 830, the event-driven state machine 800 may test the event matcher specified by each active flow for a match with the event. If there is one event matcher from an active flow that matches the event (a matching flow), the event-driven state machine 800 may advance to block 835 and advance that flow (e.g., generating outgoing interaction events 870 to trigger actions). If there are multiple matching flows, the event-driven state machine 800 may advance to block 840 and determine whether or not the matching flows agree on an action. If they agree, the event-driven state machine 800 may advance to block 850 and advance both matching flows. If they disagree, the event-driven state machine 800 may advance to block 855 and may apply conflict resolution to identify which action should take priority, advance the matching flow with the prioritized action, and abort the other matching flow(s). If there are no active flows that match an event, the event-driven state machine 800 may advance to block 835 and run one or more unhandled event handlers (or generate an internal event that matches a designated flow for handling unmatched or unhandled events). After checking for matches and advancing flows, the event-driven state machine 800 may advance to block 860, may check the flow states for any flows that completed or aborted, may stop any active flows that were activated by those completed or aborted flows, and may advance to the next event at block 865. As such, the event-driven state machine 800 may iterate through the internal events 820 in the internal event queue 815 and/or the incoming action events 805 in the interaction event queue 810, advancing flows, performing conflict management to determine which interactions to execute, and generating outgoing interaction events 870 to trigger those interactions.

Figure 28A:
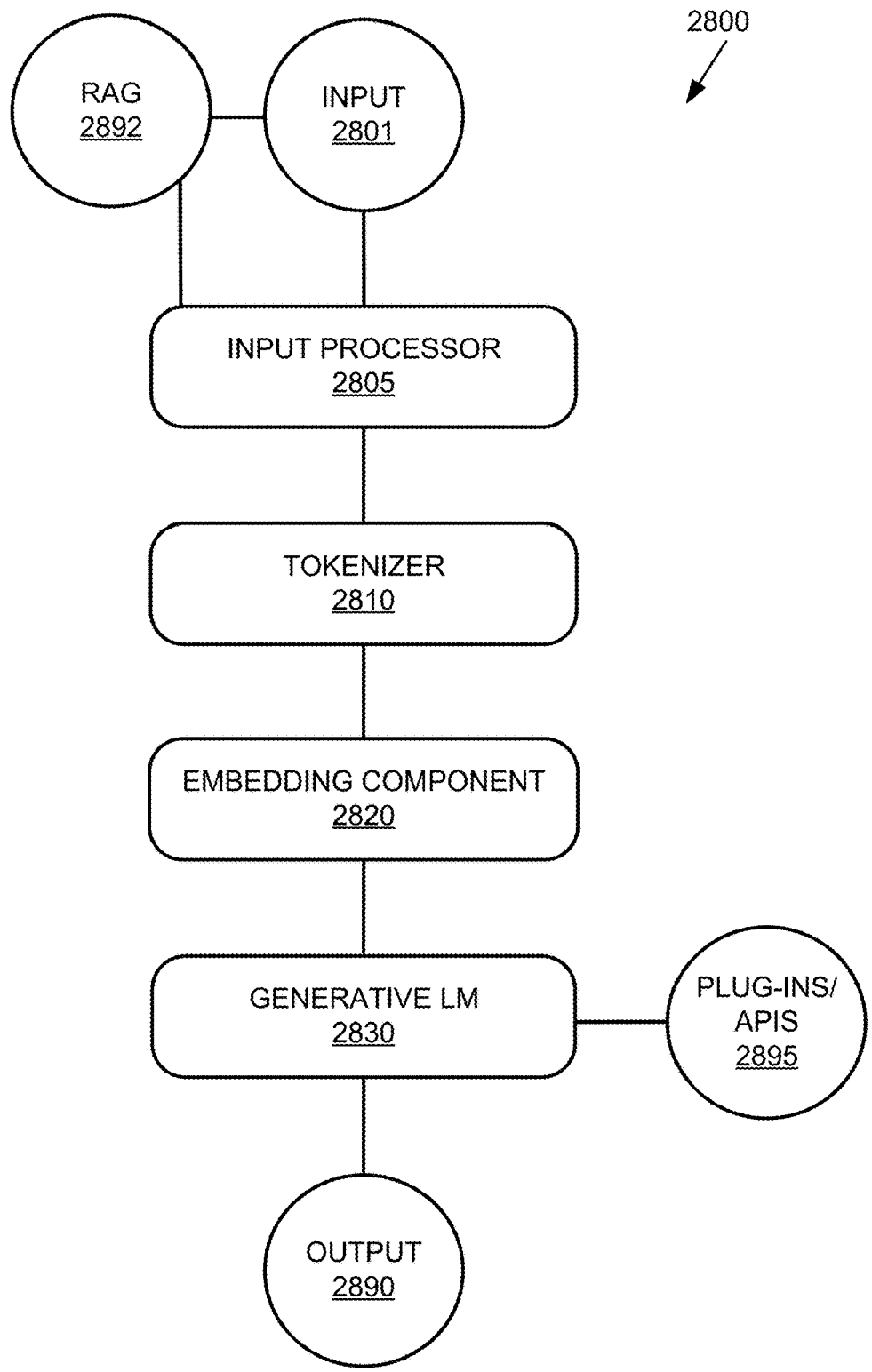
FIG. 28A is a block diagram of an example generative language model system suitable for use in implementing at least some embodiments of the present disclosure.

Returning to FIG. 7, in some embodiments, the interpreter 710 may support the use of natural language descriptions and the use of one or more LLMs, such as the example generative LLM system 2800 of FIG. 28A or the generative LLM 2830 of FIG. 4A, 4B, or 4C.

For example, each of the interaction flow(s) 780 may be specified with a corresponding natural language description summarizing the interaction pattern represented by the flow, and the interpreter 710 make use such flow descriptions in certain circumstances (e.g., a designated flow for handling unknown events and/or the unknown event handler 744 may prompt an LLM to determine whether an unmatched event that represents an unrecognized user intent semantically matches the natural language description of an active flow that represents a target user intent). As such, in some embodiments, the interpreter 710 may include a flow description generator 720 that parses one or more specified interaction flow(s) 780 (e.g., at design time), performs a lexical analysis to identify whether any specified flows are missing a corresponding flow description, and if so, prompts an LLM to generate one (e.g., based on the name and/or instructions of the flow). Additionally or alternatively, the flow description generator 720 may (e.g., prompt an LLM to) determine whether any specified flow descriptions are inconsistent with their corresponding flow descriptions, and if so, prompt an LLM to generate a new one (e.g., as a suggestion or for automatic replacement) (e.g., from the name and/or instructions of the flow). As such, flow description generator 720 may determine whether to generate a description for any of the interaction flow(s) 780, and may generate corresponding flow descriptions.

In some embodiments, a designer may specify a flow description for the interaction flow(s) 780 (e.g., a natural language description of what the flow should do) without the sequence of instructions, or may call one of the interaction flow(s) 780 by name without defining it. As such, in some embodiments, the interpreter 710 may include a flow auto-complete component 725 that parses the interaction flow(s) 780 (e.g., at design time, at runtime), identifies whether the interaction flow(s) 780 are missing a sequence of instructions, and if so, prompts an LLM to generate one (e.g., based on the name and/or description of the flow). For example, the flow auto-complete component 725 may provide the LLM with one or more prompts comprising one or more example flows, a specified name of the interaction flow(s)

780, and/or a (e.g., specified or generated) natural description of the interaction flow(s) 780, and a prompt to complete the interaction flow(s) 780.

For example, the flow auto-complete component 725 may construct a prompt using a template prompt with placeholders, such as the following:

```
content: |-
    # Example flows:
    {{ examples }}
    # Complete the following flow based on its instruction:
    flow {{ flow_name }}
        """"{{ natural language description of the flow }}""""
```

This example template prompt includes placeholders for example flow(s), a specified name of the flow, and a specified natural language description of the flow. The flow auto-complete component 725 may generate one or more prompts, populating the placeholders with corresponding content (e.g., designated example flow(s), a specified name of the flow, a specified natural language description of the flow, and/or other content), and may provide this constructed prompt(s) to an LLM (e.g., via an API request). As such, the LLM may generate and return an auto-completed flow with generated instructions, which the flow auto-complete component 725 may insert into or otherwise associate with the corresponding interaction flow(s) 780.

In an example implementation, the flow execution component 750 may execute instructions specified in the interaction flow(s) 780 (e.g., including any encountered event triggers) until reaching an event matcher, at which point, the flow execution component 750 may interrupt the interaction flow(s) 780. The flow matcher 740 may process each event by executing the event matcher in each interrupted flow, comparing the event to the target event parameters and parameter values specified by the event matcher's event specifier. Depending on the implementation, the flow matcher 740 may support a variety of matching techniques to determine whether an event matches an active event matcher for any of the active flows. Generally, the flow matcher 740 may use any known technique to compare target event parameters and parameter values with those of the event to generate some representation of whether the event is a match (e.g., a binary indication or match score quantifying an express or fuzzy match).

However, in some implementations, an event trigger or event matcher in one of the interaction flow(s) 780 may specify target event parameter(s) and/or parameter value(s) using natural language description(s). As such, in some embodiments, a syntax generator 752 may infer the target event parameters and/or values from a specified natural language description in the interaction flow(s) 780 (e.g. a description of all target event parameters and values, a description of an individual parameter value), and the syntax generator 752 may insert the generated target event parameters and values into (or otherwise associated them with) the corresponding event specifier in the interaction flow(s) 780. For example, prior to the flow execution component 750 executing an instruction (e.g., an event trigger) that includes an event specifier, the flow execution component 750 may (e.g., at runtime) instruct the syntax generator 752 to determine whether the instruction includes a parameter specified using a natural language description (e.g., using a lexical analysis). Additionally or alternatively, prior to the flow matcher 740 executing an instruction (e.g., an event matcher) that includes an event specifier, the flow matcher 740 may (e.g., at runtime) instruct the syntax generator 752 to determine whether the instruction includes a parameter specified using a natural language description (e.g., using a lexical analysis). If so, the syntax generator 752 may prompt an LLM to generate corresponding target event parameter(s) and/or parameter value(s) for the event specifier and update the event specifier in a corresponding one of the interaction flow(s) 780 with the generated target event parameter(s) and/or parameter value(s).

Taking an example prompt for generating a target event parameter value (or any other variable value), the syntax generator 752 may construct a prompt using a template prompt with placeholders, such as the following:

```
content: |-
    """"
    {{ general_instructions }}
    """"
    # This is how a conversation between a user and the bot can go:
    {{ sample_conversation }}
    # This is the current conversation between the user and the bot:
    {{ history | colang }}
    # {{ natural language description of parameter value }}
    ${{ var_name }} =
```

This example template prompt includes placeholders for general instructions, a sample conversation (or series of interactions), a history of the current conversation (or series of interactions), the name of the variable with the value being generated, and a prompt to generate the value ("${{var_name}}="). The syntax generator 752 may generate one or more prompts, populating the placeholders with corresponding content (e.g., designated instructions, a designated sample conversation or interaction history, a recorded history of the current conversation or series of interaction(s), the extracted natural language description of the parameter value to be generated for a corresponding variable, the name of the variable, and/or other content), and may provide this constructed prompt(s) to an LLM (e.g., via an API request). As such, the LLM may generate and return the prompted value, which the syntax generator 752 may insert into the event specifier in the corresponding instruction. This example is meant simply as one possible way in which an LLM may be used to generate a target event parameter value from a specified natural language description of the value. Other types of prompts and prompt content may be implemented within the scope of the present disclosure. Furthermore, those of ordinary skill in the art will appreciate how to adapt the example prompt above to generate other types of content described herein (e.g., generating the name of a target event parameter from a natural language description of the target event parameter(s) and/or parameter value(s), a list of support variable names, etc.). As such, the flow execution component 750 may execute an event trigger, and/or the flow matcher 740 may execute an event matcher, using target event parameters and parameter values generated by an LLM.

Accordingly, in some embodiments, the flow matcher 740 generates and/or quantifies some representation of whether an event is a match (e.g., express or fuzzy) by comparing specified or generated target event parameters/parameter values of an event matcher (e.g., keyword(s) or command(s) representing a target interaction modality, action, action state, and/or other event parameter values) with corresponding parameters/parameter values of the event being tested (e.g., keyword(s) or command(s) representing an instructed or detected interaction modality, action, action state, and/or other event parameter values). Additionally or alternatively, the flow matcher 740 may include a flow description matcher 742 that (e.g., at runtime) prompts an LLM to determine whether an event matches the flow description of one of the interaction flow(s) 780 and/or a specified natural language description of one or more parameters or parameter values to match.

At a high level, an event may represent a user action or intent, a bot action or intent, a scene interaction, or some other kind of event using a standardized interaction categorization schema that classifies actions, action events, event parameters, and/or parameter values using (e.g., standardized, natural language, semantically meaningfully) keywords and/or commands and/or a natural language description (e.g., Gesture UserActionFinished ("thumbs up"))). As such, a flow description matcher 742 of the flow matcher 740 may execute an event matcher by prompting an LLM to determine whether the keywords, commands, and/or natural language description of the incoming or internal event match the (e.g., specified or generated) flow description of one of the interaction flow(s) 780. For example, the flow description matcher 742 may construct a prompt using a template prompt that includes a prompt to determine whether an event matches a flow description, populating placeholders with corresponding content (e.g., designated instructions, a designated sample conversation or interaction history, a recorded history of the current conversation or series of interaction(s), specified or generated flow description(s) of the interaction flow(s) 780, keywords and/or commands represented by the incoming or internal event, and/or other content), and may provide this constructed prompt(s) to an LLM (e.g., via an API request). As such, the LLM may return an indication of whether the event matches a flow description of the interaction flow(s) 780. In many cases, an LLM can provide a more nuanced or semantic understanding of matching than conventional express or fuzzy match algorithms.

Additionally or alternatively, the flow matcher 740 may include a flow instruction matcher 746 that prompts an LLM to determine whether an incoming or internal event matches the instructions of an active flow of the interaction flow(s) 780. For example, the flow matcher 740 may trigger execution of a designated flow (e.g., for handling unknown events) or an unhandled event handler 744 that includes the flow instruction matcher 746 in response to the flow matcher 740 applying one or more match techniques (e.g., using express matching, fuzzy matching, flow description matching, and/or others) and determining that there are no active flows that match the incoming or internal event). In an example implementation, the unhandled event handler 744 includes the flow instruction matcher 746 and a bot interaction flow generator 748, but this is meant simply as an example. Generally, any number of match techniques may be applied in any order, whether as an initial test, as part of the unhandled event handler 744, and/or otherwise.

In an example embodiment, the flow instruction matcher 746 may prompt an LLM to determine whether an incoming or internal event and/or a representation of the recent interaction history matches the specified content of an active flow of the interaction flow(s) 780. The flow instruction matcher 746 may accomplish this by inferring a user intent (e.g., matching the incoming or internal event with the instructions of a flow listening for a corresponding user intent). In an example embodiment, the flow instruction matcher 746 may execute an event matcher by prompting an LLM to determine whether the keywords, commands, and/or natural language description of the incoming or internal event match the (e.g., specified or generated) instructions of one of the interaction flow(s) 780.

For example, the flow instruction matcher 746 may construct a prompt using a template prompt with placeholders, such as the following:

```
content: |-
  """
  {{ general_instructions }}
  """
  # This is how a conversation between a user and the bot can go:
  {{ sample_conversation }}
  # These are the most likely user intents:
  {{ example flows and/or intents }}
  # This is the current conversation between the user and the bot:
  {{ history }}
  user action: {{ incoming or internal event }}
  user intent:
```

This example template prompt includes placeholders for general instructions, a sample conversation (or series of interactions), some possible flows representing target user intents (or a corresponding list of possible user intents) to match, a history of the current conversation (or series of interactions), keywords and/or commands represented by the incoming or internal event, and a prompt to predict the matching flow or user intent ("user intent:"). The flow instruction matcher 746 may generate one or more prompts, populating placeholders with corresponding content (e.g., designated instructions, a designated sample conversation or interaction history, names and/or instructions of designated interaction flow(s) 780 representing possible user intents, a corresponding list of the possible user intents, a recorded history of the current conversation or series of interaction(s), keywords and/or commands represented by the incoming or internal event, and/or other content), and may provide this constructed prompt(s) to an LLM (e.g., via an API request). As such, the LLM may return an indication of whether the event matches one of the interaction flow(s) 780 and/or a corresponding user intent, and if so, which one.

In some scenarios, there may not be a matching flow that defines a bot response to a particular user interaction, or the flow matcher 740 may not identify one. As such (e.g., in some embodiments in which the flow matcher 740 determines there are no active flows that match an incoming or internal event representing a user interaction), the bot interaction flow generator 748 may prompt an LLM to generate a flow (e.g., at runtime). For example, in some embodiments, the flow matcher 740 (e.g., the flow instruction matcher 746) may first use an LLM to try to match an unknown incoming or internal event to the name, instructions, and/or other representation of one or more designated flows listening for corresponding target user intents (and defining bot responses), and if the LLM determines there are no matching flows or target user intents, the bot interaction flow generator 748 may prompt (the same or some other) LLM to predict the user intent represented by an unknown incoming or internal event, generate a responsive agent intent, and/or generate a responsive flow. For example, if the unknown event represents a user action, the bot interaction flow generator 748 may apply any number of prompts to instruct the LLM to classify the unknown user action into a user intent, generate a responsive agent intent, and/or generate a flow implementing the responsive agent intent.

For example, the bot interaction flow generator 748 may construct a first prompt using a template prompt with placeholders, such as the following:

```
content: |-
  """"""
  {{ general_instructions }}
  """"""
  # This is how a conversation between a user and the bot can go:
  {{ sample_conversation }}
  # This is the current conversation between the user and the bot:
  {{ history }}
  bot intent:
and construct a second prompt such as the following:
  bot action:
```

These example template prompts include placeholders for general instructions, a sample conversation (or series of interactions), a history of the current conversation (or series of interactions) including keywords and/or commands represented by the incoming or internal event, a prompt to predict a responsive agent intent ("bot intent:"), and a prompt to predict a responsive agent flow ("bot action:"). The bot interaction flow generator 748 may generate one or more prompts, populating placeholders with corresponding content (e.g., designated instructions, a designated sample conversation or interaction history, a recorded history of the current conversation or series of interaction(s), keywords and/or commands represented by the incoming or internal event, and/or other content), and may provide this constructed prompt(s) to an LLM (e.g., via an API request). As such, LLM may generate and return a responsive agent flow, which the bot interaction flow generator 748 may designate as a match and provide to the flow execution component 750 for execution.

The following example may be used to illustrate some possible prompt content. For example, the interpreter 715 may construct a prompt (e.g., by populating a template prompt with a placeholder for designated general instructions) using general instructions, such as:

Below is a conversation between Emma, a helpful AI assistant (bat), and a user.
The bot is designed to generate human-like actions based on the user actions that it receives.
The bot is talkative and provides lots of specific details.
The bot likes to chit-chat with the user, including but not limited to topics of sports, music, free time activities, NVIDIA, technology, food, weather, animals.
When the user is silent, the bot will motivate the user to try the different showcases, hinting at the different options to select one by voice or by clicking on the presented options.
When the user asks a question, the bot answers it with a suitable response.
When the user gives an instruction, the bot will follow the instruction.
Bot appearance:
Emma is wearing a dark green skirt with white blouse. There is a small card on the blouse With the logo of the AI company NVIDIA. Emma wears glasses, white earrings and has brown, medium-length hair. Her eyes are green-brown.
These are the available showcases:
A) A simple number guessing game
B) The multimodality show case shows how an interaction modeling language can handle multiple parallel actions
C) Shows how the bot can use backchanneling to communicate with the user
D) A show case to present different bot postures that depend on the current interaction state
E) Shows how the bot can be proactive by repeating a question if the user does not answer
Important:
The bot uses the 'bot gesture' action as much as possible
The bot must not repeat itself if the user was silent
user actions:
user said "text"
bot actions:
bot say "text"
bot inform "text
bot ask "text"
bot express "text"
bot respond "text"
bot clarify "text"
bot suggest "text
bot gesture "gesture"

In some embodiments, the interpreter 715 may construct a prompt (e.g., by populating a template prompt with a placeholder for designated sample conversation or series of interactions) using a sample conversation or series of interactions, such as:

This is how a conversation between a user and the bot can go:
user action: user said "Hello there!
user intent: user expressed greeting
bot intent: bot express greeting
bot action: bot express "Hello! How can I assist you today?" and bot gesture "Smile"
user action: user said "What can you do for me?"
user intent: user asked about capabilities
bot intent: bot respond about capabilities
bot action: bot say "As an AI assistant, I can help you with a wide range of tasks." and bot gesture "open both hands making an inviting move"
user action: user said "ddsf poenwrtbj vhjhd sfd dfs"
user intent: user said something unclear
bot intent: bot inform about unclear user input
bot action: bot say "As an AI assistant bot action: bot inform "Excuse me! I did not get that! Can you repeat please?" and bot gesture "Making a sad face"
user action: user said "Tell me a bit about the history of NVIDIA."
user intent: user asked about nvidia history
bot intent: bot response provide information about NVIDIA history
bot action: bot response "NVIDIA is a technology company that specializes in designing and manufacturing graphics processing units (GPUs) and other computer hardware. The company was founded in 1993 by Jen-Hsun Huang, Chris Malachowsky, and Curtis Priem." and bot gesture "continues explanation hand gestures"
user action: user said "So, you are also producing keyboards?"
user intent: user asked about keyboards
bot intent: bot clarify about keyboard
bot action: bot clarify "No, we are actually only fabricating CPUs and no keyboards." and bot gesture "moving index finger in a shaking manner"
user action: user said "tell me more about NVIDIA"
user intent: user requested more information about NVIDIA
bot intent: bot provide more information about NVIDIA bot action: bot inform "Initially, the company focused on developing 3D graphics processing technology for the PC gaming market. In 1999, NVIDIA released the GeForce 256, the world's first GPU, which was a major breakthrough for the gaming industry. The company continued to innovate in the GPU space, releasing new products and expanding into other markets such as professional graphics, mobile devices, and artificial intelligence." and bot gesture "continues explanation hand gestures"

user action: user said "thanks"

user intent: user expressed appreciation bot intent: bot express appreciation_and_Offer additional help bot action: bot express "You're welcome. If you have any more questions or if there's anything else I can help you with, please don't hesitate to ask." and bot gesture "putting flat hands together and make little bow"

user action: user said "Turn around and count to 3"

user intent: user instructed to turn around and count to ten bot intent: bot turn around and count to ten bot action: bot gesture "Turn around" and bot say "One, two, three"

In some embodiments, the interpreter 715 may construct a prompt (e.g., by populating a template prompt with a placeholder for a recorded history of the current conversation or series of interaction(s) using a recorded history of the current conversation or series of interaction(s), such as:

This is the current conversation between the user and the bot:

user intent: user was silent 8.0

The prompt content described herein is meant simply as an example, and variations may be implemented within the scope of the present disclosure.

Returning to FIG. 6, the sensory server 620 may translate detected input events 610 (e.g., representing some detected user input such as a detected gesture, voice command or a touch or click input; representing some detected feature or event associated with a user input such as a detected presence or absence of voice activity, detected presence or absence of typing, detected transcribed speech, detected change in volume or speed of typing; etc.) into standardized input events 630. In some embodiments, different sensory servers may handle detected input events 610 for different interaction modalities (e.g., one sensory server for translating detected gestures, one sensory server for translating detected voice commands, one sensory server for translating detected touch inputs, etc.). As such, any given sensory server 620 may operate as an event transponder, acting as a mediator between a corresponding input source and one or more downstream components (e.g., the event gateway 180 of FIG. 1), for example, by converting input events into a standardized format.

Taking a sensory server for GUI input events as an example, the sensory server may effectively translate GUI input events (e.g., "user clicked button 'chai-latte', scrolled down and clicked button 'confirm'") to standardized interaction-level events (e.g., "user chose the option 'Chai Latte'"). One possible example of a standardized interaction-level event is a confirmation status update event (e.g., indicating a detected state or change in state of a presented confirmation status, such as confirmed, canceled, or unknown). For example, the sensory server may translate different types of GUI inputs into corresponding confirmation status update events, and the translation logic may differ depending on the type of interaction element being presented or interacted with. For example, a button press may be translated to a "confirmed" status update event, or if a visual form presents a single form field input, the sensory server may translate an "Enter" keyboard event into a "confirmed" status update event. Another possible standardized interaction-level event is a choice update event (e.g., indicating a detected change in current choice selection user). For example, if a user picks an item "chai-latte" from a multiple choice element list, the sensory server may translate a corresponding detected GUI input event (e.g., clicking or tapping on a button or icon) into a standardized choice update event indicating a detected change in current choice selection user. Another example of a possible standardized interaction-level event is a form input update event indicating an update to a requested form input. These are just a few examples, and others are contemplated within the scope of the present disclosure. Other examples of standardized interaction-level GUI input events (e.g., representing detected GUI gestures such as swipe, pinch-to-zoom, or rotate for touchscreen devices), standardized interaction-level video input events (e.g., representing detected visual gestures such as facial recognition, pose recognition, object detection, presence detection, or motion tracking events), standardized interaction-level audio input events (e.g., representing detected speech, detected voice commands, detecting keywords, other audio events, etc.), and/or others are contemplated within the scope of the present disclosure.

Figure 9:
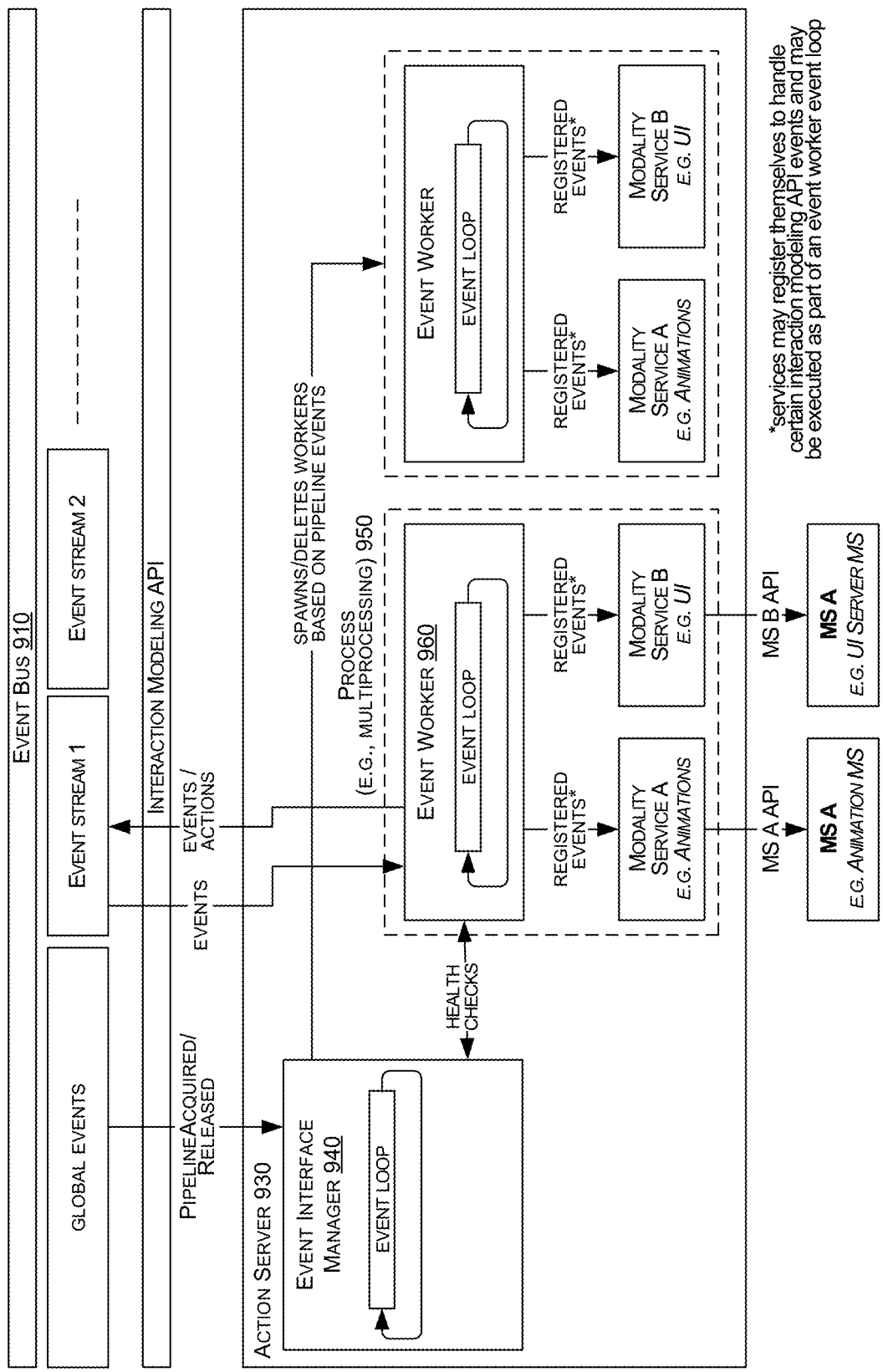
FIG. 9 illustrates an example action server, in accordance with some embodiments of the present disclosure.

FIG. 9 illustrates an example action server 930, in accordance with some embodiments of the present disclosure. The action server 930 may correspond to the action server(s) 170 of FIG. 1 and/or action server 670 of FIG. 6. At a high level, the action server 930 may be subscribed or otherwise configured to pick up and execute those events the action server 930 is responsible for executing (e.g., one interaction modality per action server) from an event bus 910 (e.g., which may correspond to the event gateway 180 of FIG. 1). In the embodiment illustrated in FIG. 9, the action server 900 includes one or more event worker(s) 960 that forward incoming events to corresponding modality services, and an event interface manager 940 that manages the event worker(s) 960.

For example, the event interface manager 940 may be subscribed to a global events channel of the event bus 910 that carries (e.g., standardized) events that indicate when an interaction channel that connects an interaction manager to an end user device has been acquired (e.g., PipelineAcquired) or released (e.g., PipelineReleased). As such, the event interface manager 940 may create a new event worker (e.g., event worker(s) 960) in response to an event indicating a new interaction channel has been acquired, and/or may delete an event worker in response to an event indicating a corresponding interaction channel has been released. In some embodiments, the event interface manager 940 performs periodic health checks (e.g., using any known technique such as interprocess communication) to ensure that the event worker(s) 960 are healthy and running. If the event interface manager 940 discovers that one of the event worker(s) 960 is unresponsive, the event interface manager 940 may restart the event worker.

The event worker(s) 960 may subscribe to one or more per-stream event channels of the event bus 910 (e.g., a per-stream event channel dedicated to a particular interaction modality the action server 930 is responsible for), and may forward incoming events to the different modality services that registered for corresponding events. In some embodiments, event workers may run in separate (e.g., multiprocessing) processes (e.g., process 950) and may manage incoming and outgoing events (e.g., using an asycnio event loop).

Modality services (e.g., modality services A and B in FIG. 9) may implement action-specific logic for each standardized action category and/or action event supported by an interaction modeling language and/or defined by an interaction categorization schema for a given interaction modality. As such, a given modality service may be used to map actions of a corresponding interaction modality to a particular implementation within an interactive system. In an example implementation, all supported actions in a single interaction modality are handled by a single modality service. In some embodiments, a modality service may support multiple interaction modalities, but different actions for the same interaction modality are not handled by different modality services. For example, in some embodiments involving an interactive visual content modality, different actions in that interaction modality (e.g., VisualFormSceneAction, VisualChoiceSceneAction, VisualInformationSceneAction) are handled by the same GUI modality service.

Figure 10:
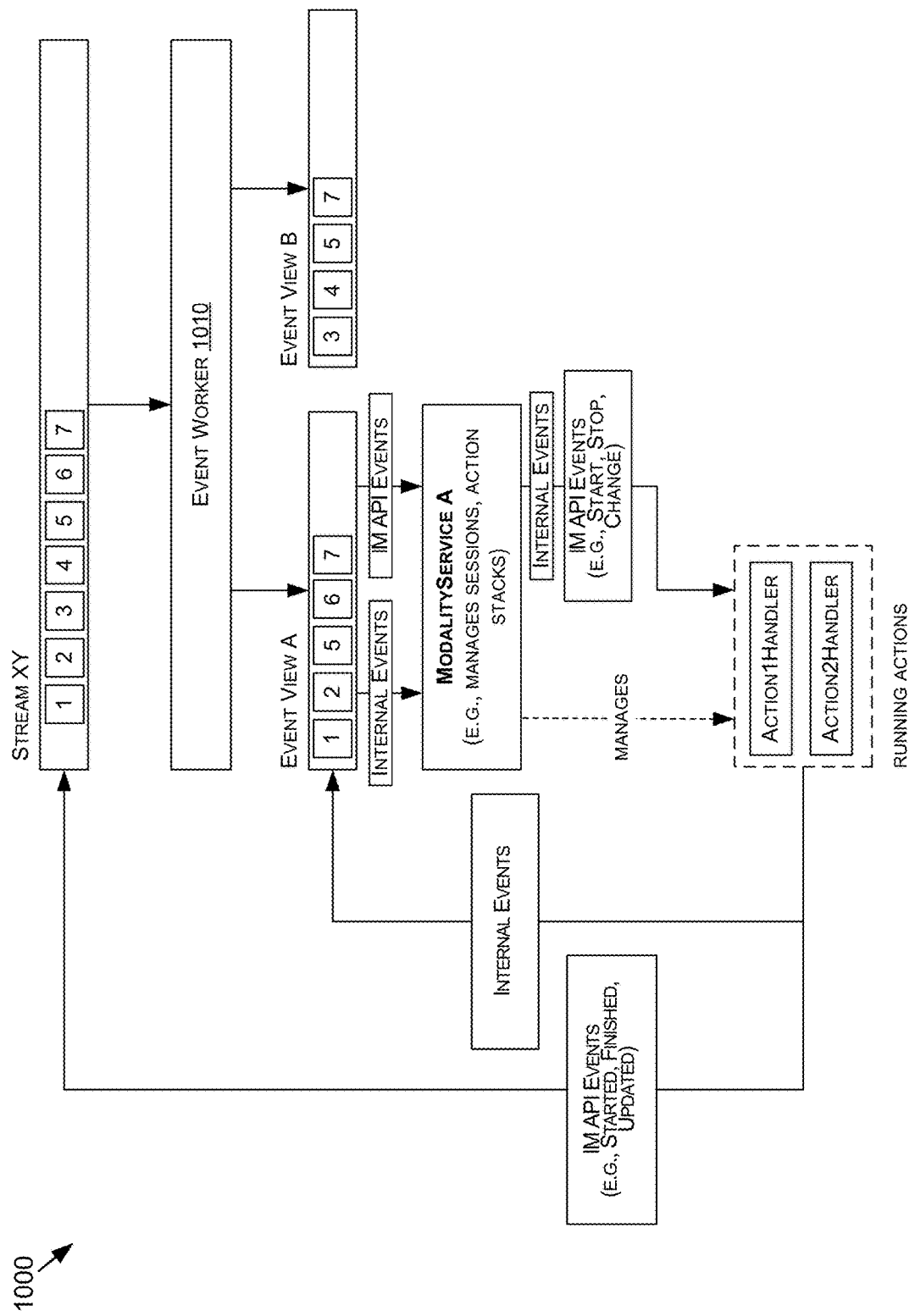
FIG. 10 illustrates an example event flow through an example action server, in accordance with some embodiments of the present disclosure.

FIG. 10 illustrates an example event flow through an example action server 1000, in accordance with some embodiments of the present disclosure. In this example, stream XY (e.g., which may correspond to one of the per-stream event channels of the event bus 910 of FIG. 9) may carry various events (e.g., events 1-7), and an event worker 1010 (e.g., which may correspond to the event worker(s) 960 of FIG. 9) may be subscribed to the stream XY and provide a subscribed modality service (e.g., modality service A) with a corresponding event view (e.g., event view A, event view) populated with a subset of the events from the stream XY the modality is subscribed to receive. As such, the modality service may execute instructed actions represented by its subscribed events, apply a corresponding modality policy to manage a corresponding action stack, and call corresponding action handlers to execute the actions. As such, the action handlers may execute the actions, generate and place internal events (e.g., indicating timeouts) in a corresponding event view (so the modality service can take appropriate action and maintain the action stack and life cycle), and/or generate and place (e.g., standardized) interaction modality (IM) events (e.g., indicating certain actions have started, finished, or updated) into the stream XY.

In some embodiments, every modality service registers itself to an event worker (e.g., the event worker 1010) with a list of (e.g., types of) events of interest (e.g., handled by that modality service). As such, the event worker 1010 may provide an event view (e.g., event view A) that is a subset of all events in the stream to that service. The modality service may process events within a corresponding event view sequentially. In some embodiments in which the action server 1000 includes multiple modality services, different modality services may process events in parallel (e.g., using an asynchronous event loop).

In some embodiments, each modality service implements a designated modality policy (e.g., the modality policies illustrated in FIG. 4). In an example of a modality policy that permits parallel actions in a given modality, a corresponding modality service may trigger, track, and/or otherwise manage parallel actions, and an arbitrary number of actions may be executed simultaneously. The modality service may assign a common action identifier (e.g., action_uid) that uniquely identifies a particular instance of an action and may track the life cycle of that instance of the action in response to action events generated by corresponding action handlers and referencing the same action identifier.

In an example of a modality policy that overrides overlapping actions in a given modality, a corresponding modality service may manage a stack of actions, and the modality service may pause or hide a currently executing action in response to a subsequently instructed action. Once an action is finished and a corresponding (e.g., internal) action event representing that event is related back to the modality service, the modality service may trigger the top most of the remaining actions in the stack to resume or become unhidden. For example, an animation modality service may initially start a StartGesture BotAction (gesture="talking") event, and if it subsequently receives a StartGesture BotAction (gesture="point down") event before the talking gesture (animation) concludes, the modality service may pause the talking gesture, trigger the pointing down gesture, and resume the talking gesture when the pointing down gesture concludes.

Figure 11:
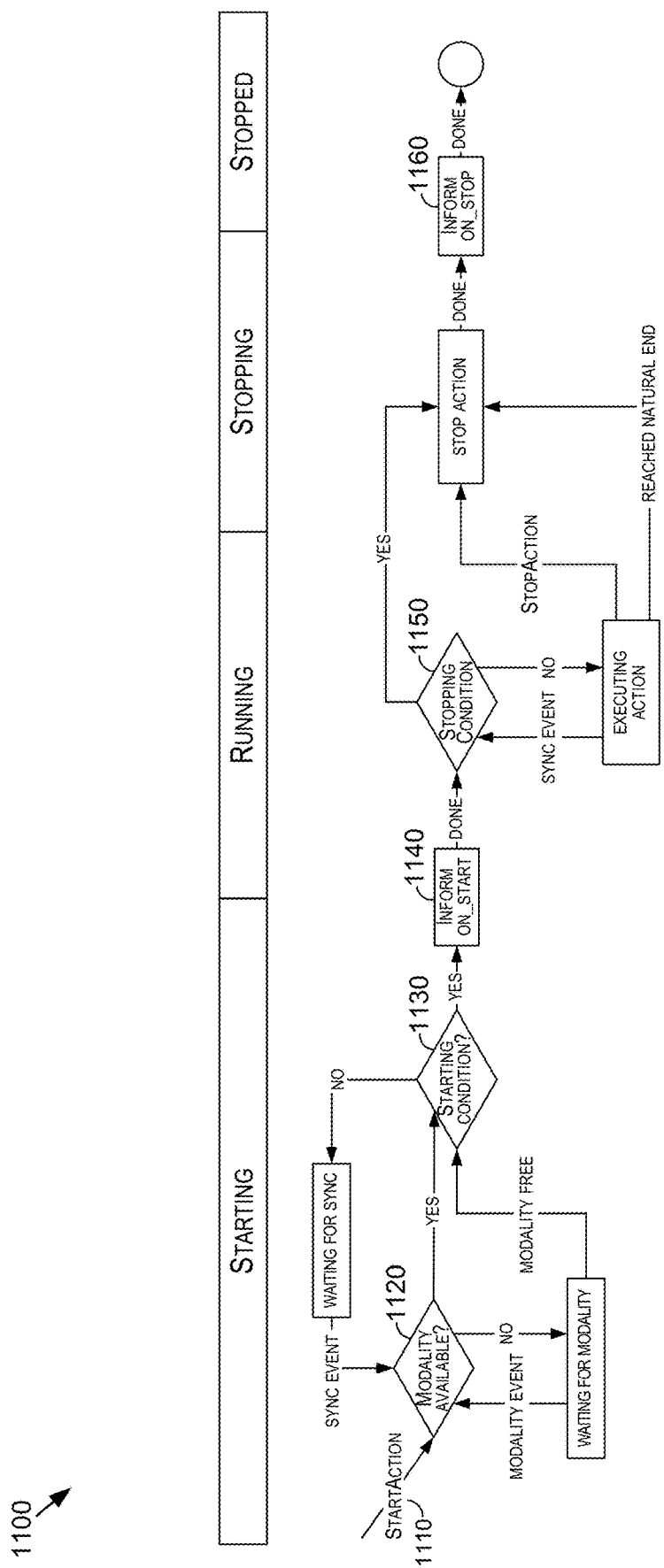
FIG. 11 illustrates an example action lifecycle, in accordance with some embodiments of the present disclosure.

In some embodiments, a modality service may synchronize action state changes with designated conditions (e.g., wait to start an action until a previous action of the same modality is completed, align the completion of two different actions in different modalities, align the start of one action with the end of some other action, etc.). By way of illustration, FIG. 11 illustrates an example action lifecycle 1100. For example, a modality service may receive a StartAction event 1110 indicating that an action on a corresponding interaction modality handled by that modality service should start. In the embodiment illustrated in FIG. 1, at decision block 1120, the modality service may determine whether the modality is available. For example, the modality service may implement a modality policy that waits for any running actions on that modality to finish before starting a new action on that modality, the modality service may track the lifecycle of initiated actions on that modality, and, as such, may determine that there is some other pending action that has started and not yet finished. Accordingly, the modality service may wait until it receives an event (e.g., the modality event illustrated in FIG. 11) indicating that action has completed, upon which, the modality service may advance to decision block 1130. At decision block 1130, the modality service may determine whether a designated starting condition is satisfied (e.g., an instruction to synchronize starting the new action with the start or completion of some other action). As such, the modality service may wait for the designed starting condition to occur (e.g., indicated by the sync event in FIG. 11) and the interaction modality to remain free before initiating the action, and, at block 1140, may generate an event indicating the action has started.

At block 1150, prior to completion of the action, the modality service may determine whether a designated stopping condition is satisfied (e.g., stop a waving gesture when the bot finishes saying goodbye). As such, the modality service may stop the action if the designated stopping condition occurs, or the action may last some designated duration and reach its natural conclusion. Once the action finishes or otherwise stops, at block 1160, the modality service may generate an event indicating the action has stopped. As such, the modality service may manage and track the lifecycle of the action, and may generate events representing changes in the state of the action during its lifecycle.

Returning to FIG. 10, an action handler (e.g., Action1Handler, Action2Handler) may be responsible for the execution of a single category of supported (e.g., standardized) actions, and may implement a corresponding action state machine. For example, an action handler may receive events representing instructions to change the action state (e.g., start, stop, change), and may receive internal events from the modality service or from itself (e.g., API callback calls, timeouts, etc.). In some embodiments, action handlers may directly publish (e.g., standardized interaction modeling) events (e.g., indicating a change in action state such as started, finished, or updated) to the stream XY.

The following section describes some example implementations of some example modality services, namely an example GUI service that handles interactive visual content actions and an example animation service that handles bot gesture actions.

Example GUI Service. In some embodiments, a GUI service (e.g., which may correspond to Modality Service B in FIG. 9) handles interactive visual content actions (e.g., VisualInformationSceneAction, VisualChoiceSceneAction, VisualFormSceneAction) and corresponding events. In an example implementation, the GUI service translates standardized events representing instructed interactive visual content actions (e.g., instructed GUI updates) to calls to an API of a user interface server, applies a modality policy that overrides active actions with subsequently instructed ones, and manages a corresponding stack of visual information scene actions (e.g., in response to receiving an event instructing a new interactive visual content action when there is at least one ongoing interactive visual content action). As such, the GUI service may implement GUI updates that synchronize interactive visual content (e.g., visual information, a choice the user is being prompted to make, or a field or form the user is being asked to complete) with the current state of an interaction with a conversational AI.

In some embodiments, the GUI service may operate in coordination with a user interface server (e.g., on the same physical device, on a connected or networked physical device, etc.), such as the user interface server 130 of FIG. 1. Generally, the user interface server may be responsible for managing and serving user interfaces to a client device (e.g., the client device 101 of FIG. 1), and may serve front-end components (e.g., HTML files for structuring content, Cascading Style Sheets for styling, JavaScript files for interactivity) that make up the user interface of a web application. The user interface server may serve static assets like images, fonts, and other resources for the user interface, and/or may use any known technique to serve user interfaces. The user interface server may serve as a mediator between the client device and the GUI service, translating GUI inputs to standardized GUI input events, and translating standardized GUI output events into corresponding GUI outputs.

The GUI service may manage an action state machine and/or an action stack for all interactive visual content actions. In an example implementation, the GUI service includes an action handler for each supported event for each supported interactive visual content action. FIGS. 12A-12C illustrate some example action handlers for some example interactive visual content action events, in accordance with some embodiments of the present disclosure. More specifically, FIG. 12A illustrates some example action handlers for some example visual information scene action events, FIG. 12B illustrates some example action handlers for some example visual choice action events, and FIG. 12C illustrates some example action handlers for some example visual form action events.

For example, an interactive visual content event (e.g., generated by an interaction manager such as the interaction manager 190 of FIG. 1 or the interaction manager 700 of FIG. 7) may instruct visualization of different types of visual information (e.g., in a 2D or 3D interface). In some embodiments, an interactive visual content event (e.g., payload) comprises fields that specify or encode values representing a supported action type categorizing an instructed action (e.g., VisualInformationSceneAction, VisualChoiceSceneAction, VisualFormSceneAction), an action state (e.g., "init", "scheduled", "starting", "running", "paused", "resuming", "stopping" or "finished"), some representation of instructed visual content, and/or other properties or information. The type of visual content specified by an event may depend on the action type.

For example, (e.g., the payload of) an event (e.g., a start event) for a visual information scene action may include fields specifying corresponding values such as a specified title, a specified summary of information to be presented, specified content to present (e.g., a list of information blocks to show to the user, where each block may contain specified text, a specified image (e.g., a description or identifier such as a uniform resource locator), or both), one or more specified support prompts that support or guide the user in making a choice, and/or otherwise. As such, the action handler for a corresponding (e.g., a start) event for a visual information scene action may translate the event into a (e.g., JSON) representation of a modular GUI configuration specifying blocks of content such as a hint carousel block for one or more specified support blocks, a header block for a specified title, image and/or text blocks for the specified content, a (e.g., continue, cancel) button(s), and/or other elements. Accordingly, the action handler may use these blocks of content to generate a custom page by populating a visual layout (e.g., a designated template or shell visual layout with corresponding placeholders) for a GUI overlay (e.g., an HTML) layout, and may call the user interface server endpoint with the custom page to trigger the user interface server to present the custom page.

In some embodiments, (e.g., the payload of) an event (e.g., a start event) for a visual choice action may include fields specifying corresponding values such as a specified prompt (e.g., describing a choice to be offered to the user), a specified image (e.g., a description or identifier such as a uniform resource locator of an image that should be presented with the choice), one or more specified support prompts that support or guide the user in making a choice, one or more specified options for the user to choose from (e.g., text, image, and/or other content for each option), a specified choice type (e.g., configuring the type of choice the user can make, such as selection, search bar, etc.), a specification of whether multiple choices are permitted, and/or otherwise. As such, the action handler for a corresponding (e.g., a start) event for a visual choice action may translate the event into a (e.g., JSON) representation of a modular GUI configuration specifying blocks of content such as a hint carousel block for one or more specified support blocks, a header block for a specified title, an image block for a specified image, a selectable options grid block for specified options, a (e.g., cancel) button(s), and/or other elements. Accordingly, the action handler may use these blocks of content to generate a custom page by populating a visual layout (e.g., a designated template or shell visual layout with corresponding placeholders) for a GUI overlay (e.g., an HTML) layout, and may call the user interface server endpoint with the custom page to trigger the user interface server to present the custom page.

Figure 13C:
FIGS. 13A-13F illustrate some example interactions with a visual choice, in accordance with some embodiments of the present disclosure.
Figure 13B:
Figure 13A:
Figure 13F:
Figure 13E:
Figure 13D:
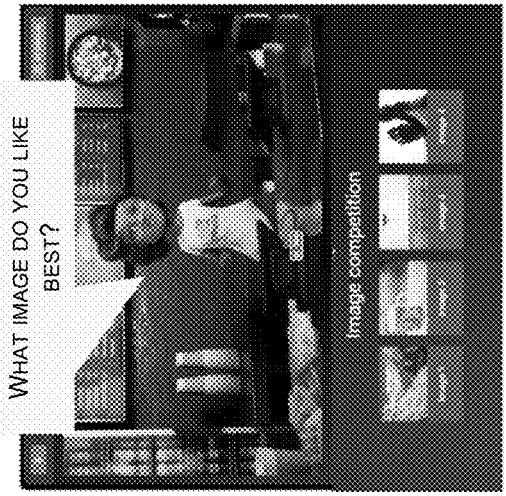

FIGS. 13A-13F illustrate some example interactions with a visual choice, in accordance with some embodiments of the present disclosure. For example, FIGS. 13A and 13D illustrate presentation of a visual choice between four captioned images with an interactive avatar asking which image the user likes best. FIG. 13B illustrates a scenario where the user indicates the third image with a touch input, and FIG. 13E illustrates the same choice with a verbal input. In these scenarios, the verbal input may be detected, routed to a corresponding sensory server and translated to a corresponding standardized event, routed to an interaction manager, and used to generate an event instructing a corresponding GUI update, an event instructing a verbal bot response, and/or an event instructing a responsive agent gesture. As such, the event(s) may be routed to a corresponding action server(s) and executed. FIGS. 13C and 13F illustrate an example bot response (e.g., visually emphasizing the selected choice and replying with a verbal acknowledgement).

In some embodiments, (e.g., the payload of) an event (e.g., a start event) for a visual form action may include fields specifying corresponding values such as a specified prompt (e.g., describing desired input from the user), a specified image (e.g., a description or identifier such as a uniform resource locator of an image that should be presented with the choice), one or more specified support prompts that support or guide the user in making a choice, one or more specified user inputs (e.g., where each specified user input may include a specified input type such as numeric or date, a specified description such as "personal email address" or "place of birth," etc.), and/or otherwise. As such, the action handler for a corresponding (e.g., a start) event for a visual form action may translate the event into a (e.g., JSON) representation of a modular GUI configuration defining blocks of content specified or otherwise represented by (e.g., corresponding fields of) the event such as a hint carousel block for one or more specified support blocks, a header block for a specified prompt, an image block for a specified image, a list of input block(s) representing corresponding form fields for specified inputs, a (e.g., cancel) button(s), and/or other elements. Accordingly, the action handler may use these blocks of content to generate a custom layout or page by populating a visual layout (e.g., a designated template or shell visual layout with placeholders for corresponding blocks of content) for a GUI overlay (e.g., an HTML) page, and may call the user interface server endpoint with the custom layout or page to trigger the user interface server to present the custom layout or page.

In some embodiments in which (e.g., the payload of) an event (e.g., a start event) for an interactive visual content action specifies an image using a natural language description (e.g., "image of summer mountains"), a corresponding action handler for the event may trigger or perform an image search for a corresponding image. For example, an action handler may extract the natural language description of the desired image, interface with any suitable image search tool (e.g., via a corresponding API), and send the natural language description of the desired image to the search tool. In some embodiments, the search tool returns an identifier such as a uniform resource locator for a matching image, and the action handler may insert the identifier into a corresponding block in a custom page. As such, the action handler may provide the custom page to the user interface server (which may retrieve the specified image using the inserted identifier) for presentation.

Figure 14A:
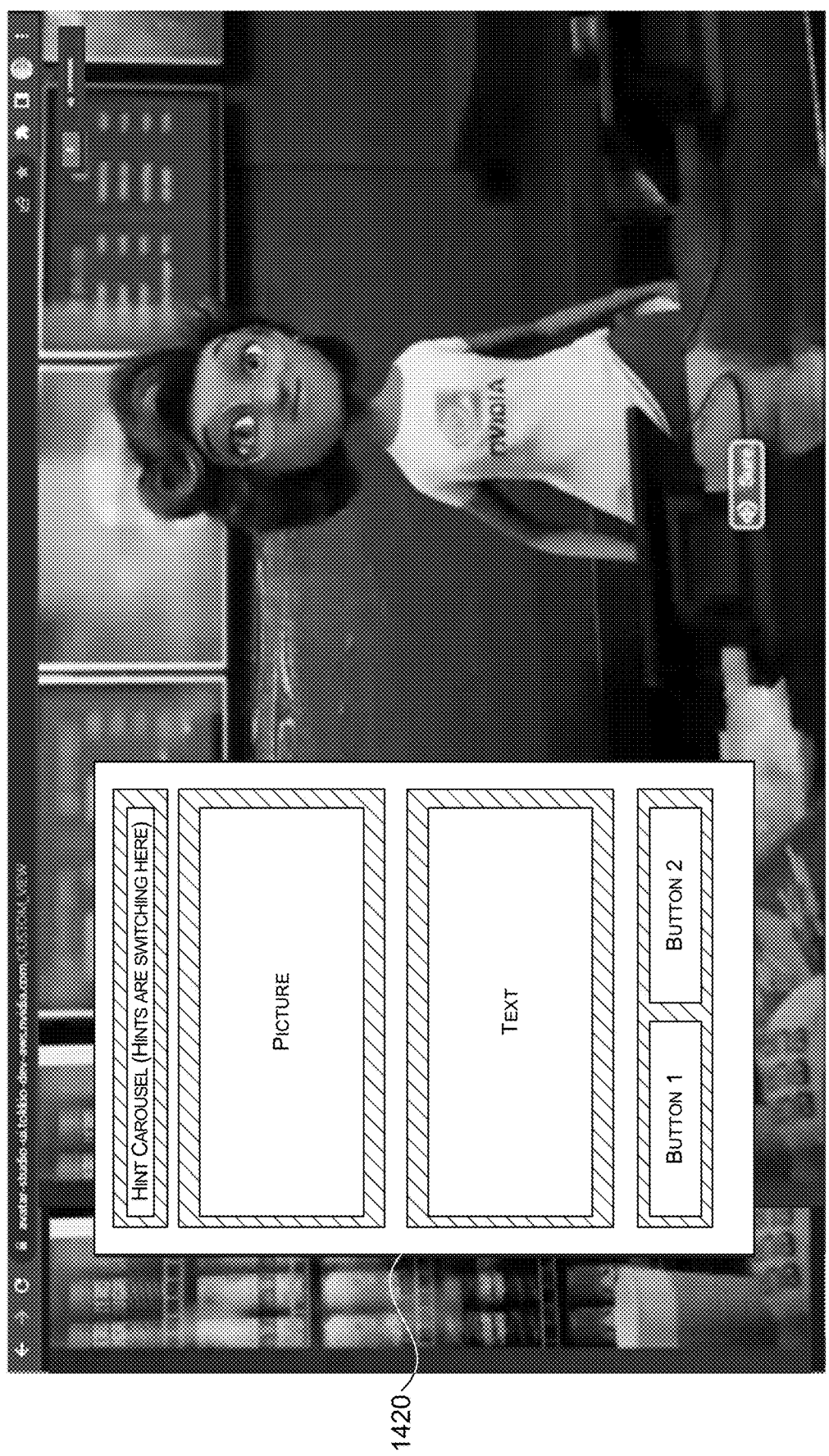
FIG. 14A illustrates an example graphical user interface presenting an interactive avatar and interactive visual content.
Figure 14B:
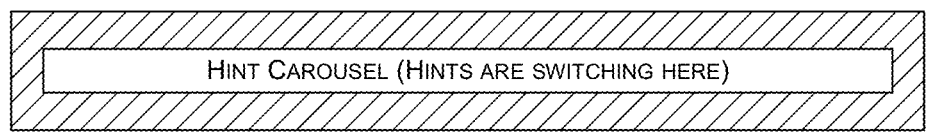
FIGS. 14B-14L illustrate some example layouts of visual elements for interactive visual content, in accordance with some embodiments of the present disclosure.
Figure 14C:
Figure 14D:
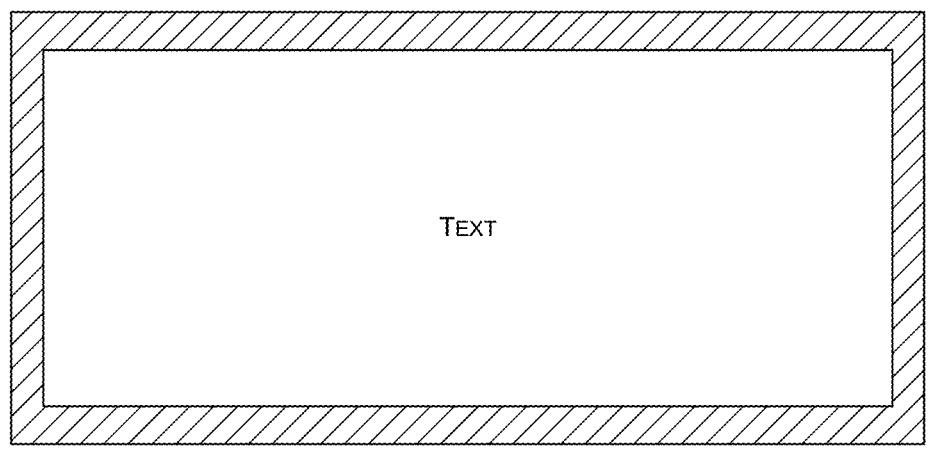
Figure 14E:
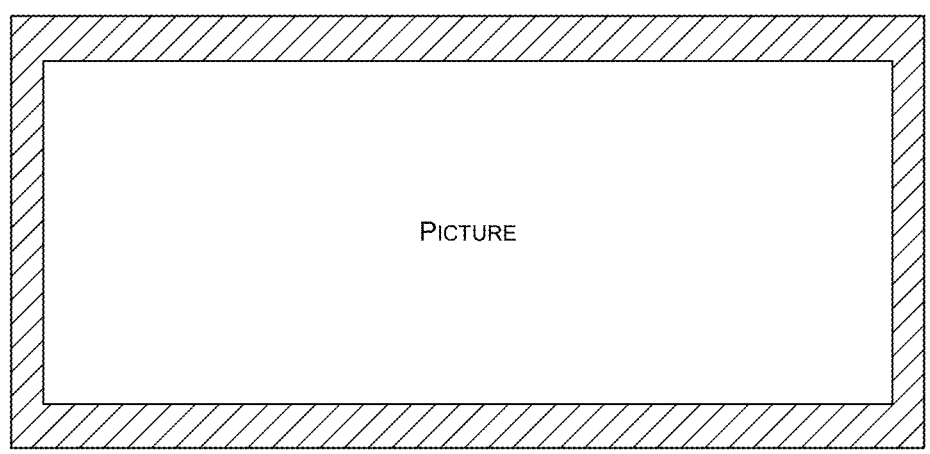
Figure 14F:
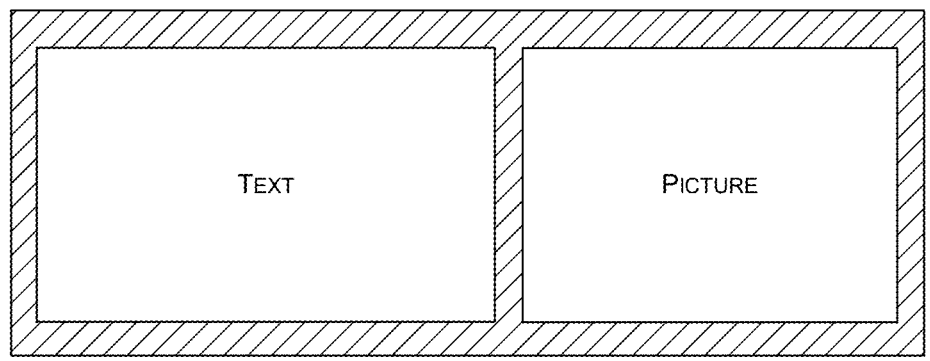
Figure 14G:
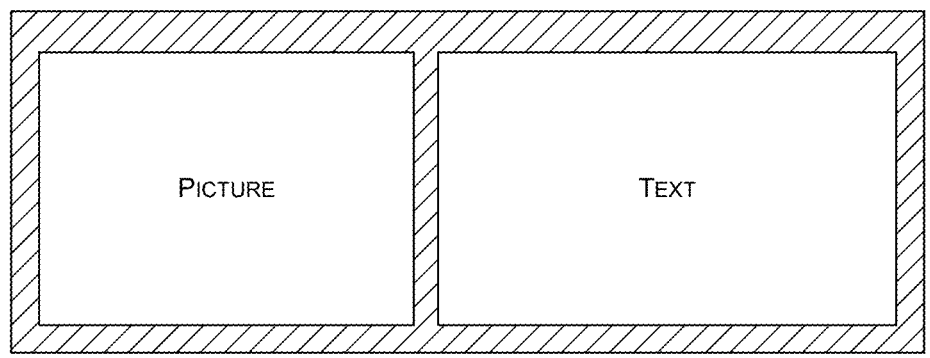
Figure 14H:
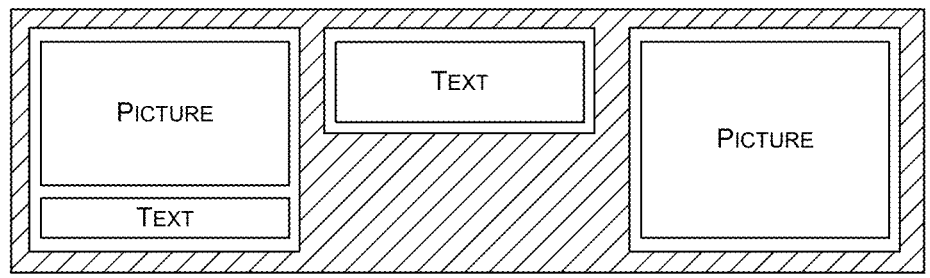
Figure 14I:
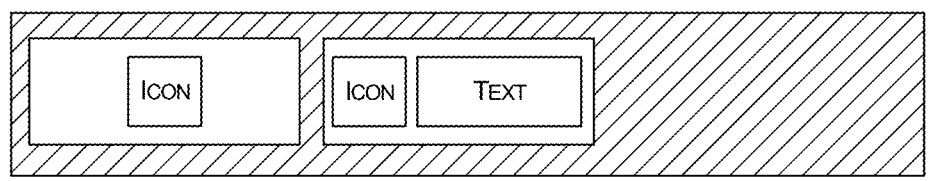
Figure 14J:
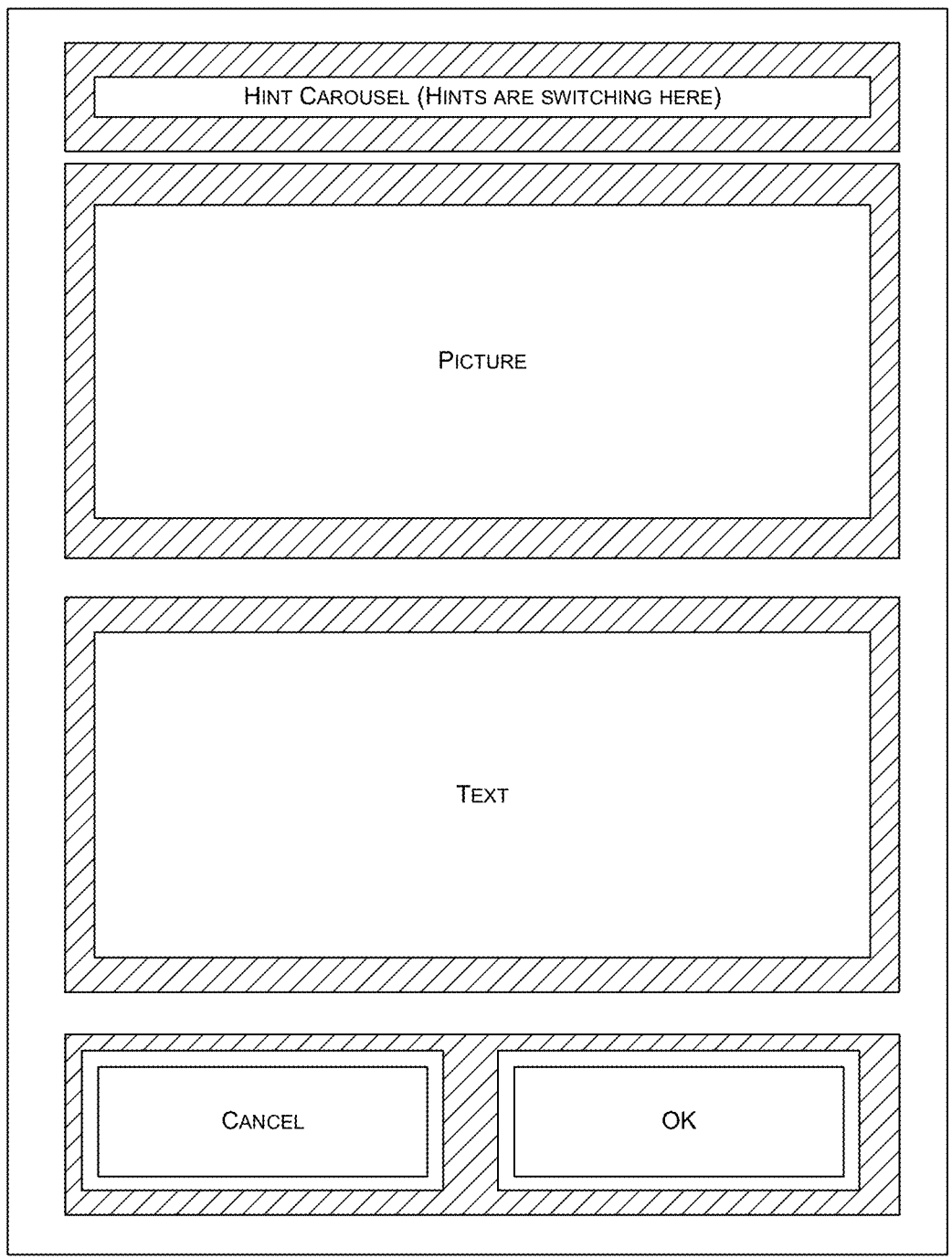
Figure 14K:
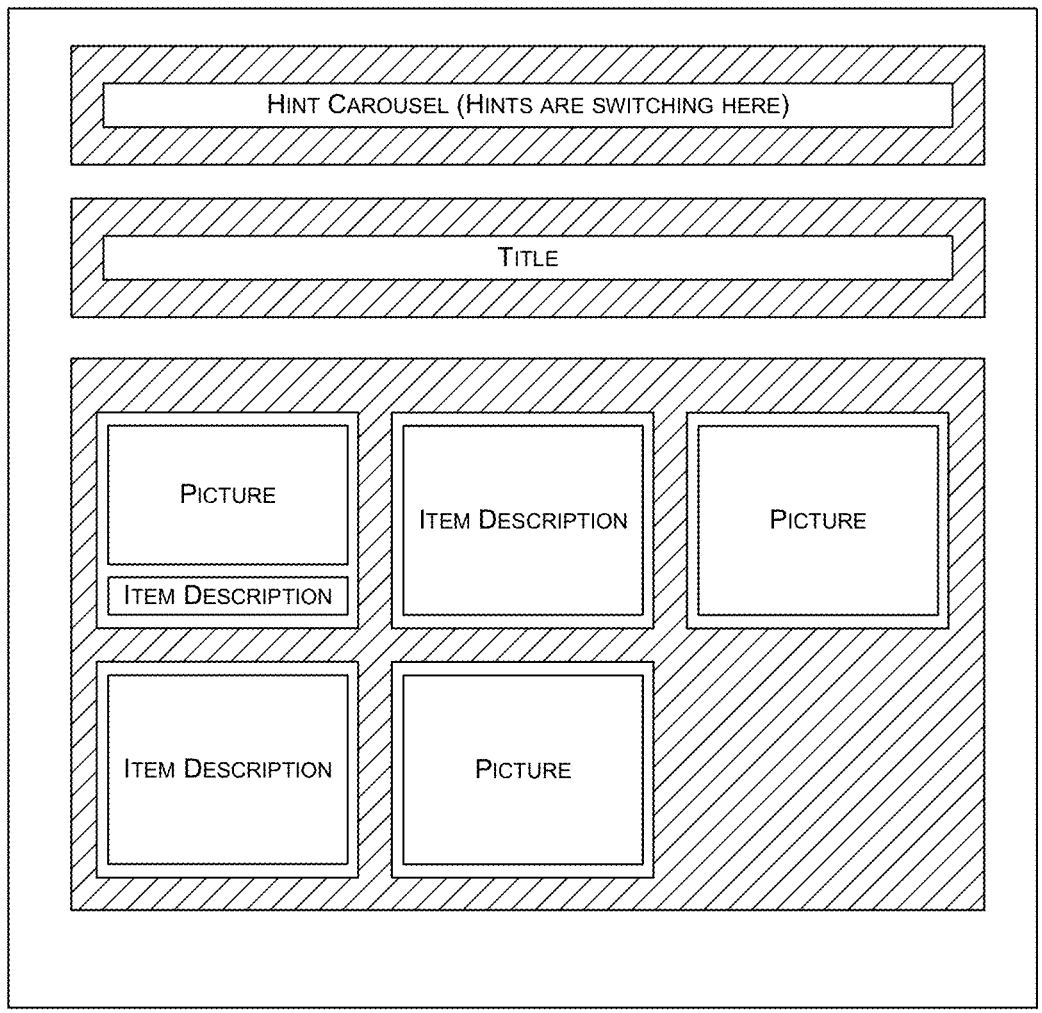
Figure 14L:
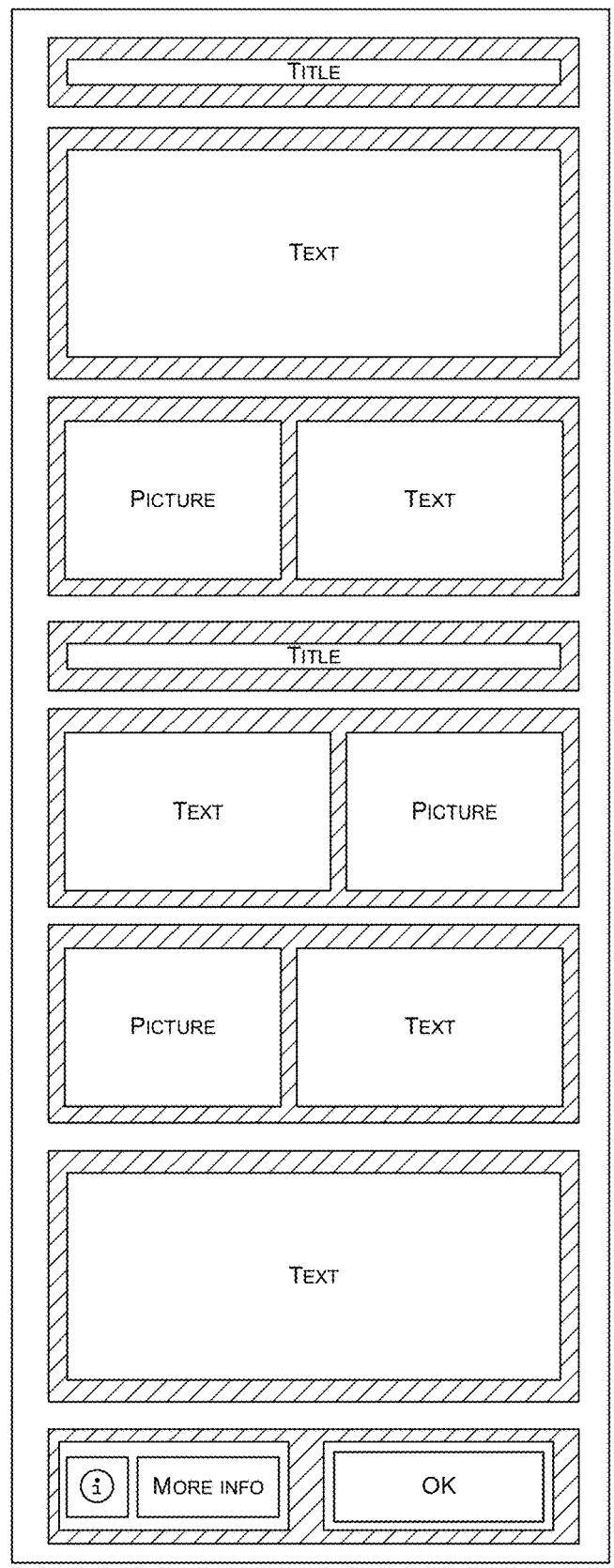

FIGS. 14A-14L illustrate example layouts of visual elements for interactive visual content, in accordance with some embodiments of the present disclosure. For example, FIG. 14A illustrates an example GUI overlay 1420 presented on top of a scene with an interactive avatar. FIGS. 14B-14L illustrate some example layouts of blocks of visual elements which could be used as corresponding GUI overlays. These are meant simply as examples, and other layouts may be implemented within the scope of the present disclosure.

Example Animation Service. In some embodiments, an animation service (e.g., which may correspond to Modality Service A in FIG. 9) may handle bot gesture actions (e.g., GestureBotAction) and corresponding events. In an example implementation, the animation service applies a modality policy that overrides active actions with subsequently instructed ones and creates a corresponding stack of actions in response to incoming StartGestureBotAction events when there is one or more ongoing GestureBotAction. The animation service may manage an action state machine and action stack for all GestureBotActions, connect with an animation graph that implements a state machine of animation states and transitions between animations, and instruct the animation graph to set a corresponding state variable.

In an example implementation, the animation service includes an action handler for each supported event for a bot gesture action. FIG. 12D illustrates some example action handlers for some example GestureBotAction events, in accordance with some embodiments of the present disclosure.

For example, a bot gesture action event (e.g., generated by an interaction manager such as the interaction manager 190 of FIG. 1 or the interaction manager 700 of FIG. 7) may instruct a designated animation (e.g., in a 2D or 3D interface). In some embodiments, a bot gesture action event (e.g., payload) may include fields that specify or encode values representing a supported action type categorizing an instructed action (e.g., GestureBotAction), an action state (e.g., "init", "scheduled", "starting", "running", "paused", "resuming", "stopping" or "finished"), some representation of an instructed bot gesture, and/or other properties or information. For example, (e.g., the payload of) an event (e.g., a start event) for a bot gesture action may include a field(s) specifying (e.g., a natural language description or other identifier of) a bot gesture. Depending on the implementation, one or more categories or types of actions (e.g., bot expression, pose, gesture, or other interaction or movement) may be standardized for corresponding bot functionality, and a corresponding action event may specify the desired action. Taking a bot gesture specified for a bot gesture action category as a natural language description as an example, the action handler for a corresponding (e.g., start) event for the bot gesture action category may extract the natural language description from the event, generate or access a sentence embedding for the natural language description of the bot gesture, use it to perform a similarity search on sentence embeddings for descriptions of the available animations, and select an animation using some measure of similarity (e.g., nearest neighbor, within a threshold). In some embodiments, if the best match is above some designated threshold, the action handler may trigger the animation graph to play a corresponding animation for the user. In some embodiments, the action handler for a corresponding (e.g., start) event for the bot gesture action category may extract the natural language description from the event and use any known generative technique to generate an animation from the natural language description (e.g., text-to-motion models, text-to-animation techniques, any other suitable animation technique).

Example Event Flows. The following discussion illustrates some possible event flows in example implementations. For example, the following table represents a series of events that may be generated and distributed in an implementation in which a bot engages in dialog with a user:

| History | Next action |
|---|---|
| UtteranceUserActionFinished final_transcript="Hello!" UtteranceBotActionStarted interim_script="Hello there!" UtteranceBotActionFinished final_script="Hello there!" | StartUtteranceBotAction script="Hello there!" |

In this example, the event in the first row represents a detected completion of a user utterance ("Hello!"), which triggers an event that instructs the bot to begin a responsive utterance ("Hello there!"). The event in the second row indicates the bot has started the utterance, and the event in the third row indicates the bot has finished the utterance.

The following table represents a series of events that may be generated and distributed in an implementation in which a bot interacts with a user via gestures, emotions, and a display:

| History | Next |
|---|---|
| ... | |
| UtteranceBotActionFinished final_script="Which option?" | StartVisualChoiceSceneAction content=[...] |
| StartTimerBotAction duration= 2sec | |
| VisualChoiceSceneActionStarted | |
| TimerBotActionStarted duration= 2sec | StartGestureBotAction gesture="point to display" |
| GestureBotActionStarted | |
| GestureBotActionFinished | |
| TimerBotActionFinished duration= 2sec | StartUtteranceBotAction script="Do you need more time?" |
| UtteranceBotActionStarted script="Do you need more time?" | |
| GestureUserActionFinished gesture="nodding" | StartGestureBotAction movement="lean forward" |
| GestureBotActionStarted | |
| UtteranceBotActionFinished final_script="Do you need more time?" | |
| GestureBotActionFinished | |
| ExpressionUserActionStarted expression="happy" | |

In this example, the event in the first row indicates the bot finished prompting the user "Which option?" which triggers an event that instructs the GUI to present a visual choice. The event in the second row instructs a two second timer to start. The event in the third row indicates the visual choice was presented, and the event in the fourth row indicates the timer was started, which triggers an event instructing the bot to point to the display of the visual choice. The event in the fifth row indicates the pointing gesture started, and the event in the sixth row indicates the pointing gesture finished. The event in the seventh row indicates the two second timer finished, which triggers a bot utterance ("Do you need more time?"). The event in the eight row indicates the bot utterance has started. The event in the ninth row indicates a detection completion of a detected user gesture (nodding), which triggers a responsive agent gesture (leaning forward). The event in the tenth row indicates the bot gesture started. The event in the eleventh row indicates the bot utterance ("Do you need more time?") finished, the event in the twelfth row indicates the bot gesture (leaning forward) finished, and the event in the last row indicates a detected start of a detected user expression (happy).

In various scenarios, it may be beneficial to instruct an interactive system or one of its components (e.g., a sensory server that controls input processing, an action server that implements bot actions) to take some kind of action in anticipation of an event an interaction manager (e.g., the interpreter) is expecting next from the user or the system, or otherwise signal the expectation. The following discussion illustrates some possible expectation actions in example implementations, among other example features.

For example, FIG. 15 illustrates an example event flow 1500 for a user utterance action in an implementation in which a user 1518 speaks with an interactive avatar 1504. In this example, the interactive avatar 1504 is implemented using a user interface 1516 (e.g., a microphone and an audio interface), a voice activity detector 1514, an automatic speech recognition system 1512, and an action server 1510 responsible for handling events for user utterance actions (e.g., UtteranceUserAction 1508). In this example, the action server 1510 acts as both a sensory server and an action server, converting sensory inputs into standardized events, and executing standardized events that instruct certain actions. An interaction manager 1506 may perform decision making for the interactive avatar 1504. Although the interaction manager 1506 and the interactive avatar 1504 are illustrated as separate components, the interaction manager 1506 could be considered part of the interactive avatar 1504.

In an example flow, at step 1520, the user 1518 starts talking. At step 1522, the voice activity detector 1514 picks up the speech and sends a speech stream to the automatic speech recognition system 1512. At step 1524, the voice activity detector 1514 notifies the action server 1510 that voice activity was detected, and at step 1526, the automatic speech recognition system 1512 streams the transcribed speech to the action server 1510. As such, at step 1528, the action server 1510 generates a standardized event indicating a detected user utterance has started (e.g., including the transcribed speech) and sends the event (e.g., UtteranceUserActionStarted) to the event gateway 1502, which the interaction manager 1506 picks up at step 1530.

The following steps 1532-1546 may execute in a loop. At step 1532, the user finished saying a few words, and at step 1534, the automatic speech recognition system 1512 sends a partial transcript to the action server 1510. At step 1536, the action server 1510 generates a standardized event indicating a detected update to a detected user utterance (e.g., including the transcribed speech) and sends the event (e.g., UtteranceUserActionTranscriptUpdated) to the event gateway 1502, which the interaction manager 1506 picks up at step 1538. At step 1540, the user speaks louder, and at step 1542, the voice activity detector 1514 detects the increase in volume and notifies the action server 1510 about the detected change in volume. At step 1544, the action server 1510 generates a standardized event indicating a detected update to a detected intensity of the user utterance (e.g., including a detected intensity or volume level) and sends the event (e.g., UtteranceUserActionIntensityUpdated) to the event gateway 1502, which the interaction manager 1506 picks up at step 1546.

In some embodiments, at step 1548, the interaction manager 1506 generates a standardized event that indicates an expectation that the user is about to stop talking and/or instructs the interactive avatar 1504 to take some preparatory action, and the interaction manager 1506 sends the event (e.g., StopUtteranceUserAction) to the event gateway 1502, which the action server 1510 picks up at step 1550. In response, at step 1552, the action server 1510 instructs the voice activity detector 1514 to decrease the audio hold time (e.g., the period of time during which a detected voice signal is sustained before being considered inactive or muted).

At step 1554, the user stops talking. At step 1556, the voice activity detector 1514 detects voice inactivity and stops the speech stream to the automatic speech recognition system 1512, and at step 1558, the automatic speech recognition system 1512 stops streaming a transcript to the action server 1510. At step 1560, the hold time times out, and at step 1562, the voice activity detector 1514 notifies the action server 1510 that voice inactivity was detected. As such, at step 1564, the action server 1510 generates a standardized event indicating a detected completion of a detected user utterance and sends the event (e.g., UtteranceUserActionFinished) to the event gateway 1502, which the interaction manager 1506 picks up at step 1566.

Figure 16:
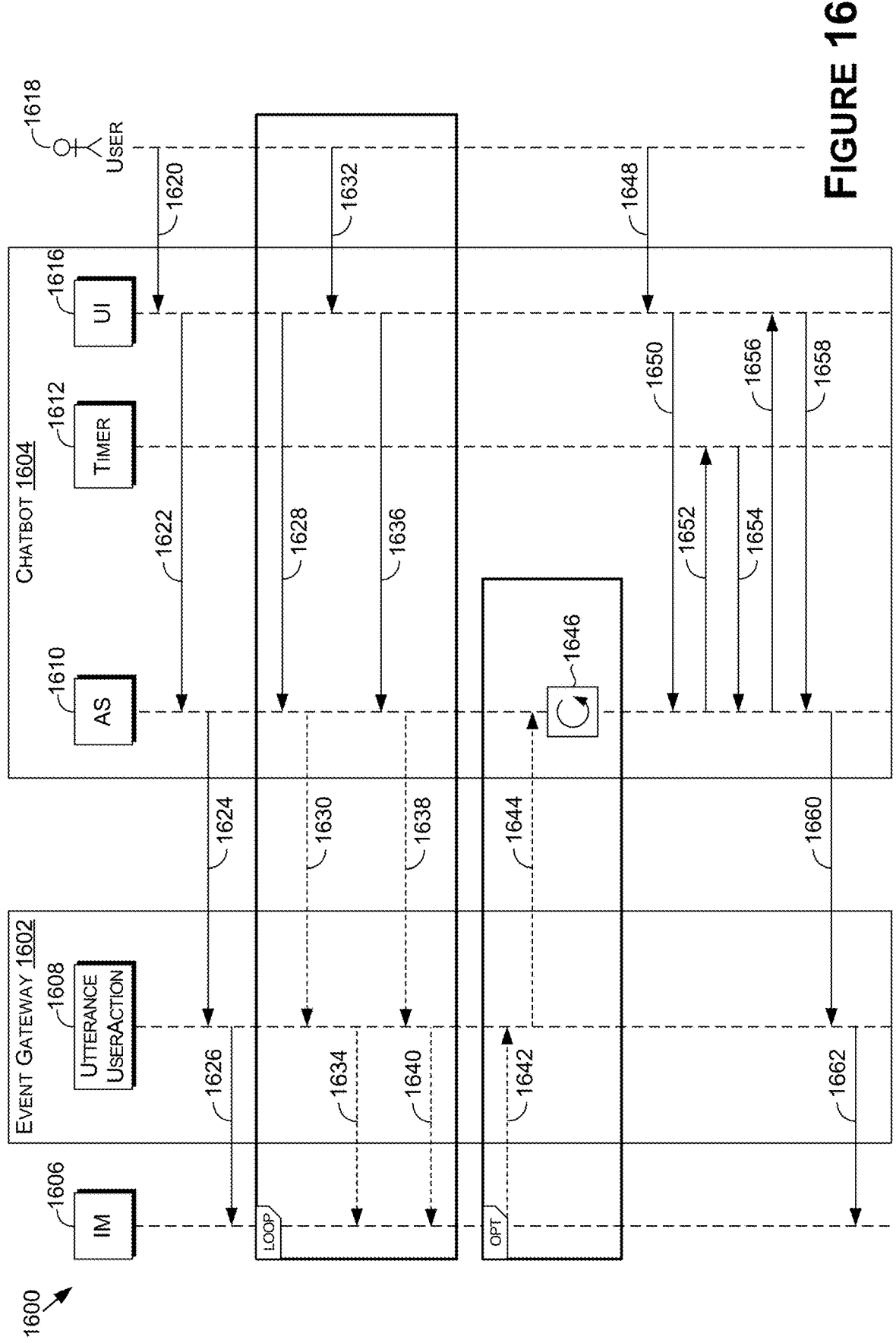
FIG. 16 illustrates an example event flow for a user utterance action in an implementation in which a user speaks with a chatbot, in accordance with some embodiments of the present disclosure.

FIG. 16 illustrates an example event flow 1600 for a user utterance action in an implementation in which a user 1618 speaks with a chatbot 1604. In this example, the chatbot 1604 is implemented using a user interface 1616 (e.g., a hardware or software keyboard and driver), a timer 1612, and an action server 1610 responsible for handling events for user utterance actions (e.g., UtteranceUserAction 1608). In this example, the action server 1610 acts as both a sensory server and an action server, converting sensory inputs (e.g., detected text, typing rate) into standardized events, and executing standardized events that instruct certain actions. An interaction manager 1606 may perform decision making for the chatbot 1604. Although the interaction manager 1606 and the chatbot 1604 are illustrated as separate components, the interaction manager 1606 could be considered part of the chatbot 1604.

In an example flow, at step 1620, the user 1618 starts typing. At step 1622, the user interface 1616 notifies the action server 1610 that typing has started, and at step 1624, the action server 1610 generates a standardized event indicating a detected user utterance has started and sends the event (e.g., UtteranceUserActionStarted) to the event gateway 1602, which the interaction manager 1606 picks up at step 1626.

The following steps 1628-1640 may execute in a loop. At step 1628, the user interface 1616 sends the typed text to the action server 1610, and at step 1630, the action server 1610 generates a standardized event indicating a detected update to a detected user utterance (e.g., including the typed text) and sends the event (e.g., UtteranceUserActionTranscriptUpdated) to the event gateway 1602, which the interaction manager 1606 picks up at step 1634. At step 1632, the user starts typing faster, and at step 1636, the user interface 1616 detects the increase in typing speed and notifies the action server 1610 about the detected change in speed. At step 1638, the action server 1610 generates a standardized event indicating a detected update to a detected intensity of the user utterance (e.g., including a detected intensity or typing speed) and sends the event (e.g., UtteranceUserActionIntensityUpdated) to the event gateway 1602, which the interaction manager 1606 picks up at step 1640.

In some embodiments, at step 1642, the interaction manager 1606 generates a standardized event that indicates an expectation that the user is about to stop typing and/or instructs the chatbot 1604 to take some preparatory action, and the interaction manager 1606 sends the event (e.g., StopUtterance UserAction) to the event gateway 1602, which the action server 1610 picks up at step 1644. In response, at step 1646, the action server 1610 decreases the timeout after keystroke (e.g., the period of time during which detected inactivity or delay in typing is interpreted as completion of the utterance).

At step 1648, the user stops typing. At step 1650, the user interface 1616 sends the action server 1610 a notification that the typing stopped, and at step 1652, the action server 1610 instructs the timer 1612 to start. At step 1654, the timer 1612 informs the action server 1610 that the timer elapsed, and the action server 1610 informs the user interface 1616 to block the input field from further input. At step 1658, the user interface 1616 sends the completed text input to the action server 1610. As such, at step 1660, the action server 1610 generates a standardized event indicating a detected completion of a detected user utterance (e.g., including the completed text input) and sends the event (e.g., UtteranceUserActionFinished) to the event gateway 1602, which the interaction manager 1606 picks up at step 1662.

Figure 17:
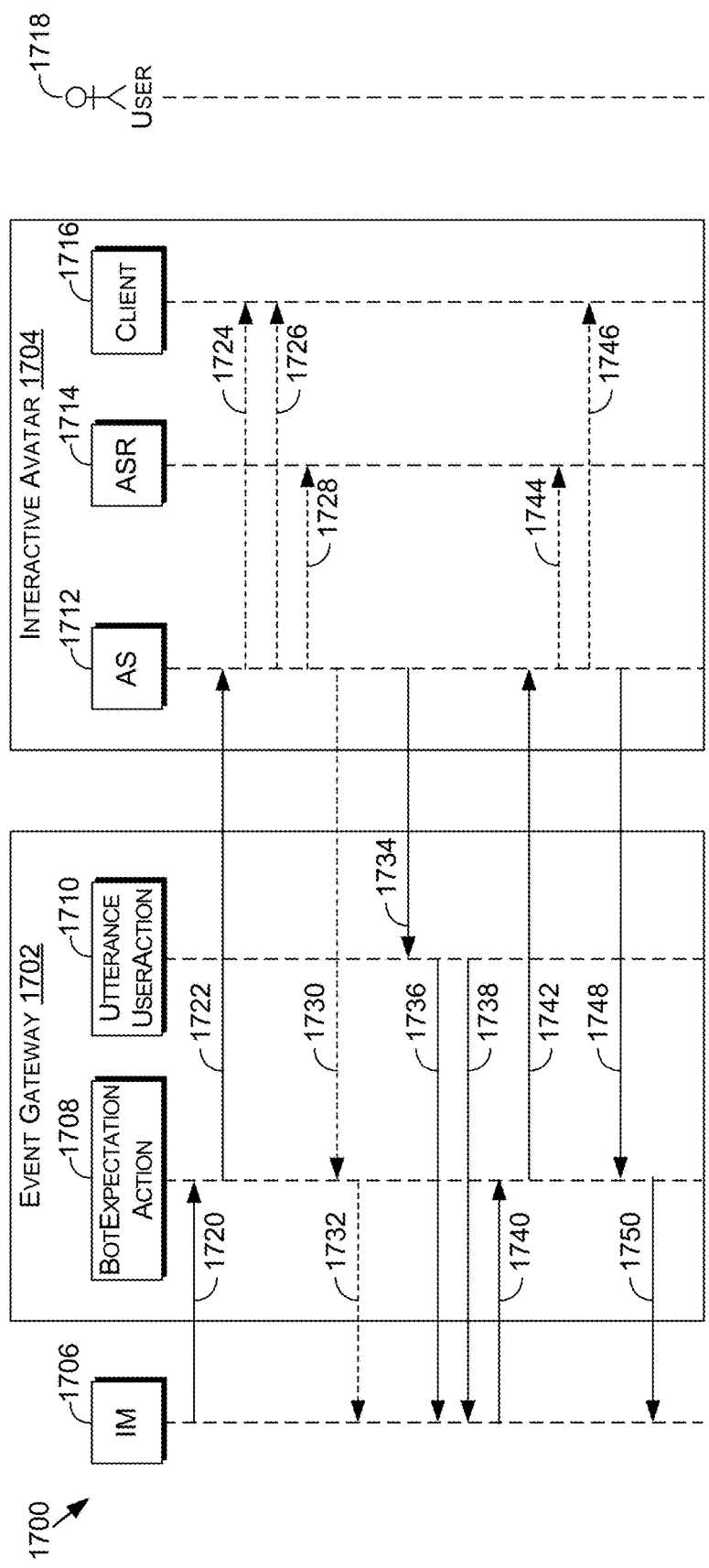
FIG. 17 illustrates an example event flow for a bot expectation action in an implementation in which a user speaks with an interactive avatar, in accordance with some embodiments of the present disclosure.

FIG. 17 illustrates an example event flow 1700 for a bot expectation action in an implementation in which a user 1718 speaks with an interactive avatar 1704. In this example, the interactive avatar 1704 is implemented using a client device 1716, (e.g., including a microphone and an audio interface), an automatic speech recognition system 1714, and an action server 1712 responsible for handling events for user utterance actions (e.g., UtteranceUserAction 1710) and bot expectation actions for user utterance actions (e.g., BotExepectionAction 1708). In this example, the action server 1712 acts as both a sensory server and an action server, converting sensory inputs into standardized events, and executing standardized events that instruct certain actions. An interaction manager 1706 may perform decision making for the interactive avatar 1704. Although the interaction manager 1706 and the interactive avatar 1704 are illustrated as separate components, the interaction manager 1706 could be considered part of the interactive avatar 1704.

At step 1720, the interaction manager 1706 generates a standardized event indicating a user utterance is expected to start soon and representing an instruction to take some preparatory action in anticipation of the utterance), and user sends the event (e.g., StartBotExpectionAction (UtteranceUserActionFinished)) to the event gateway 1702, which the action server 1712 picks up at step 1722. Note that in this example, the argument of the keyword used to identify the expectation is an expected target event (e.g., the completion of the user utterance) that may trigger a corresponding stop action indicating the expectation of the interaction manager 1706 has been met or is no longer relevant, which itself may trigger reversal of the preparatory action, but this syntax is meant simply as an example and need not be used. In response, at step 1724, the action server 1712 informs the client device 1716 to disable its audio output, at step 1726, informs the client device 1716 to enable its microphone, and at step 1728, informs the automatic speech recognition system 1714 to enable automatic speech recognition. At step 1730, the action server 1712 generates a standardized event acknowledging the bot expectation action has started and/or indicating the preparatory action has been initiated and sends the event (e.g., BotExpectionActionStarted (UtteranceUserActionFinished)) to the event gateway 1702, which the interaction manager 1706 picks up at step 1732.

In some embodiments, when the user 1718 begins speaking, the speech is detected (not illustrated), and at step 1734, the action server 1712 generates a standardized event indicating a detected user utterance has started and sends the event (e.g., UtteranceUserActionStarted) to the event gateway 1702, which the interaction manager 1706 picks up at step 1736. Once the user 1718 stops speaking, the end of the utterance is detected (not illustrated), the action server 1712 generates a standardized event indicating a detected completion of a detected user utterance and sends the event (e.g., UtteranceUserActionFinished) to the event gateway 1702

(not illustrated), which the interaction manager 1706 picks up at step 1738. In this example, the interaction manager 1706 is programmed to stop the bot expectation action in response to receiving an event indicating a detected completion of a detected user utterance, so at step 1740, the interaction manager 1706 generates a standardized event indicating the expected user utterance has finished and instructing reversal of the preparatory action, sends and the event (e.g., StopBotExpectionAction (UtteranceUserActionFinished)) to the event gateway 1702, which the action server 1712 picks up at step 1742. In response, at step 1744, the action server 1712 instructs the automatic speech recognition system 1714 to stop automatic speech recognition, and at step 1746, instructs the client device 1716 to disable its microphone. At step 1748, the action server 1712 generates a standardized event acknowledging the bot expectation action has finished and/or indicating the preparatory action has been reversed and sends the event (e.g., BotExpectionActionFinished (UtteranceUserActionFinished)) to the event gateway 1702, which the action server 1712 picks up at step 1750.

Flow charts. Now referring to FIGS. 18-27, each block of methods 1800-2700, described herein, comprises a computing process that may be performed using any combination of hardware, firmware, and/or software. For instance, various functions may be carried out by a processor executing instructions stored in memory. The method 1800-2700 may also be embodied as computer-usable instructions stored on computer storage media. The method 1800-2700 may be provided by a standalone application, a service or hosted service (standalone or in combination with another hosted service), or a plug-in to another product, to name a few. In addition, the methods 1800-2700 are described by way of an example system, such as the interactive system 100 of FIG. 1. However, these methods may additionally or alternatively be executed by any one system, or any combination of systems, including, but not limited to, those described herein.

FIG. 18 is a flow diagram showing a method 1800 for generating a representation of a responsive agent action categorized using an interaction categorization schema, in accordance with some embodiments of the present disclosure. The method 1800, at block B1802, includes receiving, by an interpreter of an interactive agent platform associated with an interactive agent, one or more representations of one or more detected user actions categorized using an interaction categorization schema. For example, with respect to the interactive system 100 of FIG. 1, some representation of user input such as a gesture detected by the vision microservice 110, a voice command detected by the speech detection microservice 120, or a touch or click input detected by the UI server 130 may be forwarded to a corresponding one of the sensory server(s) 160 that is responsible for a corresponding interaction channel. The sensory server(s) 160 may translate that user input into a standardized representation of a corresponding event defined by an interaction categorization schema and place the event on an event gateway 180. The interaction manager 190 may implement an interpreter that is subscribed or otherwise configured to pick up or receive those events from the event gateway 180.

The method 1800, at block B1804, includes generating, based at least on the interpreter executing one or more instruction lines of one or more interaction flows that are composed in an interaction modeling language and instruct one or more agent actions to generate in response to the one or more detected user actions, one or more representations of one or more responsive agent actions categorized using the interaction categorization schema. For example, with respect to the interactive system 100 of FIG. 1, an interpreter implemented by the interaction manager 190 may support an interaction modeling language, and code that implements the decision logic for an interactive agent may be written in the interaction modeling language, loaded onto or otherwise accessed by the interaction manager 190, and executed by the interaction manager 190. As such, the interaction manager 190 may process events from the event gateway 180 (e.g., using an event-driven state machine), determine what interactions to engage in, and generate and forward commands as corresponding events in a standardized representation to the event gateway 180.

FIG. 19 is a flow diagram showing a method 1900 for generating a representation of a responsive agent action based at least on executing one or more interaction flows, in accordance with some embodiments of the present disclosure. The method 1900, at block B1902, includes receiving, by an interpreter of an interactive agent platform that supports simultaneous execution of agent actions in different interaction modalities, one or more representations of one or more detected user actions. For example, with respect to the interactive system 100 of FIG. 1, the interaction manager 190 may implement an interpreter that is subscribed or otherwise configured to pick up or receive events representing detected user actions from the event gateway 180. The interaction manager 190 may implement decision logic for an interactive agent written in an interaction modeling language, and the interaction modeling API and/or language used by the interaction manager 190 may define mutually exclusive interaction modalities, such that events instructing actions in different interaction modalities may be executed by corresponding action server(s) 170 dedicated to corresponding interaction modalities, independently of one other (e.g., simultaneously).

The method 1900, at block B1904, includes generating, based at least on the interpreter executing one or more instruction lines of one or more interaction flows in response to the one or more detected user actions, one or more representations of one or more responsive agent actions. For example, with respect to the interactive system 100 of FIG. 1, code that implements the decision logic for an interactive agent and defines one or more flows of interactions may be written in the interaction modeling language, loaded onto or otherwise accessed by an interpreter implemented by the interaction manager 190, and executed by the interpreter. As such, the interaction manager 190 may process events (e.g., representing detected user actions) from the event gateway 180 (e.g., using an event-driven state machine), determine what interactions to engage in, and generate and forward commands as corresponding events in a standardized representation to the event gateway 180.

Figure 20:
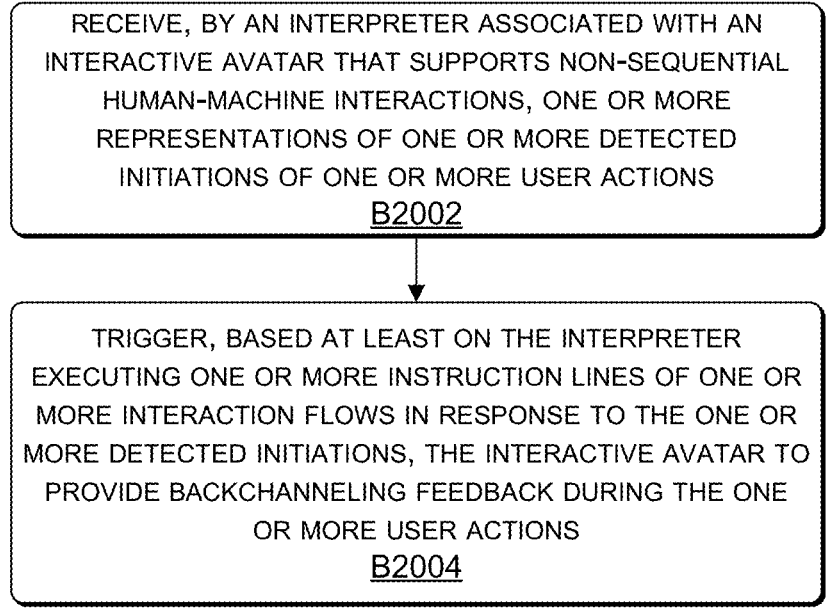
FIG. 20 is a flow diagram showing a method for triggering an interactive avatar to provide backchanneling feedback, in accordance with some embodiments of the present disclosure.

FIG. 20 is a flow diagram showing a method 2000 for triggering an interactive avatar to provide backchanneling feedback, in accordance with some embodiments of the present disclosure. The method 2000, at block B2002, includes receiving, by an interpreter associated with an interactive avatar that supports non-sequential human-machine interactions, one or more representations of one or more detected initiations of one or more user actions, and at block B2004, includes triggering, based at least on the interpreter executing one or more instruction lines of one or more interaction flows in response to the one or more detected initiations, the interactive avatar to provide backchanneling feedback during the one or more user actions. For example, the interactive system 100 of FIG. 1 may support non-sequential interactions using various features described herein, such as an event-driven architecture, an interpreter that supports various keywords, and/or decoupling of decouple sensory processing, interaction decision-making, and action execution. For example, to support executing a responsive agent action prior to completion of a triggering user action (e.g., an utterance), the sensory server(s) 160 may generate an event representing a detected initiation of the user action, and provide the event (via the event gateway 180) to the interaction manager 190, and the interaction manager 190 may check the event for a matching active (e.g., interrupted) flow that is waiting for such an event. Since the sensory server(s) 160, the interaction manager 190, and the action server(s) 170 may operate independently of one another, the sensory server(s) 160 may continue to process the user input while the interaction manager 190 generates an event representing a responsive action and triggers the action server(s) 170 to execute the responsive action (e.g., backchanneling feedback).

Figure 21:
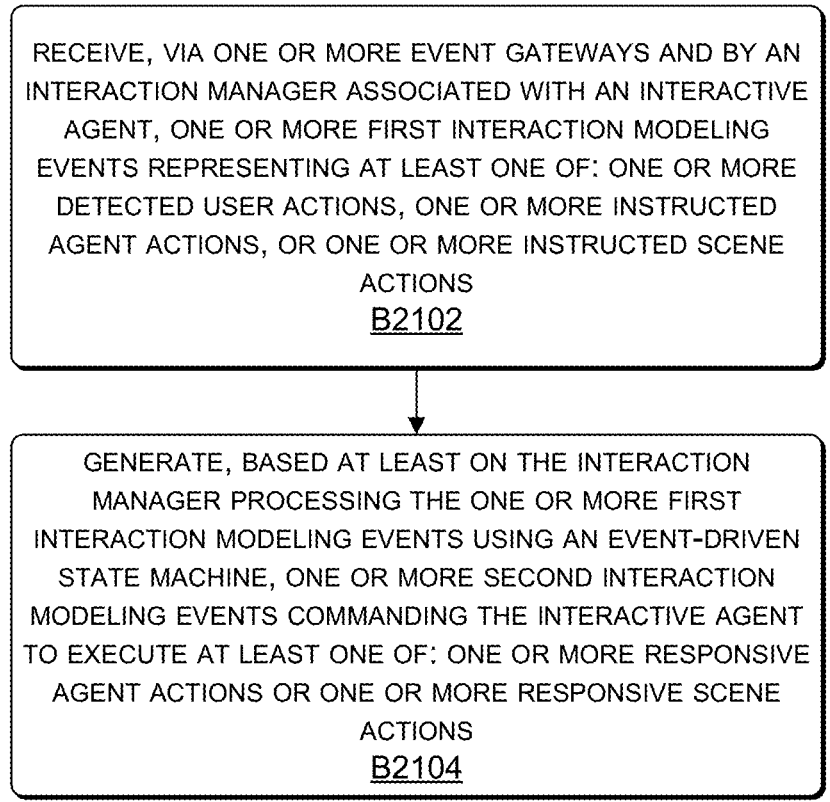
FIG. 21 is a flow diagram showing a method for generating an interaction modeling event commanding an interactive agent to execute a responsive agent or scene action, in accordance with some embodiments of the present disclosure.

FIG. 21 is a flow diagram showing a method 2100 for generating an interaction modeling event commanding an interactive agent to execute a responsive agent or scene action, in accordance with some embodiments of the present disclosure. The method 2100, at block B2102, includes receiving, via one or more event gateways and by an interaction manager associated with an interactive agent, one or more first interaction modeling events representing at least one of: one or more detected user actions, one or more instructed agent actions, or one or more instructed scene actions. For example, with respect to the interactive system 100 of FIG. 1, the sensory server(s) 160 may translate detected user input into a standardized representation of a corresponding event and place the event on an event gateway 180. Furthermore, with respect to FIG. 6, the interaction manager 640 may generate internal events 660 representing internal state changes (e.g., flow state changes) or instructed bot actions, and/or the action server 670 may generate events 665 representing confirmation of action state changes. As such, the interaction manager 190 of FIG. 1 and/or the interaction manager 640 of FIG. 6 may be subscribed or otherwise configured to pick up or receive the events from the event gateway 180.

The method 2100, at block B2104, includes generating, based at least on the interaction manager processing the one or more first interaction modeling events using an event-driven state machine, one or more second interaction modeling events commanding the interactive agent to execute at least one of: one or more responsive agent actions or one or more responsive scene actions. For example, with respect to the event-driven interactive system 600 of FIG. 6, the interaction manager 640 (which may correspond with the interaction manager 190 of FIG. 1 and/or FIG. 2) may be responsible for deciding what actions the interactive system 600 should perform in response to user actions or other events (e.g., the standardized input events 630, the internal events 660, the events 665 representing confirmation of action state changes). The interaction manager 640 may interact with the rest of the interactive system 600 through an event-driven mechanism. As such, the interaction manager 640 may evaluate various types of events (e.g., the standardized input events 630, internal events 660, events 665 representing confirmation of action state changes), determine which actions to perform, and generate corresponding instructed bot action events 650 or events instruction updates to some other aspect of the scene (e.g., interactive visual content actions).

Figure 22:
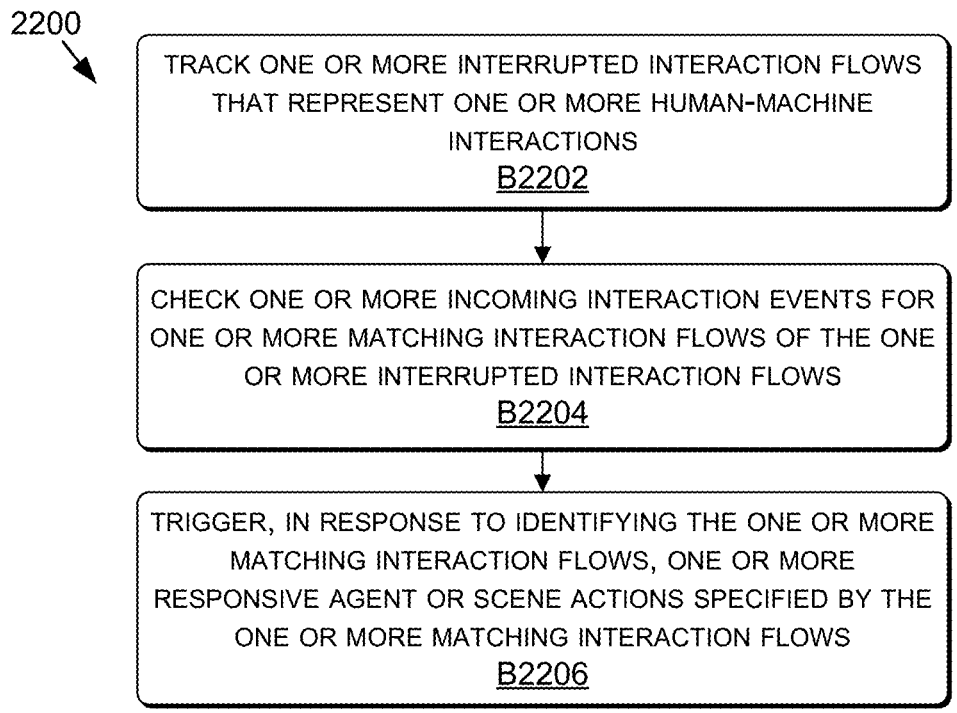
FIG. 22 is a flow diagram showing a method for triggering one or more responsive agent or scene actions specified by one or more matching interaction flows, in accordance with some embodiments of the present disclosure.

FIG. 22 is a flow diagram showing a method 2200 for triggering one or more responsive agent or scene actions specified by one or more matching interaction flows, in accordance with some embodiments of the present disclosure. The method 2200, at block B2202, includes tracking one or more interrupted interaction flows that represent one or more human-machine interactions. For example, with respect to the event-driven interactive system 600 of FIG. 6, the interaction manager 640 may support and keep track of multiple active flows (e.g., interrupted at corresponding event matchers).

The method 2200, at block B2204, includes checking one or more incoming interaction events for one or more matching interaction flows of the one or more interrupted interaction flows. For example, with respect to the event-driven interactive system 600 of FIG. 6, the interaction manager 640 may employ an event-driven state machine to listen for events that match an event matcher of an active flow. For example, the flow matcher 740 of FIG. 7 may evaluate incoming events to determine whether they match an event matcher of an active flow, sequentially processing incoming events (e.g., from the internal event queue 790, from some other a queue or event gateway, such as the event gateway 180 of FIG. 1), and for each event, test the event matcher specified by each active flow for a match with the event.

The method 2200, at block B2206, includes triggering, in response to identifying the one or more matching interaction flows, one or more responsive agent or scene actions specified by the one or more matching interaction flows. For example, with respect to the event-driven interactive system 600 of FIG. 6, the interaction manager 640 may trigger corresponding events and actions specified in flows that match the event being tested. For example, the flow matcher 740 of FIG. 7 may instruct the flow execution component 750 to advance (e.g., non-conflicted) matching flows, and the advancing flows may instruct the flow execution component 750 to generate outgoing events that instruct some action.

Figure 23:
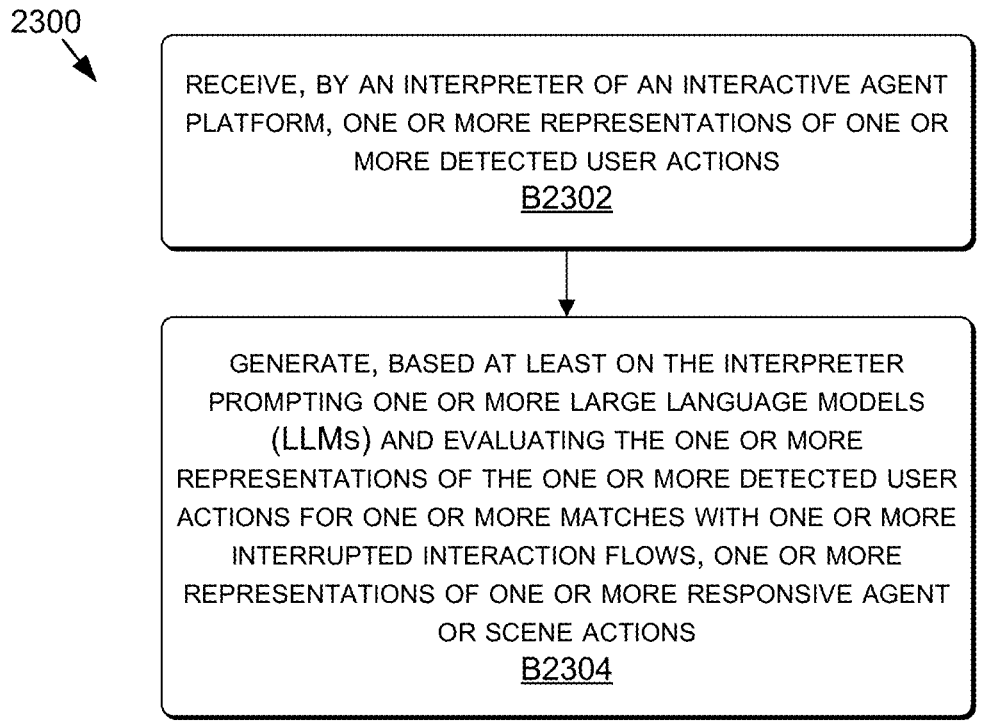
FIG. 23 is a flow diagram showing a method for generating a responsive agent or scene action based at least on prompting one or more large language models, in accordance with some embodiments of the present disclosure.

FIG. 23 is a flow diagram showing a method 2300 for generating a responsive agent or scene action based at least on prompting one or more large language models, in accordance with some embodiments of the present disclosure. The method 2300, at block B2302, includes receiving, by an interpreter of an interactive agent platform, one or more representations of one or more detected user actions. For example, with respect to the interactive system 100 of FIG. 1, the sensory server(s) 160 may translate detected user input into a standardized representation of a corresponding event and place the event on an event gateway 180, and the interaction manager 190 may implement an interpreter that is subscribed or otherwise configured to pick up or receive the events from the event gateway 180.

The method 2300, at block B2304, includes generating, based at least on the interpreter prompting one or more large language models (LLMs) and evaluating the one or more representations of the one or more detected user actions for one or more matches with one or more interrupted interaction flows, one or more representations of one or more responsive agent or scene actions. For example, with respect to FIG. 7, the interpreter 710 may support the use of natural language descriptions and the use of one or more LLMs. For example, the interpreter 710 may prompt an LLM to generate a natural language description of one or more instruction lines defining a flow, generate one or more instruction lines for a specified flow, determine whether an event matches a flow description of an active flow, determine whether an unmatched event matches the name and/or instruction(s) of an active flow, generate a flow in response to an unmatched event, and/or otherwise.

Figure 24:
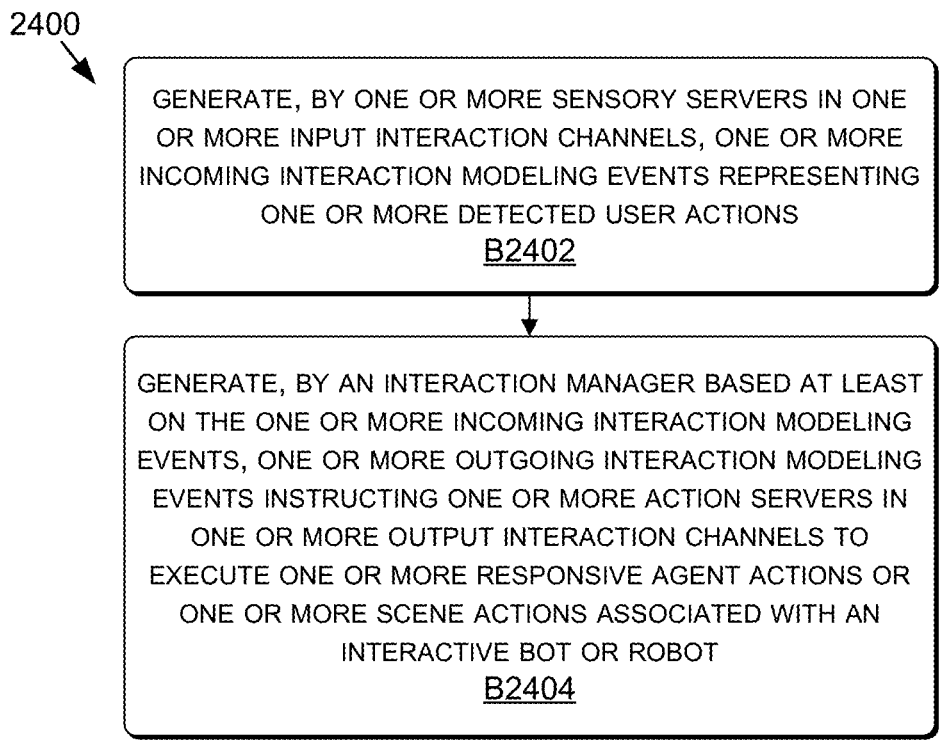
FIG. 24 is a flow diagram showing a method for generating one or more outgoing interaction modeling events instructing one or more action servers to execute one or more responsive agent or scene actions, in accordance with some embodiments of the present disclosure.

FIG. 24 is a flow diagram showing a method 2400 for generating one or more outgoing interaction modeling events instructing one or more action servers to execute one or more responsive agent or scene actions, in accordance with some embodiments of the present disclosure. The method 2400, at block B2402, includes generating, by one or more sensory servers in one or more input interaction channels, one or more incoming interaction modeling events representing one or more detected user actions. For example, with respect to the interactive system 100 of FIG. 1, the sensory server(s) 160 may translate detected user input into a standardized representation of a corresponding event and place the event on an event gateway 180.

The method 2400, at block B2404, includes generating, by an interaction manager based at least on the one or more incoming interaction modeling events, one or more outgoing interaction modeling events instructing one or more action servers in one or more output interaction channels to execute one or more responsive agent actions or scene actions associated with an interactive agent. For example, with respect to the interactive system 100 of FIG. 1, the interaction manager 190 may implement an interpreter that is subscribed or otherwise configured to pick up or receive the events from the event gateway 180, process the events (e.g., using an event-driven state machine), determine what interactions to engage in, and generate and forward commands as corresponding events in a standardized representation to the event gateway 180. The action server(s) 170 responsible for corresponding interaction channel(s) may be subscribed or otherwise configured to pick up or receive those events it is responsible for executing from the event gateway 180. As such, the action server(s) 170 may execute, schedule, and/or otherwise handle events for corresponding interaction modality(s), interfacing with a corresponding service that controls a corresponding output interface.

Figure 25:
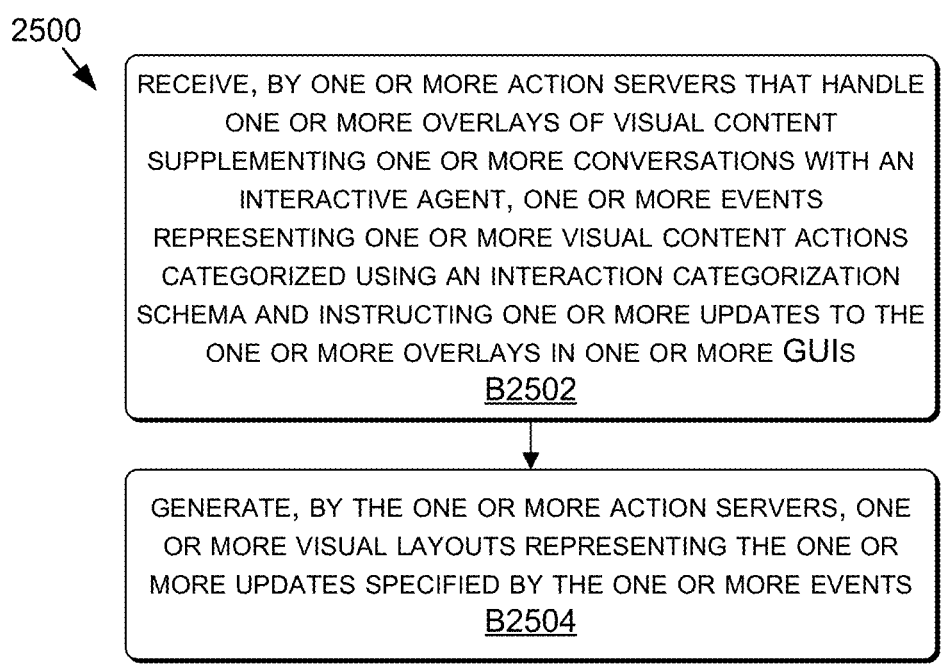
FIG. 25 is a flow diagram showing a method for generating a visual layout representing an update specified by an event, in accordance with some embodiments of the present disclosure.

FIG. 25 is a flow diagram showing a method 2500 for generating a visual layout representing an update specified by an event, in accordance with some embodiments of the present disclosure. The method 2500, at block B2502, includes receiving, by one or more action servers that handle one or more overlays of visual content supplementing one or more conversations with an interactive agent, one or more events representing one or more visual content actions categorized using an interaction categorization schema and instructing one or more updates to the one or more overlays in one or more GUIs. For example, with respect to FIG. 9, the action server 930 may include a GUI service (e.g., Modality Service B) that handles interactive visual content and corresponding events. An interactive visual content event (e.g., generated by an interaction manager such as the interaction manager 190 of FIG. 1 or the interaction manager 700 of FIG. 7) may instruct visualization of different types of visual information (e.g., in a 2D or 3D interface). In some embodiments, an interactive visual content event (e.g., payload) comprises fields that specify or encode values representing a supported action type categorizing an (e.g., instructed action VisualInformationSceneAction, VisualChoiceSceneAction, VisualFormSceneAction), an action state (e.g., "init", "scheduled", "starting", "running", "paused", "resuming", "stopping" or "finished"), some representation of instructed visual content, and/or other properties or information.

The method 2500, at block B2504, includes generating, by the one or more action servers, one or more visual layouts representing the one or more updates specified by the one or more events. For example, with respect to FIG. 9, the action server 930 may include a GUI service (e.g., Modality Service B) that includes an action handler for each supported event for each supported interactive visual content action, and the action handler for a corresponding (e.g., a start) event for a visual information scene action may translate the event into a (e.g., JSON) representation of a modular GUI configuration specifying blocks of content such as a hint carousel block for one or more specified support blocks, a header block for a specified title, image and/or text blocks for the specified content, a (e.g., continue, cancel) button(s), and/or other elements. Accordingly, the action handler may use these blocks of content to generate a custom page by populating a visual layout (e.g., a designated template or shell visual layout with corresponding placeholders) for a GUI overlay (e.g., an HTML) layout, and may call the user interface server endpoint with the custom page to trigger the user interface server to present the custom page.

Figure 26:
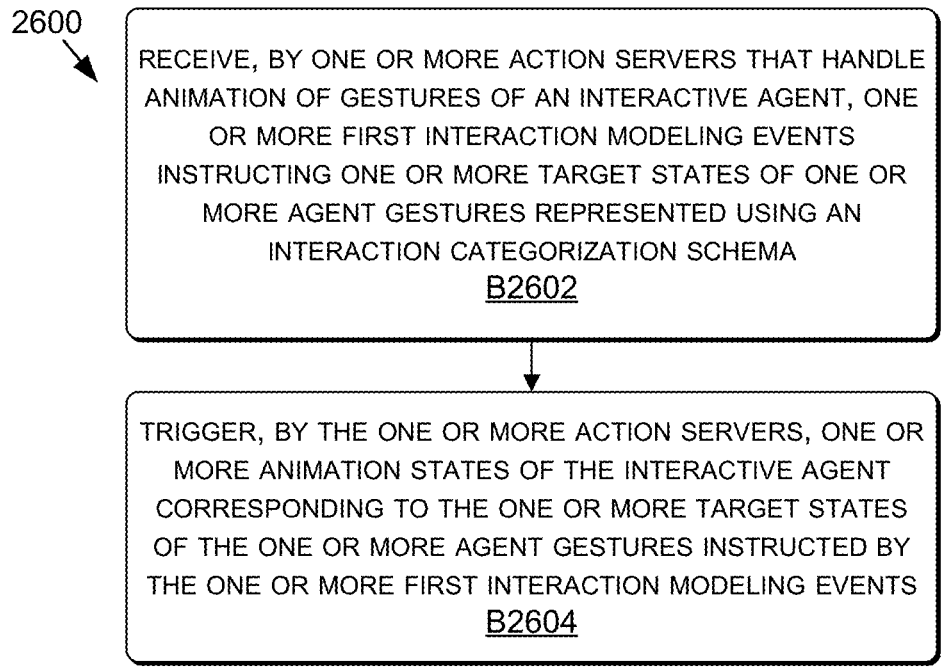
FIG. 26 is a flow diagram showing a method for triggering an animation state of an interactive agent, in accordance with some embodiments of the present disclosure.

FIG. 26 is a flow diagram showing a method 2600 for triggering an animation state of an interactive agent, in accordance with some embodiments of the present disclosure. The method 2600, at block B2602, includes receiving, by one or more action servers that handle animation of gestures of an interactive agent, one or more first interaction modeling events instructing one or more target states of one or more agent gestures represented using an interaction categorization schema. For example, with respect to FIG. 9, the action server 930 may include an animation service (e.g., Modality Service A) that handles bot movement and/or gesture actions (e.g., GestureBotAction) and corresponding events. For example, a bot gesture action event (e.g., generated by an interaction manager such as the interaction manager 190 of FIG. 1 or the interaction manager 700 of FIG. 7) may instruct a designated animation (e.g., in a 2D or 3D interface) using fields that specify or encode values representing a supported action type categorizing an instructed action (e.g., GestureBotAction), an action state (e.g., start, started, updated, stop, finished), some representation of an instructed bot gesture, and/or other properties or information.

The method 2600, at block B2604, includes triggering, by the one or more action servers, one or more animation states of the interactive agent corresponding to the one or more target states of the one or more agent gestures instructed by the one or more first interaction modeling events. For example, with respect to FIG. 9, the action server 930 may include an animation service (e.g., Modality Service A) that includes an action handler for each supported event for each supported bot gesture action. FIG. 12D illustrates some example action handlers for some example GestureBotAction events, in accordance with some embodiments of the present disclosure. Taking a bot gesture specified for a bot gesture action as a natural language description as an example, the action handler for a corresponding (e.g., start) event for the bot gesture action may extract the natural language description from the event, generate or access a sentence embedding for the natural language description of the bot gesture, use it to perform a similarity search on sentence embeddings for descriptions of the available animations, and select an animation using some measure of similarity (e.g., nearest neighbor, within a threshold).

Figure 27:
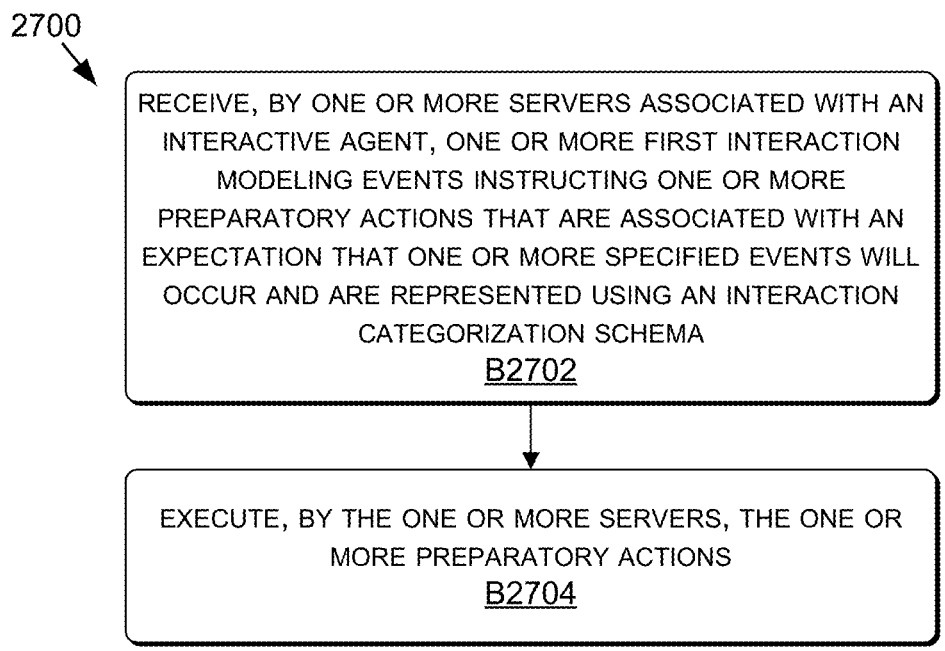
FIG. 27 is a flow diagram showing a method for executing one or more preparatory actions, in accordance with some embodiments of the present disclosure.

FIG. 27 is a flow diagram showing a method 2700 for executing one or more preparatory actions, in accordance with some embodiments of the present disclosure. The method 2700, at block B2702, includes receiving, by one or more servers associated with an interactive agents, one or more first interaction modeling events instructing one or more preparatory actions that are associated with an expectation that one or more specified events will occur and are represented using an interaction categorization schema. For example, with respect to FIG. 17, at step 1720, the interaction manager 1706 generates a standardized event indicating a user utterance is expected to start soon and instructing a preparatory action, and sends the event (e.g., StartBotExpectionAction (UtteranceUserActionFinished)) to the event gateway 1702, which the action server 1712 picks up at step 1722.

The method 2700, at block B2704, includes executing, by the first server, the one or more preparatory actions. For example, with respect to FIG. 17, at step 1724, the action server 1712 informs the client device 1716 to disable its audio output, at step 1726, informs the client device 1716 to enable its microphone, and at step 1728, informs the automatic speech recognition system 1714 to enable automatic speech recognition. At step 1730, the action server 1712 generates a standardized event acknowledging the bot expectation action has started and/or indicating the preparatory action has been initiated and sends the event (e.g., BotExpectionActionStarted (UtteranceUserActionFinished)) to the event gateway 1702, which the interaction manager 1706 picks up at step 1732.

The systems and methods described herein may be used for a variety of purposes, by way of example and without limitation, for machine (e.g., robot, vehicle, construction machinery, warehouse vehicles/machines, autonomous, semi-autonomous, and/or other machine types) control, machine locomotion, machine driving, synthetic data generation, model training (e.g., using real, augmented, and/or synthetic data, such as synthetic data generated using a simulation platform or system, synthetic data generation techniques such as but not limited to those described herein, etc.), perception, augmented reality (AR), virtual reality (VR), mixed reality (MR), robotics, security and surveillance (e.g., in a smart cities implementation), autonomous or semi-autonomous machine applications, deep learning, environment simulation, object or actor simulation and/or digital twinning, data center processing, conversational AI, light transport simulation (e.g., ray-tracing, path tracing, etc.), distributed or collaborative content creation for 3D assets (e.g., using universal scene descriptor (USD) data, such as OpenUSD, and/or other data types), cloud computing, generative artificial intelligence (e.g., using one or more diffusion models, transformer models, etc.), and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot or robotic platform, aerial systems, medial systems, boating systems, smart area monitoring systems, systems for performing deep learning operations, systems for performing simulation operations (e.g., in a driving or vehicle simulation, in a robotics simulation, in a smart cities or surveillance simulation, etc.), systems for performing digital twin operations (e.g., in conjunction with a collaborative content creation platform or system, such as, without limitation, NVIDIA's OMNIVERSE and/or another platform, system, or service that uses USD or OpenUSD data types), systems implemented using an edge device, systems incorporating one or more virtual machines (VMs), systems for performing synthetic data generation operations (e.g., using one or more neural rendering fields (NERFs), gaussian splat techniques, diffusion models, transformer models, etc.), systems implemented at least partially in a data center, systems for performing conversational AI operations, systems implementing one or more language models-such as one or more large language models (LLMs), one or more vision language models (VLMs), one or more multi-modal language models, etc., systems for performing light transport simulation, systems for performing collaborative content creation for 3D assets (e.g., using universal scene descriptor (USD) data, such as OpenUSD, computer aided design (CAD) data, 2D and/or 3D graphics or design data, and/or other data types), systems implemented at least partially using cloud computing resources, and/or other types of systems.

In some embodiments, the systems and methods described herein may be performed within a 3D content collaboration platform (e.g., NVIDIA's OMNIVERSE) for 3D rendering, industrial digitalization, generative physical AI, and/or other use cases, applications, or services. For example, the content collaboration platform may host a framework for developing and/or deploying interactive agents (e.g., an interactive avatar), and may include a system for using or developing universal scene descriptor (USD) (e.g., OpenUSD) data for managing objects, features, scenes, etc. within a digital environment, simulated environment, etc. The platform may include real physics simulation, such as using NVIDIA's PhysX SDK, in order to simulate real physics and physical interactions with virtual objects, characters, simulations, or other types of 3D content hosted by the platform. The platform may integrate OpenUSD along with ray tracing/path tracing/light transport simulation (e.g., NVIDIA's RTX rendering technologies) into software tools and rendering workflows. In some embodiments, development and/or deployment of an interactive agent (e.g., an interactive bot or robot) may leverage one or more cloud services and/or machine learning models (e.g., neural networks, large language models). For example, NVIDIA's Avatar Cloud Engine (ACE) is a suite of cloud-based AI models and services designed to create and manage interactive, lifelike avatars using hosted natural language processing, speech recognition, computer vision, and/or conversational AI services. In some embodiments, an interactive agent may be developed and/or deployed as part of an application hosted by a (e.g., streaming) platform such as a cloud-based gaming platform (e.g., NVIDIA GEFORCE NOW). As such, interactive agents such as digital avatars may be developed and/or deployed for various applications, such as customer service, virtual assistants, interactive entertainment or gaming, digital twins (e.g., for video conferencing participants), education or training, health care, virtual or augmented reality experiences, social media interactions, marketing and advertising, and/or other applications.

Example Language Models

In at least some embodiments, language models, such as large language models (LLMs), vision language models (VLMs), multi-modal language models (MMLMs), and/or other types of generative artificial intelligence (AI) may be implemented. These models may be capable of understanding, summarizing, translating, and/or otherwise generating text (e.g., natural language text, code, etc.), images, video, computer aided design (CAD) assets, OMNIVERSE and/or METAVERSE file information (e.g., in USD format, such as OpenUSD), and/or the like, based on the context provided in input prompts or queries. These language models may be considered "large," in embodiments, based on the models being trained on massive datasets and having architectures with large number of learnable network parameters (weights and biases)—such as millions or billions of parameters. The LLMs/VLMs/MMLMs/etc. may be implemented for summarizing textual data, analyzing and extracting insights from data (e.g., textual, image, video, etc.), and generating new text/image/video/etc. in user-specified styles, tones, and/or formats. The LLMs/VLMs/MMLMs/etc. of the present disclosure may be used exclusively for text processing, in embodiments, whereas in other embodiments, multi-modal LLMs may be implemented to accept, understand, and/or generate text and/or other types of content like images, audio, 2D and/or 3D data (e.g., in USD formats), and/or video. For example, vision language models (VLMs), or more generally multi-modal language models (MMLMs), may be implemented to accept image, video, audio, textual, 3D design (e.g., CAD), and/or other inputs data types and/or to generate or output image, video, audio, textual, 3D design, and/or other output data types.

Various types of LLMs/VLMs/MMLMs/etc. architectures may be implemented in various embodiments. For example, different architectures may be implemented that use different techniques for understanding and generating outputs-such as text, audio, video, image, 2D and/or 3D design or asset data, etc. In some embodiments, LLMs/VLMs/MMLMs/etc. architectures such as recurrent neural networks (RNNs) or long short-term memory networks (LSTMs) may be used, while in other embodiments transformer architectures-such as those that rely on self-attention and/or cross-attention (e.g., between contextual data and textual data) mechanisms—may be used to understand and recognize relationships between words or tokens and/or contextual data (e.g., other text, video, image, design data, USD, etc.). One or more generative processing pipelines that include LLMs/VLMs/MMLMs/etc. may also include one or more diffusion block(s) (e.g., denoisers). The LLMs/VLMs/MMLMs/etc. of the present disclosure may include encoder and/or decoder block(s). For example, discriminative or encoder-only models like BERT (Bidirectional Encoder Representations from Transformers) may be implemented for tasks that involve language comprehension such as classification, sentiment analysis, question answering, and named entity recognition. As another example, generative or decoder-only models like GPT (Generative Pretrained Transformer) may be implemented for tasks that involve language and content generation such as text completion, story generation, and dialogue generation. LLMs/VLMs/MMLMs/etc. that include both encoder and decoder components like T5 (Text-to-Text Transformer) may be implemented to understand and generate content, such as for translation and summarization. These examples are not intended to be limiting, and any architecture type-including but not limited to those described herein—may be implemented depending on the particular embodiment and the task(s) being performed using the LLMs/VLMs/MMLMs/etc.

In various embodiments, the LLMs/VLMs/MMLMs/etc. may be trained using unsupervised learning, in which an LLMs/VLMs/MMLMs/etc. learns patterns from large amounts of unlabeled text/audio/video/image/design/USD/etc. data. Due to the extensive training, in embodiments, the models may not require task-specific or domain-specific training. LLMs/VLMs/MMLMs/etc. that have undergone extensive pre-training on vast amounts of unlabeled data may be referred to as foundation models and may be adept at a variety of tasks like question-answering, summarization, filling in missing information, translation, image/video/design/USD/data generation. Some LLMs/VLMs/MMLMs/etc. may be tailored for a specific use case using techniques like prompt tuning, fine-tuning, retrieval augmented generation (RAG), adding adapters (e.g., customized neural networks, and/or neural network layers, that tune or adjust prompts or tokens to bias the language model toward a particular task or domain), and/or using other fine-tuning or tailoring techniques that optimize the models for use on particular tasks and/or within particular domains.

In some embodiments, the LLMs/VLMs/MMLMs/etc. of the present disclosure may be implemented using various model alignment techniques. For example, in some embodiments, guardrails may be implemented to identify improper or undesired inputs (e.g., prompts) and/or outputs of the models. In doing so, the system may use the guardrails and/or other model alignment techniques to either prevent a particular undesired input from being processed using the LLMs/VLMs/MMLMs/etc., and/or preventing the output or presentation (e.g., display, audio output, etc.) of information generating using the LLMs/VLMs/MMLMs/etc. In some embodiments, one or more additional models—or layers thereof—may be implemented to identify issues with inputs and/or outputs of the models. For example, these "safeguard" models may be trained to identify inputs and/or outputs that are "safe" or otherwise okay or desired and/or that are "unsafe" or are otherwise undesired for the particular application/implementation. As a result, the LLMs/VLMs/MMLMs/etc.of the present disclosure may be less likely to output language/text/audio/video/design data/USD data/etc. that may be offensive, vulgar, improper, unsafe, out of domain, and/or otherwise undesired for the particular application/implementation.

In some embodiments, the LLMs/VLMs/etc. may be configured to or capable of accessing or using one or more plug-ins, application programming interfaces (APIs), databases, data stores, repositories, etc. For example, for certain tasks or operations that the model is not ideally suited for, the model may have instructions (e.g., as a result of training, and/or based on instructions in a given prompt) to access one or more plug-ins (e.g., 3rd party plugins) for help in processing the current input. In such an example, where at least part of a prompt is related to restaurants or weather, the model may access one or more restaurant or weather plug-ins (e.g., via one or more APIs) to retrieve the relevant information. As another example, where at least part of a response requires a mathematical computation, the model may access one or more math plug-ins or APIs for help in solving the problem(s), and may then use the response from the plug-in and/or API in the output from the model. This process may be repeated—e.g., recursively for any number of iterations and using any number of plug-ins and/or APIs until a response to the input prompt can be generated that addresses each ask/question/request/process/operation/etc. As such, the model(s) may not only rely on its own knowledge from training on a large dataset(s), but also on the expertise or optimized nature of one or more external resources-such as APIs, plug-ins, and/or the like.

In some embodiments, multiple language models (e.g., LLMs/VLMs/MMLMs/etc., multiple instances of the same language model, and/or multiple prompts provided to the same language model or instance of the same language model may be implemented, executed, or accessed (e.g., using one or more plug-ins, user interfaces, APIs, databases, data stores, repositories, etc.) to provide output responsive to the same query, or responsive to separate portions of a query. In at least one embodiment, multiple language models e.g., language models with different architectures, language models trained on different (e.g. updated) corpuses of data may be provided with the same input query and prompt (e.g., set of constraints, conditioners, etc.). In one or more embodiments, the language models may be different versions of the same foundation model. In one or more embodiments, at least one language model may be instantiated as multiple agents—e.g., more than one prompt may be provided to constrain, direct, or otherwise influence a style, a content, or a character, etc., of the output provided. In one or more example, non-limiting embodiments, the same language model may be asked to provide output corresponding to a different role, perspective, character, or having a different base of knowledge, etc.—as defined by a supplied prompt.

In any one of such embodiments, the output of two or more (e.g., each) language models, two or more versions of at least one language model, two or more instanced agents of at least one language model, and/or two more prompts provided to at least one language model may be further processed, e.g., aggregated, compared or filtered against, or used to determine (and provide) a consensus response. In one or more embodiments, the output from one language model—or version, instance, or agent—may be be provided as input to another language model for further processing and/or validation. In one or more embodiments, a language model may be asked to generate or otherwise obtain an output with respect to an input source material, with the output being associated with the input source material. Such an association may include, for example, the generation of a caption or portion of text that is embedded (e.g., as metadata) with an input source text or image. In one or more embodiments, an output of a language model may be used to determine the validity of an input source material for further processing, or inclusion in a dataset. For example, a language model may be used to assess the presence (or absence) of a target word in a portion of text or an object in an image, with the text or image being annotated to note such presence (or lack thereof). Alternatively, the determination from the language model may be used to determine whether the source material should be included in a curated dataset, for example and without limitation.

FIG. 28A is a block diagram of an example generative language model system 2800 suitable for use in implementing at least some embodiments of the present disclosure. In the example illustrated in FIG. 28A, the generative language model system 2800 includes a retrieval augmented generation (RAG) component 2892, an input processor 2805, a tokenizer 2810, an embedding component 2820, plug-ins/APIs 2895, and a generative language model (LM) 2830 (which may include an LLM, a VLM, a multi-modal LM, etc.).

At a high level, the input processor 2805 may receive an input 2801 comprising text and/or other types of input data (e.g., audio data, video data, image data, sensor data (e.g., LiDAR, RADAR, ultrasonic, etc.), 3D design data, CAD data, universal scene descriptor (USD) data-such as OpenUSD, etc.), depending on the architecture of the generative LM 2830 (e.g., LLM/VLM/MMLM/etc.). In some embodiments, the input 2801 includes plain text in the form of one or more sentences, paragraphs, and/or documents. Additionally or alternatively, the input 2801 may include numerical sequences, precomputed embeddings (e.g., word or sentence embeddings), and/or structured data (e.g., in tabular formats, JSON, or XML). In some implementations in which the generative LM 2830 is capable of processing multi-modal inputs, the input 2801 may combine text (or may omit text) with image data, audio data, video data, design data, USD data, and/or other types of input data, such as but not limited to those described herein. Taking raw input text as an example, the input processor 2805 may prepare raw input text in various ways. For example, the input processor 2805 may perform various types of text filtering to remove noise (e.g., special characters, punctuation, HTML tags, stopwords, portions of an image(s), portions of audio, etc.) from relevant textual content. In an example involving stopwords (common words that tend to carry little semantic meaning), the input processor 2805 may remove stopwords to reduce noise and focus the generative LM 2830 on more meaningful content. The input processor 2805 may apply text normalization, for example, by converting all characters to lowercase, removing accents, and/or or handling special cases like contractions or abbreviations to ensure consistency. These are just a few examples, and other types of input processing may be applied.

In some embodiments, a RAG component 2892 (which may include one or more RAG models, and/or may be performed using the generative LM 2830 itself) may be used to retrieve additional information to be used as part of the input 2801 or prompt. RAG may be used to enhance the input to the LLM/VLM/MMLM/etc. with external knowledge, so that answers to specific questions or queries or requests are more relevant-such as in a case where specific knowledge is required. The RAG component 2892 may fetch this additional information (e.g., grounding information, such as grounding text/image/video/audio/USD/CAD/etc.) from one or more external sources, which can then be fed to the LLM/VLM/MMLM/etc. along with the prompt to improve accuracy of the responses or outputs of the model.

For example, in some embodiments, the input 2801 may be generated using the query or input to the model (e.g., a question, a request, etc.) in addition to data retrieved using the RAG component 2892. In some embodiments, the input processor 2805 may analyze the input 2801 and communicate with the RAG component 2892 (or the RAG component 2892 may be part of the input processor 2805, in embodiments) in order to identify relevant text and/or other data to provide to the generative LM 2830 as additional context or sources of information from which to identify the response, answer, or output 2890, generally. For example, where the input indicates that the user is interested in a desired tire pressure for a particular make and model of vehicle, the RAG component 2892 may retrieve-using a RAG model performing a vector search in an embedding space, for example—the tire pressure information or the text corresponding thereto from a digital (embedded) version of the user manual for that particular vehicle make and model. Similarly, where a user revisits a chatbot related to a particular product offering or service, the RAG component 2892 may retrieve a prior stored conversation history—or at least a summary thereof—and include the prior conversation history along with the current ask/request as part of the input 2801 to the generative LM 2830.

The RAG component 2892 may use various RAG techniques. For example, naïve RAG may be used where documents are indexed, chunked, and applied to an embedding model to generate embeddings corresponding to the chunks. A user query may also be applied to the embedding model and/or another embedding model of the RAG component 2892 and the embeddings of the chunks along with the embeddings of the query may be compared to identify the most similar/related embeddings to the query, which may be supplied to the generative LM 2830 to generate an output.

In some embodiments, more advanced RAG techniques may be used. For example, prior to passing chunks to the embedding model, the chunks may undergo pre-retrieval processes (e.g., routing, rewriting, metadata analysis, expansion, etc.). In addition, prior to generating the final embeddings, post-retrieval processes (e.g., re-ranking, prompt compression, etc.) may be performed on the outputs of the embedding model prior to final embeddings being used as comparison to an input query.

As a further example, modular RAG techniques may be used, such as those that are similar to naïve and/or advanced RAG, but also include features such as hybrid search, recursive retrieval and query engines, StepBack approaches, sub-queries, and hypothetical document embedding.

As another example, Graph RAG may use knowledge graphs as a source of context or factual information. Graph RAG may be implemented using a graph database as a source of contextual information sent to the LLM/VLM/MMLM/etc. Rather than (or in addition to) providing the model with chunks of data extracted from larger sized documents-which may result in a lack of context, factual correctness, language accuracy, etc.—graph RAG may also provide structured entity information to the LLM/VLM/MMLM/etc. by combining the structured entity textual description with its many properties and relationships, allowing for deeper insights by the model. When implementing graph RAG, the systems and methods described herein use a graph as a content store and extract relevant chunks of documents and ask the LLM/VLM/MMLM/etc. to answer using them. The knowledge graph, in such embodiments, may contain relevant textual content and metadata about the knowledge graph as well as be integrated with a vector database. In some embodiments, the graph RAG may use a graph as a subject matter expert, where descriptions of concepts and entities relevant to a query/prompt may be extracted and passed to the model as semantic context. These descriptions may include relationships between the concepts. In other examples, the graph may be used as a database, where part of a query/prompt may be mapped to a graph query, the graph query may be executed, and the LLM/VLM/MMLM/etc. may summarize the results. In such an example, the graph may strore relevant factual information, and a query (natural language query) to graph query tool (NL-to-Graph-query tool) and entity linking may be used. In some embodiments, graph RAG (e.g., using a graph database) may be combined with standard (e.g., vector database) RAG, and/or other RAG types, to benefit from multiple approaches.

In any embodiments, the RAG component 2892 may implement a plugin, API, user interface, and/or other functionality to perform RAG. For example, a graph RAG plug-in may be used by the LLM/VLM/MMLM/etc. to run queries against the knowledge graph to extract relevant information for feeding to the model, and a standard or vector RAG plug-in may be used to run queries against a vector database. For example, the graph database may interact with a plug-in's REST interface such that the graph database is decoupled from the vector database and/or the embeddings models.

The tokenizer 2810 may segment the (e.g., processed) text data into smaller units (tokens) for subsequent analysis and processing. The tokens may represent individual words, subwords, characters, portions of audio/video/image/etc., depending on the implementation. Word-based tokenization divides the text into individual words, treating each word as a separate token. Subword tokenization breaks down words into smaller meaningful units (e.g., prefixes, suffixes, stems), enabling the generative LM 2830 to understand morphological variations and handle out-of-vocabulary words more effectively. Character-based tokenization represents each character as a separate token, enabling the generative LM 2830 to process text at a fine-grained level. The choice of tokenization strategy may depend on factors such as the language being processed, the task at hand, and/or characteristics of the training dataset. As such, the tokenizer 2810 may convert the (e.g., processed) text into a structured format according to tokenization schema being implemented in the particular embodiment.

The embedding component 2820 may use any known embedding technique to transform discrete tokens into (e.g., dense, continuous vector) representations of semantic meaning. For example, the embedding component 2820 may use pre-trained word embeddings (e.g., Word2Vec, GloVe, or FastText), one-hot encoding, Term Frequency-Inverse Document Frequency (TF-IDF) encoding, one or more embedding layers of a neural network, and/or otherwise.

In some implementations in which the input 2801 includes image data/video data/etc., the input processor 2801 may resize the data to a standard size compatible with format of a corresponding input channel and/or may normalize pixel values to a common range (e.g., 0 to 1) to ensure a consistent representation, and the embedding component 2820 may encode the image data using any known technique (e.g., using one or more convolutional neural networks (CNNs) to extract visual features). In some implementations in which the input 2801 includes audio data, the input processor 2801 may resample an audio file to a consistent sampling rate for uniform processing, and the embedding component 2820 may use any known technique to extract and encode audio features-such as in the form of a spectrogram (e.g., a mel-spectrogram). In some implementations in which the input 2801 includes video data, the input processor 2801 may extract frames or apply resizing to extracted frames, and the embedding component 2820 may extract features such as optical flow embeddings or video embeddings and/or may encode temporal information or sequences of frames. In some implementations in which the input 2801 includes multi-modal data, the embedding component 2820 may fuse representations of the different types of data (e.g., text, image, audio, USD, video, design, etc.) using techniques like early fusion (concatenation), late fusion (sequential processing), attention-based fusion (e.g., self-attention, cross-attention), etc.

The generative LM 2830 and/or other components of the generative LM system 2800 may use different types of neural network architectures depending on the implementation. For example, transformer-based architectures such as those used in models like GPT may be implemented, and may include self-attention mechanisms that weigh the importance of different words or tokens in the input sequence and/or feedforward networks that process the output of the self-attention layers, applying non-linear transformations to the input representations and extracting higher-level features. Some non-limiting example architectures include transformers (e.g., encoder-decoder, decoder only, multi-modal), RNNs, LSTMs, fusion models, diffusion models, cross-modal embedding models that learn joint embedding spaces, graph neural networks (GNNs), hybrid architectures combining different types of architectures adversarial networks like generative adversarial networks or GANs or adversarial autoencoders (AAEs) for joint distribution learning, and others. As such, depending on the implementation and architecture, the embedding component 2820 may apply an encoded representation of the input 2801 to the generative LM 2830, and the generative LM 2830 may process the encoded representation of the input 2801 to generate an output 2890, which may include responsive text and/or other types of data.

As described herein, in some embodiments, the generative LM 2830 may be configured to access or use—or capable of accessing or using-plug-ins/APIs 2895 (which may include one or more plug-ins, application programming interfaces (APIs), databases, data stores, repositories, etc.). For example, for certain tasks or operations that the generative LM 2830 is not ideally suited for, the model may have instructions (e.g., as a result of training, and/or based on instructions in a given prompt, such as those retrieved using the RAG component 2892) to access one or more plug-ins/APIs 2895 (e.g., 3rd party plugins) for help in processing the current input. In such an example, where at least part of a prompt is related to restaurants or weather, the model may access one or more restaurant or weather plug-ins (e.g., via one or more APIs), send at least a portion of the prompt related to the particular plug-in/API 2895 to the plug-in/API 2895, the plug-in/API 2895 may process the information and return an answer to the generative LM 2830, and the generative LM 2830 may use the response to generate the output 2890. This process may be repeated—e.g., recursively—for any number of iterations and using any number of plug-ins/APIs 2895 until an output 2890 that addresses each ask/question/request/process/operation/etc. from the input 2801 can be generated. As such, the model(s) may not only rely on its own knowledge from training on a large dataset(s) and/or from data retrieved using the RAG component 2892, but also on the expertise or optimized nature of one or more external resources-such as the plug-ins/APIs 2895.

Figure 28B:
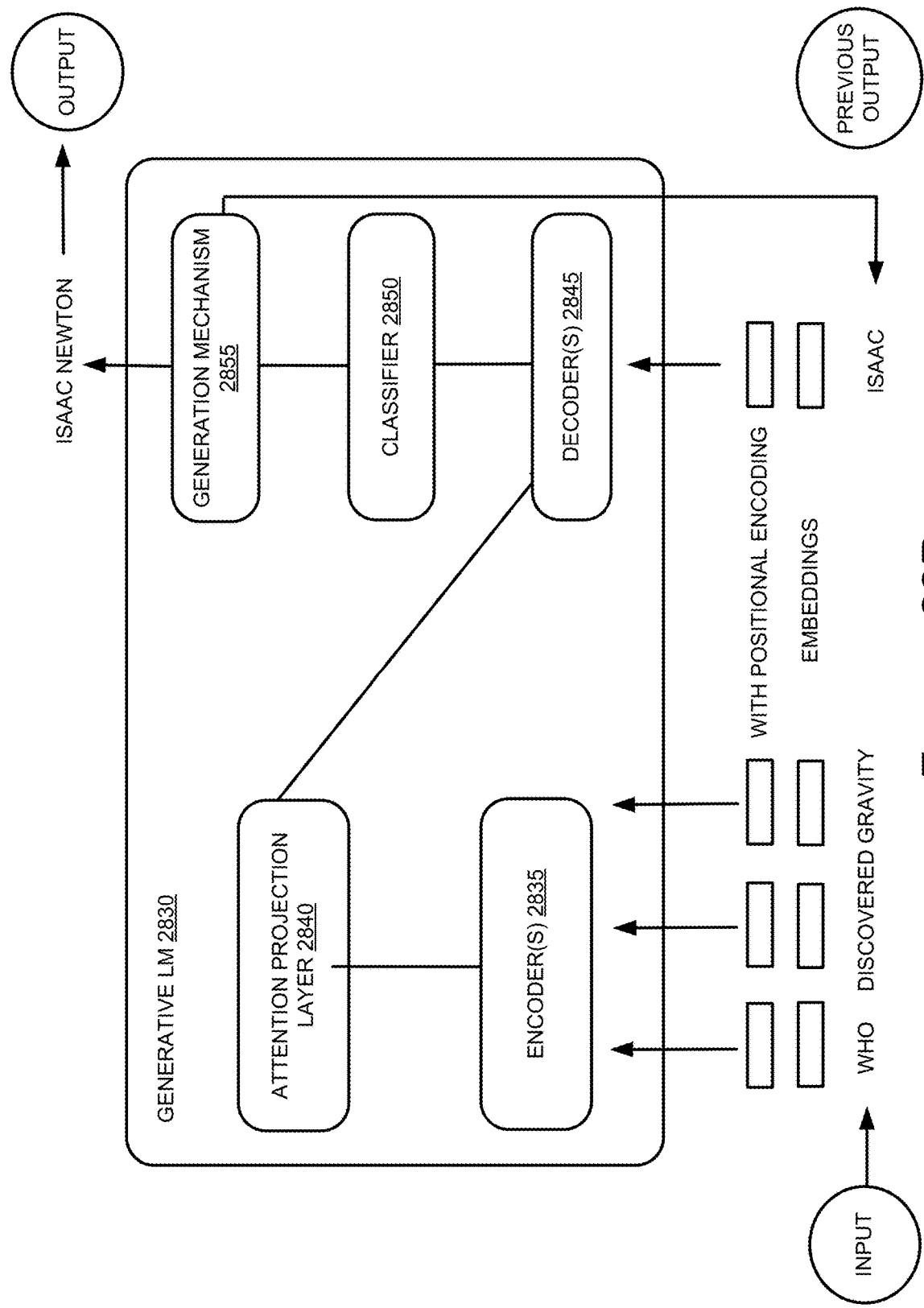
FIG. 28B is a block diagram of an example generative language model that includes a transformer encoder-decoder suitable for use in implementing at least some embodiments of the present disclosure.

FIG. 28B is a block diagram of an example implementation in which the generative LM 2830 includes a transformer encoder-decoder. For example, assume input text such as "Who discovered gravity" is tokenized (e.g., by the tokenizer 2810 of FIG. 28A) into tokens such as words, and each token is encoded (e.g., by the embedding component 2820 of FIG. 928A) into a corresponding embedding (e.g., of size 512). Since these token embeddings typically do not represent the position of the token in the input sequence, any known technique may be used to add a positional encoding to each token embedding to encode the sequential relationships and context of the tokens in the input sequence. As such, the (e.g., resulting) embeddings may be applied to one or more encoder(s) 2835 of the generative LM 2830.

In an example implementation, the encoder(s) 2835 forms an encoder stack, where each encoder includes a self-attention layer and a feedforward network. In an example transformer architecture, each token (e.g., word) flows through a separate path. As such, each encoder may accept a sequence of vectors, passing each vector through the self-attention layer, then the feedforward network, and then upwards to the next encoder in the stack. Any known self-attention technique may be used. For example, to calculate a self-attention score for each token (word), a query vector, a key vector, and a value vector may be created for each token, a self-attention score may be calculated for pairs of tokens by taking the dot product of the query vector with the corresponding key vectors, normalizing the resulting scores, multiplying by corresponding value vectors, and summing weighted value vectors. The encoder may apply multi-headed attention in which the attention mechanism is applied multiple times in parallel with different learned weight matrices. Any number of encoders may be cascaded to generate a context vector encoding the input. An attention projection layer 2840 may convert the context vector into attention vectors (keys and values) for the decoder(s) 2845.

In an example implementation, the decoder(s) 2845 form a decoder stack, where each decoder includes a self-attention layer, an encoder-decoder self-attention layer that uses the attention vectors (keys and values) from the encoder to focus on relevant parts of the input sequence, and a feedforward network. As with the encoder(s) 2835, in an example transformer architecture, each token (e.g., word) flows through a separate path in the decoder(s) 2845. During a first pass, the decoder(s) 2845, a classifier 2850, and a generation mechanism 2855 may generate a first token, and the generation mechanism 2855 may apply the generated token as an input during a second pass. The process may repeat in a loop, successively generating and adding tokens (e.g., words) to the output from the preceding pass and applying the token embeddings of the composite sequence with positional encodings as an input to the decoder(s) 2845 during a subsequent pass, sequentially generating one token at a time (known as auto-regression) until predicting a symbol or token that represents the end of the response. Within each decoder, the self-attention layer is typically constrained to attend only to preceding positions in the output sequence by applying a masking technique (e.g., setting future positions to negative infinity) before the softmax operation. In an example implementation, the encoder-decoder attention layer operates similarly to the (e.g., multi-headed) self-attention in the encoder(s) 2835, except that it creates its queries from the layer below it and takes the keys and values (e.g., matrix) from the output of the encoder(s) 2835.

As such, the decoder(s) 2845 may output some decoded (e.g., vector) representation of the input being applied during a particular pass. The classifier 2850 may include a multi-class classifier comprising one or more neural network layers that project the decoded (e.g., vector) representation into a corresponding dimensionality (e.g., one dimension for each supported word or token in the output vocabulary) and a softmax operation that converts logits to probabilities. As such, the generation mechanism 2855 may select or sample a word or token based on a corresponding predicted probability (e.g., select the word with the highest predicted probability) and append it to the output from a previous pass, generating each word or token sequentially. The generation mechanism 2855 may repeat the process, triggering successive decoder inputs and corresponding predictions until selecting or sampling a symbol or token that represents the end of the response, at which point, the generation mechanism 2855 may output the generated response.

Figure 28C:
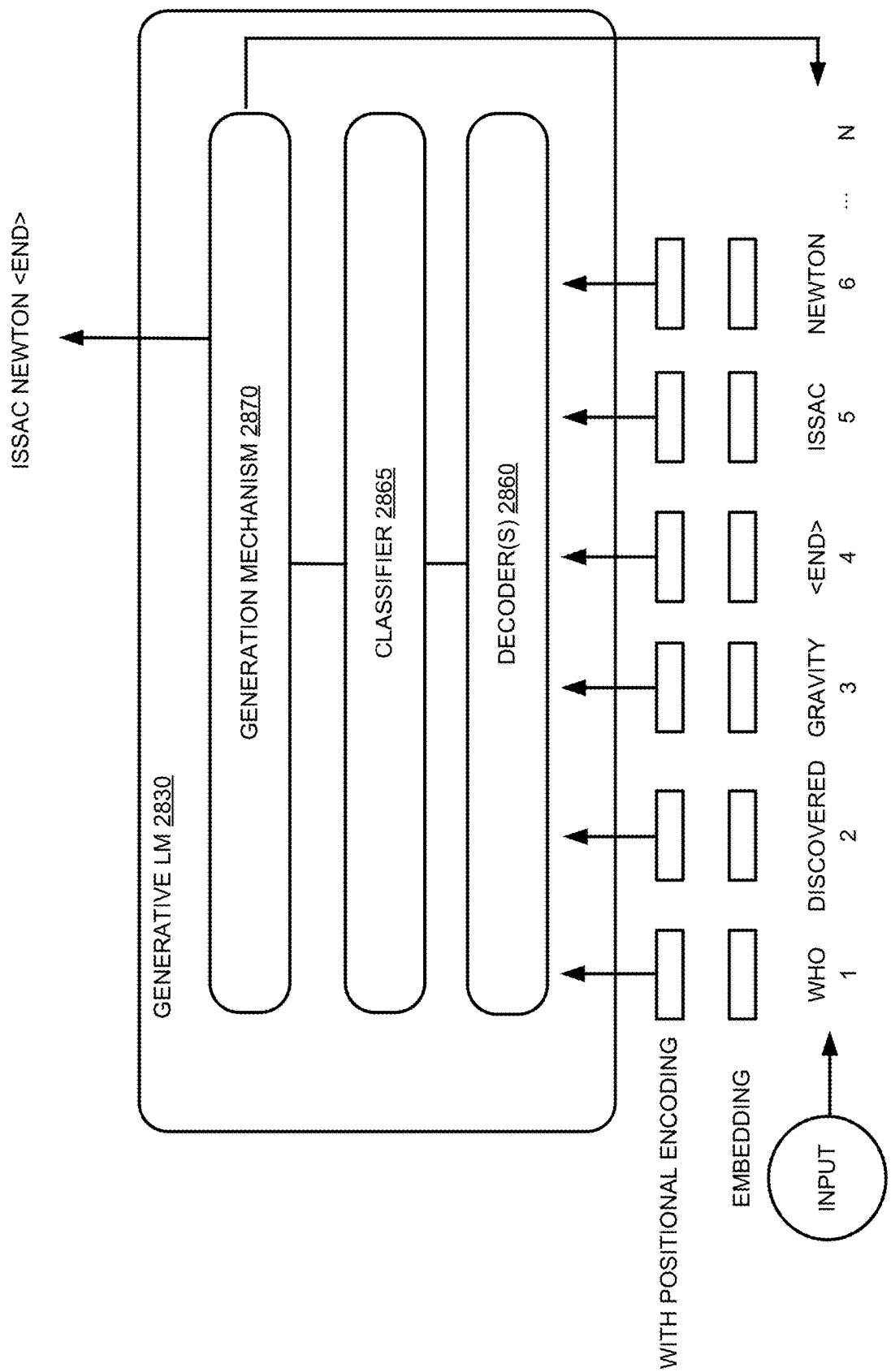
FIG. 28C is a block diagram of an example generative language model that includes a decoder-only transformer architecture suitable for use in implementing at least some embodiments of the present disclosure.

FIG. 28C is a block diagram of an example implementation in which the generative LM 2830 includes a decoder-only transformer architecture. For example, the decoder(s) 2860 of FIG. 28C may operate similarly as the decoder(s) 2845 of FIG. 28B except each of the decoder(s) 2860 of FIG. 28C omits the encoder-decoder self-attention layer (since there is no encoder in this implementation). As such, the decoder(s) 2860 may form a decoder stack, where each decoder includes a self-attention layer and a feedforward network. Furthermore, instead of encoding the input sequence, a symbol or token representing the end of the input sequence (or the beginning of the output sequence) may be appended to the input sequence, and the resulting sequence (e.g., corresponding embeddings with positional encodings) may be applied to the decoder(s) 2860. As with the decoder(s) 2845 of FIG. 28B, each token (e.g., word) may flow through a separate path in the decoder(s) 2860, and the decoder(s) 2860, a classifier 2865, and a generation mechanism 2870 may use auto-regression to sequentially generate one token at a time until predicting a symbol or token that represents the end of the response. The classifier 2865 and the generation mechanism 2870 may operate similarly as the classifier 2850 and the generation mechanism 2855 of FIG. 28B, with the generation mechanism 2870 selecting or sampling each successive output token based on a corresponding predicted probability and appending it to the output from a previous pass, generating each token sequentially until selecting or sampling a symbol or token that represents the end of the response. These and other architectures described herein are meant simply as examples, and other suitable architectures may be implemented within the scope of the present disclosure.

Example Content Streaming System

Figure 29:
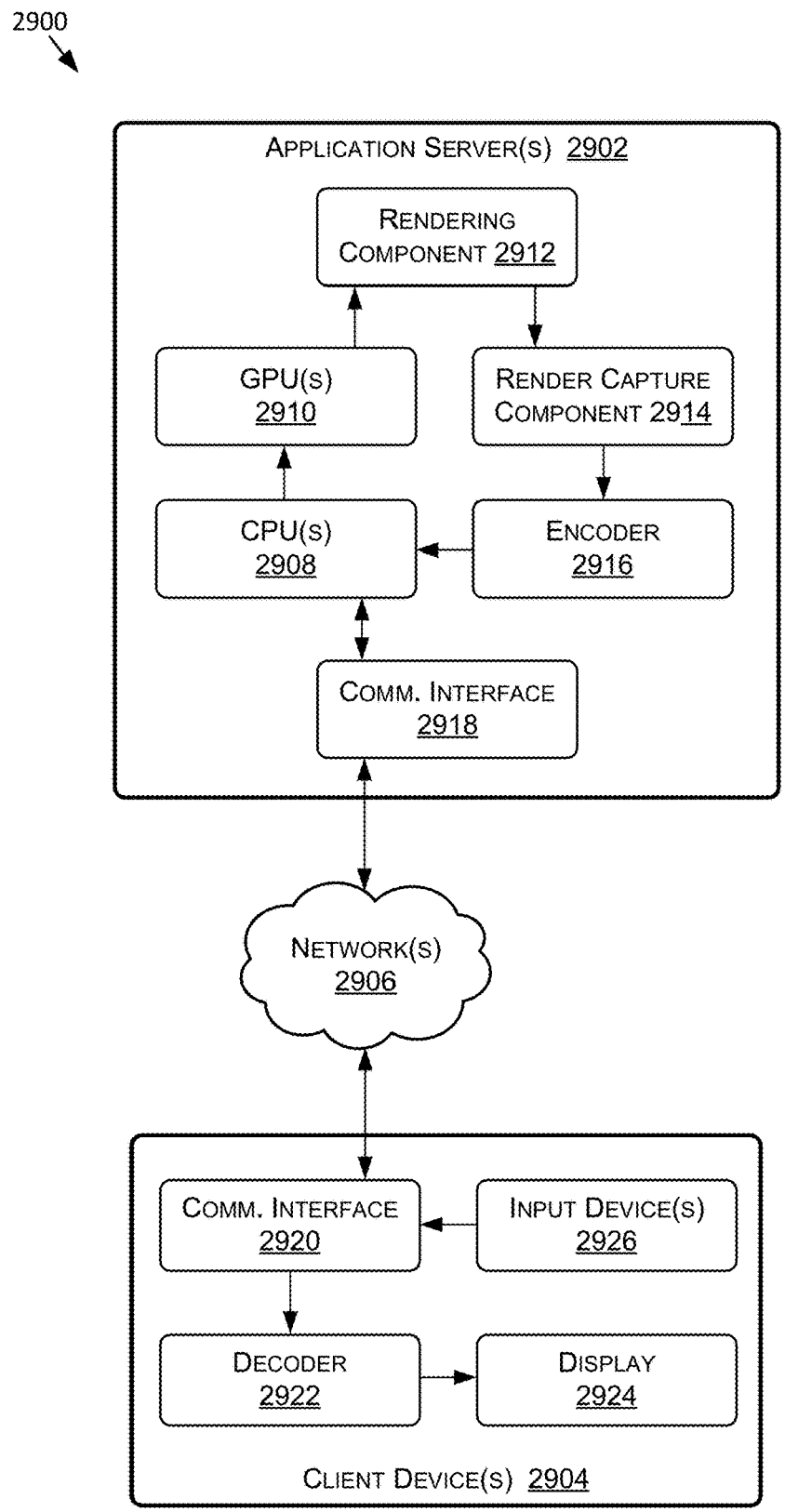
FIG. 29 is a block diagram of an example content streaming system suitable for use in implementing some embodiments of the present disclosure.

Now referring to FIG. 29, FIG. 29 is an example system diagram for a content streaming system 2900, in accordance with some embodiments of the present disclosure. FIG. 29 includes application server(s) 2902 (which may include similar components, features, and/or functionality to the example computing device 3000 of FIG. 30), client device(s) 2904 (which may include similar components, features, and/or functionality to the example computing device 3000 of FIG. 30), and network(s) 2906 (which may be similar to the network(s) described herein). In some embodiments of the present disclosure, the system 2900 may support an application session corresponding to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 2900, for an application session, the client device(s) 2904 may only receive input data in response to inputs to the input device(s), transmit the input data to the application server(s) 2902, receive encoded display data from the application server(s) 2902, and display the display data on the display 2924. As such, the more computationally intense computing and processing may be offloaded to the application server(s) 2902 (e.g., rendering—in particular ray or path tracing—for graphical output of the application session may be executed by GPU(s) of the application server(s) 2902, such as a game server(s)). In other words, the application session may be streamed to the client device(s) 2904 from the application server(s) 2902, thereby reducing the requirements of the client device(s) 2904 for graphics processing and rendering.

For example, with respect to an instantiation of an application session, a client device 2904 may be displaying a frame of the application session on the display 2924 based on receiving the display data from the application server(s) 2902. The client device 2904 may receive an input to one of the input device(s) and generate input data in response. The client device 2904 may transmit the input data to the application server(s) 2902 via the communication interface 2920 and over the network(s) 2906 (e.g., the Internet), and the application server(s) 2902 may receive the input data via the communication interface 2918. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 2912 may render the application session (e.g., representative of the result of the input data) and the render capture component 2914 may capture the rendering of the application session as display data (e.g., as image data capturing the rendered frame of the application session). The rendering of the application session may include ray or path-traced lighting and/or shadow effects, computed using one or more parallel processing units-such as GPUs, which may further employ the use of one or more dedicated hardware accelerators or processing cores to perform ray or path-tracing techniques—of the application server(s) 2902. In some embodiments, one or more virtual machines (VMs)—e.g., including one or more virtual components, such as vGPUs, vCPUs, etc.—may be used by the application server(s) 2902 to support the application sessions. The encoder 2916 may then encode the display data to generate encoded display data and the encoded display data may be transmitted to the client device 2904 over the network(s) 2906 via the communication interface 2918. The client device 2904 may receive the encoded display data via the communication interface 2920 and the decoder 2922 may decode the encoded display data to generate the display data. The client device 2904 may then display the display data via the display 2924.

Example Computing Device

FIG. 30 is a block diagram of an example computing device(s) 3000 suitable for use in implementing some embodiments of the present disclosure. Computing device 3000 may include an interconnect system 3002 that directly or indirectly couples the following devices: memory 3004, one or more central processing units (CPUs) 3006, one or more graphics processing units (GPUs) 3008, a communication interface 3010, input/output (I/O) ports 3012, input/output components 3014, a power supply 3016, one or more presentation components 3018 (e.g., display(s)), and one or more logic units 3020. In at least one embodiment, the computing device(s) 3000 may comprise one or more virtual machines (VMs), and/or any of the components thereof may comprise virtual components (e.g., virtual hardware components). For non-limiting examples, one or more of the GPUs 3008 may comprise one or more vGPUs, one or more of the CPUs 3006 may comprise one or more vCPUs, and/or one or more of the logic units 3020 may comprise one or more virtual logic units. As such, a computing device(s) 3000 may include discrete components (e.g., a full GPU dedicated to the computing device 3000), virtual components (e.g., a portion of a GPU dedicated to the computing device 3000), or a combination thereof.

Although the various blocks of FIG. 30 are shown as connected via the interconnect system 3002 with lines, this is not intended to be limiting and is for clarity only. For example, in some embodiments, a presentation component 3018, such as a display device, may be considered an I/O component 3014 (e.g., if the display is a touch screen). As another example, the CPUs 3006 and/or GPUs 3008 may include memory (e.g., the memory 3004 may be representative of a storage device in addition to the memory of the GPUs 3008, the CPUs 3006, and/or other components). In other words, the computing device of FIG. 30 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 30.

The interconnect system 3002 may represent one or more links or busses, such as an address bus, a data bus, a control bus, or a combination thereof. The interconnect system 3002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 3006 may be directly connected to the memory 3004. Further, the CPU 3006 may be directly connected to the GPU 3008. Where there is direct, or point-to-point connection between components, the interconnect system 3002 may include a PCIe link to carry out the connection. In these examples, a PCI bus need not be included in the computing device 3000.

The memory 3004 may include any of a variety of computer-readable media. The computer-readable media may be any available media that may be accessed by the computing device 3000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 3004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 3000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 3006 may be configured to execute at least some of the computer-readable instructions to control one or more components of the computing device 3000 to perform one or more of the methods and/or processes described herein. The CPU(s) 3006 may each include one or more cores (e.g., one, two, four, eight, twenty-eight, seventy-two, etc.) that are capable of handling a multitude of software threads simultaneously. The CPU(s) 3006 may include any type of processor, and may include different types of processors depending on the type of computing device 3000 implemented (e.g., processors with fewer cores for mobile devices and processors with more cores for servers). For example, depending on the type of computing device 3000, the processor may be an Advanced RISC Machines (ARM) processor implemented using Reduced Instruction Set Computing (RISC) or an x86 processor implemented using Complex Instruction Set Computing (CISC). The computing device 3000 may include one or more CPUs 3006 in addition to one or more microprocessors or supplementary co-processors, such as math co-processors.

In addition to or alternatively from the CPU(s) 3006, the GPU(s) 3008 may be configured to execute at least some of the computer-readable instructions to control one or more components of the computing device 3000 to perform one or more of the methods and/or processes described herein. One or more of the GPU(s) 3008 may be an integrated GPU (e.g., with one or more of the CPU(s) 3006 and/or one or more of the GPU(s) 3008 may be a discrete GPU. In embodiments, one or more of the GPU(s) 3008 may be a coprocessor of one or more of the CPU(s) 3006. The GPU(s) 3008 may be used by the computing device 3000 to render graphics (e.g., 3D graphics) or perform general purpose computations. For example, the GPU(s) 3008 may be used for General-Purpose computing on GPUs (GPGPU). The GPU(s) 3008 may include hundreds or thousands of cores that are capable of handling hundreds or thousands of software threads simultaneously. The GPU(s) 3008 may generate pixel data for output images in response to rendering commands (e.g., rendering commands from the CPU(s) 3006 received via a host interface). The GPU(s) 3008 may include graphics memory, such as display memory, for storing pixel data or any other suitable data, such as GPGPU data. The display memory may be included as part of the memory 3004. The GPU(s) 3008 may include two or more GPUs operating in parallel (e.g., via a link). The link may directly connect the GPUs (e.g., using NVLINK) or may connect the GPUs through a switch (e.g., using NVSwitch). When combined together, each GPU 3008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 3006 and/or the GPU(s) 3008, the logic unit(s) 3020 may be configured to execute at least some of the computer-readable instructions to control one or more components of the computing device 3000 to perform one or more of the methods and/or processes described herein. In embodiments, the CPU(s) 3006, the GPU(s) 3008, and/or the logic unit(s) 3020 may discretely or jointly perform any combination of the methods, processes and/or portions thereof. One or more of the logic units 3020 may be part of and/or integrated in one or more of the CPU(s) 3006 and/or the GPU(s) 3008 and/or one or more of the logic units 3020 may be discrete components or otherwise external to the CPU(s) 3006 and/or the GPU(s) 3008. In embodiments, one or more of the logic units 3020 may be a coprocessor of one or more of the CPU(s) 3006 and/or one or more of the GPU(s) 3008.

Examples of the logic unit(s) 3020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMS), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 3010 may include one or more receivers, transmitters, and/or transceivers that enable the computing device 3000 to communicate with other computing devices via an electronic communication network, included wired and/or wireless communications. The communication interface 3010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 3020 and/or communication interface 3010 may include one or more data processing units (DPUs) to transmit data received over a network and/or through interconnect system 3002 directly to (e.g., a memory of) one or more GPU(s) 3008.

The I/O ports 3012 may enable the computing device 3000 to be logically coupled to other devices including the I/O components 3014, the presentation component(s) 3018, and/or other components, some of which may be built in to (e.g., integrated in) the computing device 3000. Illustrative I/O components 3014 include a microphone, mouse, keyboard, joystick, game pad, game controller, satellite dish, scanner, printer, wireless device, etc. The I/O components 3014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 3000. The computing device 3000 may be include depth cameras, such as stereoscopic camera systems, infrared camera systems, RGB camera systems, touchscreen technology, and combinations of these, for gesture detection and recognition. Additionally, the computing device 3000 may include accelerometers or gyroscopes (e.g., as part of an inertia measurement unit (IMU)) that enable detection of motion. In some examples, the output of the accelerometers or gyroscopes may be used by the computing device 3000 to render immersive augmented reality or virtual reality.

The power supply 3016 may include a hard-wired power supply, a battery power supply, or a combination thereof. The power supply 3016 may provide power to the computing device 3000 to enable the components of the computing device 3000 to operate.

The presentation component(s) 3018 may include a display (e.g., a monitor, a touch screen, a television screen, a heads-up-display (HUD), other display types, or a combination thereof), speakers, and/or other presentation components. The presentation component(s) 3018 may receive data from other components (e.g., the GPU(s) 3008, the CPU(s) 3006, DPUs, etc.), and output the data (e.g., as an image, video, sound, etc.).

Example Data Center

Figure 31:
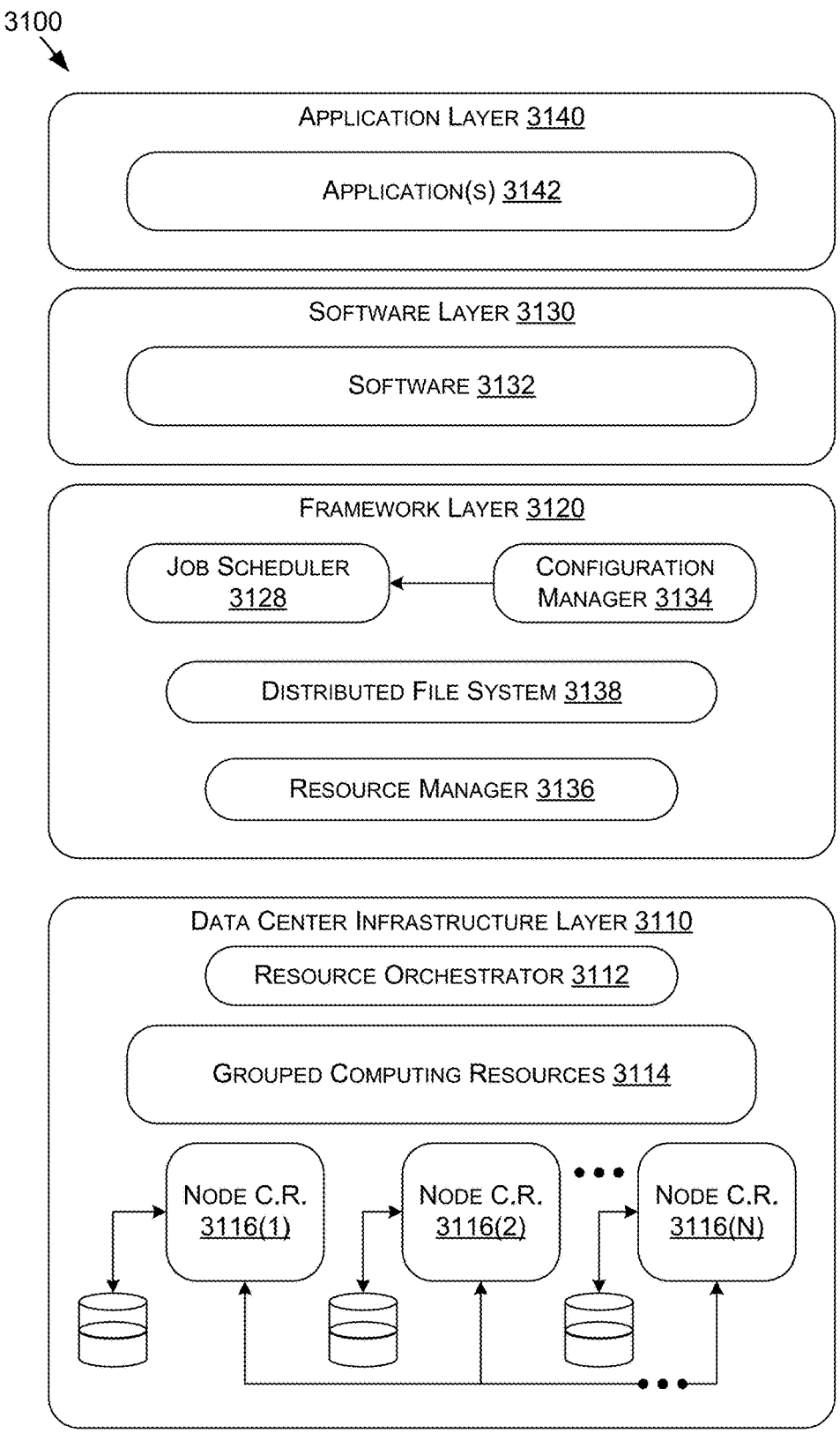
FIG. 31 is a block diagram of an example data center suitable for use in implementing some embodiments of the present disclosure.

FIG. 31 illustrates an example data center 3100 that may be used in at least one embodiments of the present disclosure. The data center 3100 may include a data center infrastructure layer 3110, a framework layer 3120, a software layer 3130, and/or an application layer 3140.

As shown in FIG. 31, the data center infrastructure layer 3110 may include a resource orchestrator 3112, grouped computing resources 3114, and node computing resources ("node C.R.s") 3116(1)-3116(N), where "N" represents any whole, positive integer. In at least one embodiment, node C.R.s 3116(1)-3116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 3116(1)-3116(N) may correspond to a server having one or more of the above-mentioned computing resources. In addition, in some embodiments, the node C.R.s 3116(1)-31161(N) may include one or more virtual components, such as vGPUs, vCPUs, and/or the like, and/or one or more of the node C.R.s 3116(1)-3116(N) may correspond to a virtual machine (VM).

In at least one embodiment, grouped computing resources 3114 may include separate groupings of node C.R.s 3116 housed within one or more racks (not shown), or many racks housed in data centers at various geographical locations (also not shown). Separate groupings of node C.R.s 3116 within grouped computing resources 3114 may include grouped compute, network, memory or storage resources that may be configured or allocated to support one or more workloads. In at least one embodiment, several node C.R.s 3116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 3112 may configure or otherwise control one or more node C.R.s 3116(1)-3116(N) and/or grouped computing resources 3114. In at least one embodiment, resource orchestrator 3112 may include a software design infrastructure (SDI) management entity for the data center 3100. The resource orchestrator 3112 may include hardware, software, or some combination thereof.

In at least one embodiment, as shown in FIG. 31, framework layer 3120 may include a job scheduler 3128, a configuration manager 3134, a resource manager 3136, and/or a distributed file system 3138. The framework layer 3120 may include a framework to support software 3132 of software layer 3130 and/or one or more application(s) 3142 of application layer 3140. The software 3132 or application(s) 3142 may respectively include web-based service software or applications, such as those provided by Amazon Web Services, Google Cloud and Microsoft Azure. The framework layer 3120 may be, but is not limited to, a type of free and open-source software web application framework such as Apache Spark™ (hereinafter "Spark") that may utilize distributed file system 3138 for large-scale data processing (e.g., "big data"). In at least one embodiment, job scheduler 3128 may include a Spark driver to facilitate scheduling of workloads supported by various layers of data center 3100. The configuration manager 3134 may be capable of configuring different layers such as software layer 3130 and framework layer 3120 including Spark and distributed file system 3138 for supporting large-scale data processing. The resource manager 3136 may be capable of managing clustered or grouped computing resources mapped to or allocated for support of distributed file system 3138 and job scheduler 3128. In at least one embodiment, clustered or grouped computing resources may include grouped computing resource 3114 at data center infrastructure layer 3110. The resource manager 3136 may coordinate with resource orchestrator 3112 to manage these mapped or allocated computing resources.

In at least one embodiment, software 3132 included in software layer 3130 may include software used by at least portions of node C.R.s 3116(1)-3116(N), grouped computing resources 3114, and/or distributed file system 3138 of framework layer 3120. One or more types of software may include, but are not limited to, Internet web page search software, e-mail virus scan software, database software, and streaming video content software.

In at least one embodiment, application(s) 3142 included in application layer 3140 may include one or more types of applications used by at least portions of node C.R.s 3116 (1)-3116(N), grouped computing resources 3114, and/or distributed file system 3138 of framework layer 3120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 3134, resource manager 3136, and resource orchestrator 3112 may implement any number and type of self-modifying actions based on any amount and type of data acquired in any technically feasible fashion. Self-modifying actions may relieve a data center operator of data center 3100 from making possibly bad configuration decisions and possibly avoiding underutilized and/or poor performing portions of a data center.

The data center 3100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 3100. In at least one embodiment, trained or deployed machine learning models corresponding to one or more neural networks may be used to infer or predict information using resources described above with respect to the data center 3100 by using weight parameters calculated through one or more training techniques, such as but not limited to those described herein.

In at least one embodiment, the data center 3100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 3000 of FIG. 30—e.g., each device may include similar components, features, and/or functionality of the computing device(s) 3000. In addition, where backend devices (e.g., servers, NAS, etc.) are implemented, the backend devices may be included as part of a data center 3100, an example of which is described in more detail herein with respect to FIG. 31.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 3000 described herein with respect to FIG. 30. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more processors comprising processing circuitry to:
   receive, by an interpreter associated with an interactive avatar that supports non-sequential human-machine interactions, one or more representations of one or more detected initiations of one or more user actions; and
   trigger, based at least on the interpreter executing one or more instruction lines of one or more interaction flows in response to the one or more detected initiations, presentation of a rendering of the interactive avatar providing backchanneling feedback during the one or more user actions, the one or more interaction flows composed in an interaction modeling language that uses a standardized interaction categorization schema.

2. The one or more processors of claim 1, wherein the interpreter is further to interrupt the one or more interaction flows and resume execution of the one or more interrupted interaction flows in response to matching one or more events representing the one or more detected initiations of the one or more user actions with the one or more interrupted interaction flows.

3. The one or more processors of claim 1, wherein the one or more interaction flows instruct the interpreter to trigger the interactive avatar to adopt a listening posture in response to the one or more detected initiations of the one or more user actions and stop displaying the listening posture in response to one or more detected completions of the one or more user actions.

4. The one or more processors of claim 1, wherein the one or more interaction flows instruct the interpreter to trigger the interactive avatar to display an idle posture until the one or more detected initiations of the one or more user actions.

5. The one or more processors of claim 1, wherein the one or more interaction flows instruct the interpreter to trigger the interactive avatar to display a talking posture in response to triggering the interactive avatar to talk.

6. The one or more processors of claim 1, wherein the one or more interaction flows instruct the interpreter to trigger the interactive avatar to display an attentive posture in response to completion of one or more utterances by the interactive avatar.

7. The one or more processors of claim 1, wherein the one or more interaction flows instruct the interpreter to trigger the interactive avatar to provide the backchanneling feedback based at least on mirroring a detected posture of a user during the one or more user actions of the user.

8. The one or more processors of claim 1, wherein the one or more interaction flows instruct the interpreter to trigger the interactive avatar to provide the backchanneling feedback as at least one of one or more gestures or one or more vocal bursts during the one or more user actions.

9. The one or more processors of claim 1, wherein the one or more processors are comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for performing deep learning operations;
   a system for performing remote operations;
   a system for performing real-time streaming;
   a system for generating or presenting one or more of augmented reality content, virtual reality content, or mixed reality content;
   a system implemented using an edge device;
   a system implemented using a robot;
   a system for performing conversational AI operations;
   a system implementing one or more language models;
   a system implementing one or more large language models (LLMs);
   a system implementing one or more vision language models (VLMs);
   a system implementing one or more multimodal language models;
   a system for generating synthetic data;

a system for generating synthetic data using AI;
a system incorporating one or more virtual machines (VMs);
a system implemented at least partially in a data center; or
a system implemented at least partially using cloud computing resources.

10. A system comprising one or more processors to trigger an interactive avatar to provide backchanneling feedback during one or more user actions based at least on an interpreter that supports non-sequential human-machine interactions executing one or more instruction lines of one or more interaction flows in response to one or more detected initiations of the one or more user actions, the one or more interaction flows composed in an interaction modeling language that uses a standardized interaction categorization schema.

11. The system of claim 10, wherein the interpreter is further to interrupt the one or more interaction flows and resume execution of the one or more interrupted interaction flows in response to matching one or more events representing the one or more detected initiations of the one or more user actions with the one or more interrupted interaction flows.

12. The system of claim 10, wherein the one or more interaction flows instruct the interpreter to trigger the interactive avatar to adopt a listening posture in response to the one or more detected initiations of the one or more user actions and stop displaying the listening posture in response to one or more detected completions of the one or more user actions.

13. The system of claim 10, wherein the one or more interaction flows instruct the interpreter to trigger the interactive avatar to display an idle posture until the one or more detected initiations of the one or more user actions.

14. The system of claim 10, wherein the one or more interaction flows instruct the interpreter to trigger the interactive avatar to display a talking posture in response to triggering the interactive avatar to talk.

15. The system of claim 10, wherein the one or more interaction flows instruct the interpreter to trigger the interactive avatar to display an attentive posture in response to completion of one or more utterances by the interactive avatar.

16. The system of claim 10, wherein the one or more interaction flows instruct the interpreter to trigger the interactive avatar to provide the backchanneling feedback as one or more vocal bursts during the one or more user actions.

17. The system of claim 10, wherein the one or more interaction flows instruct the interpreter to trigger the interactive avatar to provide the backchanneling feedback as one or more gestures during the one or more user actions.

18. The system of claim 10, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system implementing one or more vision language models (VLMs);
a system implementing one or more multimodal language models;
a system for generating synthetic data;
a system for generating synthetic data using AI;
a system incorporating one or more virtual machines (VMs);
a system implemented at least partially in a data center; or
a system implemented at least partially using cloud computing resources.

19. A method comprising:
receive one or more representations of one or more detected initiations of one or more user actions; and
trigger, based at least on executing one or more instruction lines of one or more interaction flows in response to the one or more detected initiations, an interactive avatar to provide feedback during the one or more user actions, the one or more interaction flows composed in an interaction modeling language that uses a standardized interaction categorization schema.

20. The method of claim 19, wherein the method is performed by at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system for performing remote operations;
a system for performing real-time streaming;
a system for generating or presenting one or more of augmented reality content, virtual reality content, or mixed reality content;
a system implemented using an edge device;
a system implemented using a robot;
a system for performing conversational AI operations;
a system implementing one or more language models;
a system implementing one or more large language models (LLMs);
a system implementing one or more vision language models (VLMs);
a system implementing one or more multimodal language models;
a system for generating synthetic data;
a system for generating synthetic data using AI;
a system incorporating one or more virtual machines (VMs);
a system implemented at least partially in a data center; or
a system implemented at least partially using cloud computing resources.

* * * * *